US009631542B2

(12) United States Patent
Subramaniyan et al.

(10) Patent No.: US 9,631,542 B2
(45) Date of Patent: Apr. 25, 2017

(54) SYSTEM AND METHOD FOR EXHAUSTING COMBUSTION GASES FROM GAS TURBINE ENGINES

(71) Applicants: General Electric Company, Schenectady, NY (US); ExxonMobil Upstream Research Company, Houston, TX (US)

(72) Inventors: Moorthi Subramaniyan, Bangalore (IN); Christian Michael Hansen, Simpsonville, SC (US); Richard A. Huntington, Houston, TX (US); Todd Franklin Denman, Greenville, SC (US)

(73) Assignees: General Electric Company, Schenectady, NY (US); ExxonMobile Upstream Research Company, Spring, TX (US)

( * ) Notice: Subject to any disclaimer, the term of this patent is extended or adjusted under 35 U.S.C. 154(b) by 362 days.

(21) Appl. No.: 14/301,979

(22) Filed: Jun. 11, 2014

(65) Prior Publication Data
US 2015/0000292 A1 Jan. 1, 2015

Related U.S. Application Data

(60) Provisional application No. 61/841,209, filed on Jun. 28, 2013.

(51) Int. Cl.
*F01N 13/08* (2010.01)
*F02C 3/34* (2006.01)
(Continued)

(52) U.S. Cl.
CPC ............. *F01N 13/08* (2013.01); *F01D 25/30* (2013.01); *F02C 3/34* (2013.01); *F02K 1/40* (2013.01);
(Continued)

(58) Field of Classification Search
CPC .. F01D 25/30; F01N 13/08; F02C 3/00; F02C 3/34; F02C 6/18; F02K 1/34; F02K 1/38;
(Continued)

(56) References Cited

U.S. PATENT DOCUMENTS 2,488,911 A  11/1949  Hepburn et al.
2,884,758 A   5/1959  Oberle
(Continued)

FOREIGN PATENT DOCUMENTS

CA  2231749  9/1998
CA  2645450  9/2007
(Continued)

OTHER PUBLICATIONS

U.S. Appl. No. 14/144,511, filed Dec. 30, 2013, Thatcher et al.
(Continued)

*Primary Examiner* — Bryon Gehman
(74) *Attorney, Agent, or Firm* — Fletcher Yoder P.C.

(57) ABSTRACT

A system includes a gas turbine engine that includes a combustor section having one or more combustors configured to generate combustion products and a turbine section having one or more turbine stages between an upstream end and a downstream end. The one or more turbine stages are driven by the combustion products. The gas turbine engine also includes an exhaust section disposed downstream from the downstream end of the turbine section. The exhaust section has an exhaust passage configured to receive the combustion products as an exhaust gas. The gas turbine engine also includes a mixing device disposed in the exhaust section. The mixing device is configured to divide the exhaust gas into a first exhaust gas and a second exhaust gas, and to combine the first and second exhaust gases in a mixing region to produce a mixed exhaust gas.

20 Claims, 15 Drawing Sheets

(51) Int. Cl.
  *F02K 1/48* (2006.01)
  *F01D 25/30* (2006.01)
  *F02K 1/40* (2006.01)
(52) U.S. Cl.
  CPC .......... *F02K 1/48* (2013.01); *F05D 2250/184* (2013.01); *F05D 2250/611* (2013.01); *Y02E 20/16* (2013.01)
(58) Field of Classification Search
  CPC ... F02K 1/386; F02K 1/40; F02K 1/48; F02K 3/02; F02K 3/04; F02K 3/075; F05D 2250/184; F05D 2250/611
  USPC .......... 60/39.12, 39.182, 39.5, 39.52, 226.1, 60/226.3, 772, 783, 784, 770
  See application file for complete search history.

(56) References Cited

U.S. PATENT DOCUMENTS

| | | |
|---|---|---|
| 3,269,114 A * | 8/1966 | Marchant et al. ........ F02K 3/06 60/226.1 |
| 3,631,672 A | 1/1972 | Gentile et al. |
| 3,643,430 A | 2/1972 | Emory et al. |
| 3,705,492 A | 12/1972 | Vickers |
| 3,841,382 A | 10/1974 | Gravis et al. |
| 3,905,445 A | 9/1975 | Scharton |
| 3,949,548 A | 4/1976 | Lockwood |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz |
| 4,101,294 A | 7/1978 | Kimura |
| 4,112,676 A | 9/1978 | DeCorso |
| 4,117,671 A | 10/1978 | Neal et al. |
| 4,142,365 A * | 3/1979 | Sargisson ................ F02K 1/386 60/226.1 |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A | 7/1985 | Stahl |
| 4,543,784 A | 10/1985 | Kirker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,858,428 A | 8/1989 | Paul |
| 4,895,710 A | 1/1990 | Hartmann et al. |
| 4,898,001 A | 2/1990 | Kuroda et al. |
| 4,946,597 A | 8/1990 | Sury |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,265,410 A | 11/1993 | Hisatome |
| 5,271,905 A | 12/1993 | Owen et al. |
| 5,275,552 A | 1/1994 | Schwartz et al. |
| 5,295,350 A | 3/1994 | Child et al. |
| 5,304,362 A | 4/1994 | Madsen |
| 5,325,660 A | 7/1994 | Taniguchi et al. |
| 5,332,036 A | 7/1994 | Shirley et al. |
| 5,344,307 A | 9/1994 | Schwartz et al. |
| 5,345,756 A | 9/1994 | Jahnke et al. |
| 5,355,668 A | 10/1994 | Weil et al. |
| 5,359,847 A | 11/1994 | Pillsbury et al. |
| 5,361,586 A | 11/1994 | McWhirter et al. |
| 5,388,395 A | 2/1995 | Scharpf et al. |
| 5,394,688 A | 3/1995 | Amos |
| 5,402,847 A | 4/1995 | Wilson et al. |
| 5,444,971 A | 8/1995 | Holenberger |
| 5,457,951 A | 10/1995 | Johnson et al. |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. |
| 5,725,054 A | 3/1998 | Shayegi et al. |
| 5,740,786 A | 4/1998 | Gartner |
| 5,743,079 A | 4/1998 | Walsh et al. |
| 5,765,363 A | 6/1998 | Mowill |
| 5,771,867 A | 6/1998 | Amstutz et al. |
| 5,771,868 A | 6/1998 | Khair |
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |

(56) References Cited

U.S. PATENT DOCUMENTS

| | | |
|---|---|---|
| 5,930,990 A | 8/1999 | Zachary et al. |
| 5,937,634 A | 8/1999 | Etheridge et al. |
| 5,950,417 A | 9/1999 | Robertson et al. |
| 5,956,937 A | 9/1999 | Beichel |
| 5,968,349 A | 10/1999 | Duyvesteyn et al. |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |
| 6,035,641 A | 3/2000 | Lokhandwala |
| 6,062,026 A | 5/2000 | Woollenweber et al. |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning et al. |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen et al. |
| 6,370,870 B1 | 4/2002 | Kamijo et al. |
| 6,374,591 B1 | 4/2002 | Johnson et al. |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,499,990 B1 | 12/2002 | Zink et al. |
| 6,502,383 B1 | 1/2003 | Janardan et al. |
| 6,505,567 B1 | 1/2003 | Anderdson et al. |
| 6,505,683 B2 | 1/2003 | Minkkinen et al. |
| 6,508,209 B1 | 1/2003 | Collier |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |

(56) References Cited

U.S. PATENT DOCUMENTS

| | | | |
|---|---|---|---|
| 7,040,400 | B2 | 5/2006 | de Rouffignac et al. |
| 7,043,898 | B2 | 5/2006 | Rago |
| 7,043,920 | B2 | 5/2006 | Viteri et al. |
| 7,045,553 | B2 | 5/2006 | Hershkowitz |
| 7,053,128 | B2 | 5/2006 | Hershkowitz |
| 7,056,482 | B2 | 6/2006 | Hakka et al. |
| 7,059,152 | B2 | 6/2006 | Oakey et al. |
| 7,065,953 | B1 | 6/2006 | Kopko |
| 7,065,972 | B2 | 6/2006 | Zupanc et al. |
| 7,074,033 | B2 | 7/2006 | Neary |
| 7,077,199 | B2 | 7/2006 | Vinegar et al. |
| 7,089,743 | B2 | 8/2006 | Frutschi et al. |
| 7,096,942 | B1 | 8/2006 | de Rouffignac et al. |
| 7,097,925 | B2 | 8/2006 | Keefer |
| 7,104,319 | B2 | 9/2006 | Vinegar et al. |
| 7,104,784 | B1 | 9/2006 | Hasegawa et al. |
| 7,124,589 | B2 | 10/2006 | Neary |
| 7,137,256 | B1 | 11/2006 | Stuttaford et al. |
| 7,137,623 | B2 | 11/2006 | Mockry et al. |
| 7,143,572 | B2 | 12/2006 | Ooka et al. |
| 7,143,606 | B2 | 12/2006 | Tranier |
| 7,146,969 | B2 | 12/2006 | Weirich |
| 7,147,461 | B2 | 12/2006 | Neary |
| 7,148,261 | B2 | 12/2006 | Hershkowitz et al. |
| 7,152,409 | B2 | 12/2006 | Yee et al. |
| 7,162,875 | B2 | 1/2007 | Fletcher et al. |
| 7,168,265 | B2 | 1/2007 | Briscoe et al. |
| 7,168,488 | B2 | 1/2007 | Olsvik et al. |
| 7,183,328 | B2 | 2/2007 | Hershkowitz et al. |
| 7,185,497 | B2 | 3/2007 | Dudebout et al. |
| 7,194,869 | B2 | 3/2007 | McQuiggan et al. |
| 7,197,880 | B2 | 4/2007 | Thornton et al. |
| 7,217,303 | B2 | 5/2007 | Hershkowitz et al. |
| 7,225,623 | B2 | 6/2007 | Koshoffer |
| 7,237,385 | B2 | 7/2007 | Carrea |
| 7,284,362 | B2 | 10/2007 | Marin et al. |
| 7,299,619 | B2 | 11/2007 | Briesch et al. |
| 7,299,637 | B2 * | 11/2007 | Becker ............... F02C 3/34 60/39.182 |
| 7,299,868 | B2 | 11/2007 | Zapadinski |
| 7,302,801 | B2 | 12/2007 | Chen |
| 7,305,817 | B2 | 12/2007 | Blodgett et al. |
| 7,305,831 | B2 | 12/2007 | Carrea et al. |
| 7,313,916 | B2 | 1/2008 | Pellizzari |
| 7,318,317 | B2 | 1/2008 | Carrea |
| 7,343,742 | B2 | 3/2008 | Wimmer et al. |
| 7,353,655 | B2 | 4/2008 | Bolis et al. |
| 7,357,857 | B2 | 4/2008 | Hart et al. |
| 7,363,756 | B2 | 4/2008 | Carrea et al. |
| 7,363,764 | B2 | 4/2008 | Griffin et al. |
| 7,381,393 | B2 | 6/2008 | Lynn |
| 7,401,577 | B2 | 7/2008 | Saucedo et al. |
| 7,410,525 | B1 | 8/2008 | Liu et al. |
| 7,416,137 | B2 | 8/2008 | Hagen et al. |
| 7,434,384 | B2 | 10/2008 | Lord et al. |
| 7,438,744 | B2 | 10/2008 | Beaumont |
| 7,467,942 | B2 | 12/2008 | Carroni et al. |
| 7,468,173 | B2 | 12/2008 | Hughes et al. |
| 7,472,550 | B2 | 1/2009 | Lear et al. |
| 7,481,048 | B2 | 1/2009 | Harmon et al. |
| 7,481,275 | B2 | 1/2009 | Olsvik et al. |
| 7,482,500 | B2 | 1/2009 | Johann et al. |
| 7,485,761 | B2 | 2/2009 | Schindler et al. |
| 7,488,857 | B2 | 2/2009 | Johann et al. |
| 7,490,472 | B2 | 2/2009 | Lynghjem et al. |
| 7,491,250 | B2 | 2/2009 | Hershkowitz et al. |
| 7,492,054 | B2 | 2/2009 | Catlin |
| 7,493,769 | B2 | 2/2009 | Jangili |
| 7,498,009 | B2 | 3/2009 | Leach et al. |
| 7,503,178 | B2 | 3/2009 | Bucker et al. |
| 7,503,948 | B2 | 3/2009 | Hershkowitz et al. |
| 7,506,501 | B2 | 3/2009 | Anderson et al. |
| 7,513,099 | B2 | 4/2009 | Nuding et al. |
| 7,513,100 | B2 | 4/2009 | Motter et al. |
| 7,516,626 | B2 | 4/2009 | Brox et al. |
| 7,520,134 | B2 | 4/2009 | Durbin et al. |
| 7,523,603 | B2 | 4/2009 | Hagen et al. |
| 7,536,252 | B1 | 5/2009 | Hibshman et al. |
| 7,536,873 | B2 | 5/2009 | Nohlen |
| 7,540,150 | B2 | 6/2009 | Schmid et al. |
| 7,559,977 | B2 | 7/2009 | Fleischer et al. |
| 7,562,519 | B1 | 7/2009 | Harris et al. |
| 7,562,529 | B2 | 7/2009 | Kuspert et al. |
| 7,566,394 | B2 | 7/2009 | Koseoglu |
| 7,574,856 | B2 | 8/2009 | Mak |
| 7,591,866 | B2 | 9/2009 | Bose |
| 7,594,386 | B2 | 9/2009 | Narayanan et al. |
| 7,610,752 | B2 | 11/2009 | Betta et al. |
| 7,610,759 | B2 | 11/2009 | Yoshida et al. |
| 7,611,681 | B2 | 11/2009 | Kaefer |
| 7,614,352 | B2 | 11/2009 | Anthony et al. |
| 7,618,606 | B2 | 11/2009 | Fan et al. |
| 7,631,493 | B2 | 12/2009 | Shirakawa et al. |
| 7,634,915 | B2 | 12/2009 | Hoffmann et al. |
| 7,635,408 | B2 | 12/2009 | Mak et al. |
| 7,637,093 | B2 | 12/2009 | Rao |
| 7,644,573 | B2 | 1/2010 | Smith et al. |
| 7,650,744 | B2 | 1/2010 | Varatharajan et al. |
| 7,654,320 | B2 | 2/2010 | Payton |
| 7,654,330 | B2 | 2/2010 | Zubrin et al. |
| 7,655,071 | B2 | 2/2010 | De Vreede |
| 7,670,135 | B1 | 3/2010 | Zink et al. |
| 7,673,454 | B2 | 3/2010 | Saito et al. |
| 7,673,685 | B2 | 3/2010 | Shaw et al. |
| 7,674,443 | B1 | 3/2010 | Davis |
| 7,677,026 | B2 * | 3/2010 | Conete ............... F02K 1/48 60/770 |
| 7,677,309 | B2 | 3/2010 | Shaw et al. |
| 7,681,394 | B2 | 3/2010 | Haugen |
| 7,682,597 | B2 | 3/2010 | Blumenfeld et al. |
| 7,690,204 | B2 | 4/2010 | Drnevich et al. |
| 7,691,788 | B2 | 4/2010 | Tan et al. |
| 7,695,703 | B2 | 4/2010 | Sobolevskiy et al. |
| 7,717,173 | B2 | 5/2010 | Grott |
| 7,721,543 | B2 | 5/2010 | Massey et al. |
| 7,726,114 | B2 | 6/2010 | Evulet |
| 7,734,408 | B2 | 6/2010 | Shiraki |
| 7,739,864 | B2 | 6/2010 | Finkenrath et al. |
| 7,749,311 | B2 | 7/2010 | Saito et al. |
| 7,752,848 | B2 | 7/2010 | Balan et al. |
| 7,752,850 | B2 | 7/2010 | Laster et al. |
| 7,753,039 | B2 | 7/2010 | Harima et al. |
| 7,753,972 | B2 | 7/2010 | Zubrin et al. |
| 7,762,084 | B2 | 7/2010 | Martis et al. |
| 7,763,163 | B2 | 7/2010 | Koseoglu |
| 7,763,227 | B2 | 7/2010 | Wang |
| 7,765,810 | B2 | 8/2010 | Pfefferle |
| 7,788,897 | B2 | 9/2010 | Campbell et al. |
| 7,789,159 | B1 | 9/2010 | Bader |
| 7,789,658 | B2 | 9/2010 | Towler et al. |
| 7,789,944 | B2 | 9/2010 | Saito et al. |
| 7,793,494 | B2 | 9/2010 | Wirth et al. |
| 7,802,434 | B2 | 9/2010 | Varatharajan et al. |
| 7,815,873 | B2 | 10/2010 | Sankaranarayanan et al. |
| 7,815,892 | B2 | 10/2010 | Hershkowitz et al. |
| 7,819,951 | B2 | 10/2010 | White et al. |
| 7,824,179 | B2 | 11/2010 | Hasegawa et al. |
| 7,827,778 | B2 | 11/2010 | Finkenrath et al. |
| 7,827,794 | B1 | 11/2010 | Pronske et al. |
| 7,841,186 | B2 | 11/2010 | So et al. |
| 7,845,406 | B2 | 12/2010 | Nitschke |
| 7,846,401 | B2 | 12/2010 | Hershkowitz et al. |
| 7,861,511 | B2 | 1/2011 | Chillar et al. |
| 7,874,140 | B2 | 1/2011 | Fan et al. |
| 7,874,350 | B2 | 1/2011 | Pfefferle |
| 7,875,402 | B2 | 1/2011 | Hershkowitz et al. |
| 7,882,692 | B2 | 2/2011 | Pronske et al. |
| 7,886,522 | B2 | 2/2011 | Kammel |
| 7,895,822 | B2 | 3/2011 | Hoffmann et al. |
| 7,896,105 | B2 | 3/2011 | Dupriest |
| 7,906,304 | B2 | 3/2011 | Kohr |
| 7,909,898 | B2 | 3/2011 | White et al. |
| 7,914,749 | B2 | 3/2011 | Carstens et al. |
| 7,914,764 | B2 | 3/2011 | Hershkowitz et al. |

(56) References Cited

U.S. PATENT DOCUMENTS

| | | | |
|---|---|---|---|
| 7,918,906 | B2 | 4/2011 | Zubrin et al. |
| 7,921,633 | B2 | 4/2011 | Rising |
| 7,922,871 | B2 | 4/2011 | Price et al. |
| 7,926,292 | B2 | 4/2011 | Rabovitser et al. |
| 7,931,712 | B2 | 4/2011 | Zubrin et al. |
| 7,931,731 | B2 | 4/2011 | Van Heeringen et al. |
| 7,931,888 | B2 | 4/2011 | Drnevich et al. |
| 7,934,926 | B2 | 5/2011 | Kornbluth et al. |
| 7,942,003 | B2 | 5/2011 | Baudoin et al. |
| 7,942,008 | B2 | 5/2011 | Joshi et al. |
| 7,943,097 | B2 | 5/2011 | Golden et al. |
| 7,955,403 | B2 | 6/2011 | Ariyapadi et al. |
| 7,966,822 | B2 | 6/2011 | Myers et al. |
| 7,976,803 | B2 | 7/2011 | Hooper et al. |
| 7,980,312 | B1 | 7/2011 | Hill et al. |
| 7,985,399 | B2 | 7/2011 | Drnevich et al. |
| 7,988,750 | B2 | 8/2011 | Lee et al. |
| 8,001,789 | B2 | 8/2011 | Vega et al. |
| 8,029,273 | B2 | 10/2011 | Paschereit et al. |
| 8,036,813 | B2 | 10/2011 | Tonetti et al. |
| 8,038,416 | B2 | 10/2011 | Ono et al. |
| 8,038,746 | B2 | 10/2011 | Clark |
| 8,038,773 | B2 | 10/2011 | Ochs et al. |
| 8,046,986 | B2 | 11/2011 | Chillar et al. |
| 8,047,007 | B2 | 11/2011 | Zubrin et al. |
| 8,051,638 | B2 | 11/2011 | Aljabari et al. |
| 8,061,120 | B2 | 11/2011 | Hwang |
| 8,062,617 | B2 | 11/2011 | Stakhev et al. |
| 8,065,870 | B2 | 11/2011 | Jobson et al. |
| 8,065,874 | B2 | 11/2011 | Fong et al. |
| 8,074,439 | B2 | 12/2011 | Foret |
| 8,080,225 | B2 | 12/2011 | Dickinson et al. |
| 8,083,474 | B2 | 12/2011 | Hashimoto et al. |
| 8,096,105 | B2 * | 1/2012 | Porte ............... F02K 1/46 60/770 |
| 8,097,230 | B2 | 1/2012 | Mesters et al. |
| 8,101,146 | B2 | 1/2012 | Fedeyko et al. |
| 8,105,559 | B2 | 1/2012 | Melville et al. |
| 8,110,012 | B2 | 2/2012 | Chiu et al. |
| 8,117,825 | B2 | 2/2012 | Griffin et al. |
| 8,117,846 | B2 | 2/2012 | Wilbraham |
| 8,127,558 | B2 | 3/2012 | Bland et al. |
| 8,127,936 | B2 | 3/2012 | Liu et al. |
| 8,127,937 | B2 | 3/2012 | Liu et al. |
| 8,133,298 | B2 | 3/2012 | Lanyi et al. |
| 8,166,766 | B2 | 5/2012 | Draper |
| 8,167,960 | B2 | 5/2012 | Gil |
| 8,176,982 | B2 | 5/2012 | Gil et al. |
| 8,191,360 | B2 | 6/2012 | Fong et al. |
| 8,191,361 | B2 | 6/2012 | Fong et al. |
| 8,196,387 | B2 | 6/2012 | Shah et al. |
| 8,196,413 | B2 | 6/2012 | Mak |
| 8,201,402 | B2 | 6/2012 | Fong et al. |
| 8,205,455 | B2 | 6/2012 | Popovic |
| 8,206,669 | B2 | 6/2012 | Schaffer et al. |
| 8,209,192 | B2 | 6/2012 | Gil et al. |
| 8,215,105 | B2 | 7/2012 | Fong et al. |
| 8,220,247 | B2 | 7/2012 | Wijmans et al. |
| 8,220,248 | B2 | 7/2012 | Wijmans et al. |
| 8,220,268 | B2 | 7/2012 | Callas |
| 8,225,600 | B2 | 7/2012 | Theis |
| 8,226,912 | B2 | 7/2012 | Kloosterman et al. |
| 8,240,142 | B2 | 8/2012 | Fong et al. |
| 8,240,153 | B2 | 8/2012 | Childers et al. |
| 8,245,492 | B2 | 8/2012 | Draper |
| 8,245,493 | B2 | 8/2012 | Minto |
| 8,247,462 | B2 | 8/2012 | Boshoff et al. |
| 8,257,476 | B2 | 9/2012 | White et al. |
| 8,261,823 | B1 | 9/2012 | Hill et al. |
| 8,262,343 | B2 | 9/2012 | Hagen |
| 8,266,883 | B2 | 9/2012 | Ouellet et al. |
| 8,266,913 | B2 | 9/2012 | Snook et al. |
| 8,268,044 | B2 | 9/2012 | Wright et al. |
| 8,281,596 | B1 | 10/2012 | Rohrssen et al. |
| 8,316,665 | B2 | 11/2012 | Mak |
| 8,316,784 | B2 | 11/2012 | D'Agostini |
| 8,337,613 | B2 | 12/2012 | Zauderer |
| 8,347,600 | B2 | 1/2013 | Wichmann et al. |
| 8,348,551 | B2 | 1/2013 | Baker et al. |
| 8,359,868 | B2 * | 1/2013 | Conchieri ............ F01K 23/106 60/39.182 |
| 8,371,100 | B2 | 2/2013 | Draper |
| 8,372,251 | B2 | 2/2013 | Goller et al. |
| 8,377,184 | B2 | 2/2013 | Fujikawa et al. |
| 8,377,401 | B2 | 2/2013 | Darde et al. |
| 8,388,919 | B2 | 3/2013 | Hooper et al. |
| 8,397,482 | B2 | 3/2013 | Kraemer et al. |
| 8,398,757 | B2 | 3/2013 | Iijima et al. |
| 8,409,307 | B2 | 4/2013 | Drnevich et al. |
| 8,414,694 | B2 | 4/2013 | Iijima et al. |
| 8,424,282 | B2 | 4/2013 | Vollmer et al. |
| 8,424,601 | B2 | 4/2013 | Betzer-Zilevitch |
| 8,436,489 | B2 | 5/2013 | Stahlkopf et al. |
| 8,453,461 | B2 | 6/2013 | Draper |
| 8,453,462 | B2 | 6/2013 | Wichmann et al. |
| 8,453,583 | B2 | 6/2013 | Malavasi et al. |
| 8,454,350 | B2 | 6/2013 | Berry et al. |
| 8,475,160 | B2 | 7/2013 | Campbell et al. |
| 8,539,749 | B1 | 9/2013 | Wichmann et al. |
| 8,567,200 | B2 | 10/2013 | Brook et al. |
| 8,616,294 | B2 | 12/2013 | Zubrin et al. |
| 8,627,643 | B2 | 1/2014 | Chillar et al. |
| 8,726,665 | B2 * | 5/2014 | Moore ............... F02K 1/386 60/226.1 |
| 9,027,323 | B2 * | 5/2015 | Thies ............... F02K 1/386 60/226.3 |
| 9,512,759 | B2 * | 12/2016 | Muthaiah ............ F02C 3/34 |
| 2001/0000049 | A1 | 3/2001 | Kataoka et al. |
| 2001/0029732 | A1 | 10/2001 | Bachmann |
| 2001/0045090 | A1 | 11/2001 | Gray |
| 2002/0043063 | A1 | 4/2002 | Kataoka et al. |
| 2002/0053207 | A1 | 5/2002 | Finger et al. |
| 2002/0069648 | A1 | 6/2002 | Levy et al. |
| 2002/0187449 | A1 | 12/2002 | Doebbeling et al. |
| 2003/0005698 | A1 | 1/2003 | Keller |
| 2003/0131582 | A1 | 7/2003 | Anderson et al. |
| 2003/0134241 | A1 | 7/2003 | Marin et al. |
| 2003/0221409 | A1 | 12/2003 | McGowan |
| 2004/0006994 | A1 | 1/2004 | Walsh et al. |
| 2004/0068981 | A1 | 4/2004 | Siefker et al. |
| 2004/0166034 | A1 | 8/2004 | Kaefer |
| 2004/0170559 | A1 | 9/2004 | Hershkowitz et al. |
| 2004/0223408 | A1 | 11/2004 | Mathys et al. |
| 2004/0238654 | A1 | 12/2004 | Hagen et al. |
| 2005/0028529 | A1 | 2/2005 | Bartlett et al. |
| 2005/0144961 | A1 | 7/2005 | Colibaba-Evulet et al. |
| 2005/0197267 | A1 | 9/2005 | Zaki et al. |
| 2005/0229585 | A1 | 10/2005 | Webster |
| 2005/0236602 | A1 | 10/2005 | Viteri et al. |
| 2006/0112675 | A1 | 6/2006 | Anderson et al. |
| 2006/0158961 | A1 | 7/2006 | Ruscheweyh et al. |
| 2006/0183009 | A1 | 8/2006 | Berlowitz et al. |
| 2006/0196812 | A1 | 9/2006 | Beetge et al. |
| 2006/0248888 | A1 | 11/2006 | Geskes |
| 2007/0000242 | A1 | 1/2007 | Harmon et al. |
| 2007/0044475 | A1 | 3/2007 | Leser et al. |
| 2007/0044479 | A1 | 3/2007 | Brandt et al. |
| 2007/0089425 | A1 | 4/2007 | Motter et al. |
| 2007/0107430 | A1 | 5/2007 | Schmid et al. |
| 2007/0144747 | A1 | 6/2007 | Steinberg |
| 2007/0231233 | A1 | 10/2007 | Bose |
| 2007/0234702 | A1 | 10/2007 | Hagen et al. |
| 2007/0245736 | A1 | 10/2007 | Barnicki |
| 2007/0249738 | A1 | 10/2007 | Haynes et al. |
| 2007/0272201 | A1 | 11/2007 | Amano et al. |
| 2008/0000229 | A1 | 1/2008 | Kuspert et al. |
| 2008/0006561 | A1 | 1/2008 | Moran et al. |
| 2008/0010967 | A1 | 1/2008 | Griffin et al. |
| 2008/0034727 | A1 | 2/2008 | Sutikno |
| 2008/0038598 | A1 | 2/2008 | Berlowitz et al. |
| 2008/0047280 | A1 | 2/2008 | Dubar |
| 2008/0066443 | A1 | 3/2008 | Frutschi et al. |
| 2008/0115478 | A1 | 5/2008 | Sullivan |
| 2008/0118310 | A1 | 5/2008 | Graham |

(56) References Cited

U.S. PATENT DOCUMENTS

| | | |
|---|---|---|
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare et al. |
| 2008/0251234 A1 | 10/2008 | Wilson et al. |
| 2008/0290719 A1 | 11/2008 | Kaminsky et al. |
| 2008/0309087 A1 | 12/2008 | Evulet et al. |
| 2009/0000762 A1 | 1/2009 | Wilson et al. |
| 2009/0025390 A1 | 1/2009 | Christensen et al. |
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0157230 A1 | 6/2009 | Hibshman et al. |
| 2009/0193809 A1 | 8/2009 | Schroder et al. |
| 2009/0205334 A1 | 8/2009 | Aljabari et al. |
| 2009/0218821 A1 | 9/2009 | ElKady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0284013 A1 | 11/2009 | Anand et al. |
| 2009/0301054 A1 | 12/2009 | Simpson et al. |
| 2009/0301099 A1 | 12/2009 | Nigro |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | ElKady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ElKady et al. |
| 2011/0162353 A1 | 7/2011 | Vanvolsem et al. |
| 2011/0167785 A1 | 7/2011 | Moore et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0067025 A1 | 3/2012 | Thies |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |
| 2014/0060073 A1 | 3/2014 | Slobodyanskiy et al. |
| 2014/0123620 A1 | 5/2014 | Huntington et al. |
| 2014/0123624 A1 | 5/2014 | Minto |
| 2014/0123659 A1 | 5/2014 | Biyani et al. |
| 2014/0123660 A1 | 5/2014 | Stoia et al. |
| 2014/0123668 A1 | 5/2014 | Huntington et al. |
| 2014/0123669 A1 | 5/2014 | Huntington et al. |
| 2014/0123672 A1 | 5/2014 | Huntington et al. |

FOREIGN PATENT DOCUMENTS

| | | | |
|---|---|---|---|
| CN | 101031713 A | 9/2007 | |
| CN | 101292083 A | 10/2008 | |
| CN | 102953830 A | 3/2013 | |
| EP | 0770771 | 5/1997 | |
| EP | 1010884 A1 | 6/2000 | |
| FR | 1231220 A | 9/1960 | |
| FR | 1318785 A | 1/1963 | |
| GB | 0776269 | 6/1957 | |
| GB | 1427990 A * | 3/1976 | ............. F02K 1/386 |
| GB | 2117053 | 10/1983 | |
| WO | WO9906674 | 2/1999 | |
| WO | WO9963210 | 12/1999 | |
| WO | WO2007068682 | 6/2007 | |
| WO | WO2008142009 | 11/2008 | |
| WO | WO2011003606 | 1/2011 | |
| WO | WO2012003489 | 1/2012 | |
| WO | WO2012128928 | 9/2012 | |
| WO | WO2012128929 | 9/2012 | |
| WO | WO2012170114 | 12/2012 | |
| WO | WO2013147632 | 10/2013 | |
| WO | WO2013147633 | 10/2013 | |
| WO | WO2013155214 | 10/2013 | |
| WO | WO2013163045 | 10/2013 | |
| WO | WO2014071118 | 5/2014 | |
| WO | WO2014071215 | 5/2014 | |

OTHER PUBLICATIONS

PCT/RU2013/000162, filed Feb. 28, 2013, General Electric Company.
U.S. Appl. No. 14/067/679, filed Oct. 30, 2013, Fadde et al.
U.S. Appl. No. 14/067/714, filed Oct. 30, 2013, Antoniono et al.
U.S. Appl. No. 14/067/726, filed Oct. 30, 2013, Antoniono et al.
U.S. Appl. No. 14/067/731, filed Oct. 30, 2013, Antoniono et al.

(56) References Cited

OTHER PUBLICATIONS

U.S. Appl. No. 14/067/739, filed Oct. 30, 2013, Antoniono et al.
U.S. Appl. No. 14/067/797, filed Oct. 31, 2013, Krull et al.
U.S. Appl. No. 14/135/055, filed Dec. 12, 2013, Biyani et al.
Ahmed, S. et al. (1998) "Catalytic Partial Oxidation Reforming of Hydrocarbon Fuels," 1998 Fuel Cell Seminar, 7 pgs.
Air Products and Chemicals, Inc. (2008) "Air Separation Technology—Ion Transport Membrane (ITM)," www.airproducts.com/ASUsales, 3 pgs.
Air Products and Chemicals, Inc. (2011) "Air Separation Technology Ion Transport Membrane (ITM)," www.airproducts.com/gasification, 4 pgs.
Anderson, R. E. (2006) "Durability and Reliability Demonstration of a Near-Zero-Emission Gas-Fired Power Plant," California Energy Comm., CEC 500-2006-074, 80 pgs.
Baxter, E. et al. (2003) "Fabricate and Test an Advanced Non-Polluting Turbine Drive Gas Generator," U. S. Dept. of Energy, Nat'l Energy Tech. Lab., DE-FC26-00NT 40804, 51 pgs.
Bolland, O. et al. (1998) "Removal of CO2 From Gas Turbine Power Plants Evaluation of Pre- and Postcombustion Methods," SINTEF Group, www.energy.sintef.no/publ/xergi/98/3/art-8engelsk.htm, 11 pgs.
BP Press Release (2006) "BP and Edison Mission Group Plan Major Hydrogen Power Project for California," www.bp.com/hydrogenpower, 2 pgs.
Bryngelsson, M. et al. (2005) "Feasibility Study of $CO_2$ Removal From Pressurized Flue Gas in a Fully Fired Combined Cycle—The Sargas Project," KTH—Royal Institute of Technology, Dept. of Chemical Engineering and Technology, 9 pgs.
Clark, Hal (2002) "Development of a Unique Gas Generator for a Non-Polluting Power Plant," California Energy Commission Feasibility Analysis, P500-02-011F, 42 pgs.
Foy, Kirsten et al. (2005) "Comparison of Ion Transport Membranes" Fourth Annual Conference on Carbon Capture and Sequestration, DOE/NETL; 11 pgs.
Cho, J. H. et al. (2005) "Marrying LNG and Power Generation," Energy Markets; 10, 8; ABI/INFORM Trade & Industry, 5 pgs.
Ciulia, Vincent. (2001-2003) "Auto Repair. How the Engine Works," http://autorepair.about.com/cs/generalinfo/a/aa060500a.htm , 1 page.
Corti, A. et al. (1988) "Athabasca Mineable Oil Sands: The RTR/Gulf Extraction Process Theoretical Model of Bitumen Detachment," $4^{th}$ UNITAR/UNDP Int'l Conf. on Heavy Crude and Tar Sands Proceedings, v.5, paper No. 81, Edmonton, AB, Canada, 4 pgs.
Science Clarified (2012) "Cryogenics," http://www.scienceclarified.com/Co-Di/Cryogenics.html; 6 pgs.
Defrate, L. A. et al. (1959) "Optimum Design of Ejector Using Digital Computers" Chem. Eng. Prog. Symp. Ser., 55 ( 21), 12 pgs.
Ditaranto, M. et al. (2006) "Combustion Instabilities in Sudden Expansion Oxy-Fuel Flames," ScienceDirect, Combustion and Flame, v.146, 20 pgs.
Elwell, L. C. et al. (2005) "Technical Overview of Carbon Dioxide Capture Technologies for Coal-Fired Power Plants," MPR Associates, Inc., www.mpr.com/uploads/news/co2-capture-coal-fired.pdf, 15 pgs.
Eriksson, Sara. (2005) "Development of Methane Oxidation Catalysts for Different Gas Turbine Combustor Concepts." KTH—The Royal Institute of Technology, Department of Chemical Engineering and Technology, Chemical Technology, Licentiate Thesis, Stockholm Sweden; 45 pgs.
Ertesvag, I. S. et al. (2005) "Exergy Analysis of a Gas-Turbine Combined-Cycle Power Plant With Precombustion $CO_2$ Capture," Elsevier, 35 pgs.
ElKady, Ahmed M. et al. (2009) "Application of Exhaust Gas Recirculation in a DLN F-Class Combustion System for Postcombustion Carbon Capture," ASME J. Engineering for Gas Turbines and Power, vol. 131, 6 pgs.
Evulet, Andrei T. et al. (2009) "On the Performance and Operability of Ge's Dry Low $NO_x$ Combustors utilizing Exhaust Gas Recirculation for Post-Combustion Carbon Capture" Energy Procedia I, 8 pgs.
Caldwell Energy Company (2011) "Wet Compression"; IGTI 2011—CTIC Wet Compression, http://www.turbineinletcooling.org/resources/papers/CTIC_WetCompression_Shepherd_ASMETurboExpo2011.pdf , 22 pgs.
Luby, P. et al. (2003) "Zero Carbon Power Generation: IGCC as the Premium Option," Powergen International, 19 pgs.
MacAdam, S. et al. (2007) "Coal-Based Oxy-Fuel System Evaluation and Combustor Development," Clean Energy Systems, Inc.; presented at the $2^{nd}$ International Freiberg Conference on IGCC & XtL Technologies, 6 pgs.
Morehead, H. (2007) "Siemens Global Gasification and IGCC Update," Siemens, Coal-Gen, 17 pgs.
Nanda, R. et al. (2007) "Utilizing Air Based Technologies as Heat Source for LNG Vaporization," presented at the $86^{th}$ Annual convention of the Gas Processors of America (GPA 2007), , San Antonia, TX; 13 pgs.
Reeves, S. R. (2001) "Geological Sequestration of $CO_2$ in Deep, Unmineable Coalbeds: An Integrated Research and Commercial-Scale Field Demonstration Project," SPE 71749; presented at the 2001 SPE Annual Technical Conference and Exhibition, New Orleans, Louisiana, 10 pgs.
Reeves, S. R. (2003) "Enhanced Coalbed Methane Recovery," Society of Petroleum Engineers 101466-DL; SPE Distinguished Lecture Series, 8 pgs.
Richards, Geo A., et al. (2001) "Advanced Steam Generators." National Energy Technology Lab., Pittsburgh, PA, and Morgantown, WV; NASA Glenn Research Center (US). 7 pgs.
Rosetta, M. J. et al. (2006) "Integrating Ambient Air Vaporization Technology with Waste Heat Recovery—A Fresh Approach to LNG Vaporization," presented at the $85^{th}$ annual convention of the Gas Processors of America (GPA 2006), Grapevine, Texas, 22 pgs.
Snarheim, D. et al. (2006) "Control Design for a Gas Turbine Cycle With $CO_2$ Capture Capabilities," Modeling, Identification and Control, vol. 00; presented at the $16^{th}$ IFAC World Congress, Prague, Czech Republic, 10 pgs.
Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," Department of Energy and Process Eng., Norwegian Univ. of Science and Technology, 9 pgs.
van Hemert, P. et al. (2006) "Adsorption of Carbon Dioxide and a Hydrogen-Carbon Dioxide Mixture," Intn'l Coalbed Methane Symposium (Tuscaloosa, AL) Paper 0615, 9 pgs.
Zhu, J. et al. (2002) "Recovery of Coalbed Methane by Gas Injection," Society of Petroleum Engineers 75255; presented at the 2002 SPE Annual Technical Conference and Exhibition, Tulsa, Oklahoma, 15 pgs.
PCT International Search Report and Written Opinion; Application No. PCT/US2014/042807; Dated Nov. 7, 2014; 10 pages.
CN First Office Action and English Translation; Application No. CN 201480047249.6; Dated Dec. 14, 2016; 29 pages.

\* cited by examiner

SYSTEM AND METHOD FOR EXHAUSTING COMBUSTION GASES FROM GAS TURBINE ENGINES

CROSS-REFERENCE TO RELATED APPLICATIONS

This application claims priority to and benefit of U.S. Provisional Patent Application No. 61/841,209, entitled "SYSTEM AND METHOD FOR EXHAUSTING COMBUSTION GASES FROM GAS TURBINE ENGINES," filed on Jun. 28, 2013, which is hereby incorporated by reference in its entirety for all purposes.

BACKGROUND

The subject matter disclosed herein relates to gas turbine engines, and more specifically, to systems and methods for exhausting combustion gases from gas turbine engines.

Gas turbine engines are used in a wide variety of applications, such as power generation, aircraft, and various machinery. Gas turbine engines generally combust a fuel with an oxidant (e.g., air) in a combustor section to generate hot combustion products, which then drive one or more turbine stages of a turbine section. In turn, the turbine section drives one or more compressor stages of a compressor section. Again, the fuel and oxidant mix in the combustor section, and then combust to produce the hot combustion products. The thermal energy of the hot combustion products from the turbine section may be used to produce steam. However, the hot combustion products may be treated before being used to produce the steam. For example, a catalyst may be used to treat the hot combustion products to reduce the amounts of certain compounds. Unfortunately, inadequate mixing and/or distribution of the hot combustion products before contacting the catalyst may degrade catalyst performance and/or shorten the life of the catalyst. Furthermore, gas turbine engines typically consume a vast amount of air as the oxidant, and output a considerable amount of exhaust gas into the atmosphere. In other words, the exhaust gas is typically wasted as a byproduct of the gas turbine operation.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a gas turbine engine that includes a combustor section having one or more combustors configured to generate combustion products and a turbine section having one or more turbine stages between an upstream end and a downstream end. The one or more turbine stages are driven by the combustion products. The gas turbine engine also includes an exhaust section disposed downstream from the downstream end of the turbine section. The exhaust section has an exhaust passage configured to receive the combustion products as an exhaust gas. The gas turbine engine also includes a mixing device disposed in the exhaust section. The mixing device is configured to divide the exhaust gas into a first exhaust gas and a second exhaust gas, and to combine the first and second exhaust gases in a mixing region to produce a mixed exhaust gas.

In a second embodiment, a system includes a turbine exhaust section configured to mount downstream from a turbine section of a gas turbine engine. The turbine exhaust section includes an exhaust passage configured to receive exhaust gas from the turbine section. The system also includes a mixing device disposed in the turbine exhaust section. The mixing device is configured to divide the exhaust gas into a first exhaust gas and a second exhaust gas, and to combine the first and second exhaust gases to produce a mixed exhaust gas.

In a third embodiment, a system includes a turbine mixing device configured to mount in a turbine exhaust section of a gas turbine engine. The mixing device includes a first section configured to convey an inner portion of an exhaust gas from the turbine exhaust section to a mixing region, and a second section configured to convey an outer portion of the exhaust gas to the mixing region. The second section circumferentially surrounds the first section, and the mixing region is configured to mix the inner and outer portions of the exhaust gas to produce a mixed exhaust gas.

In a fourth embodiment, a method includes combusting a fuel with an oxidant and an exhaust gas in a combustion portion of a turbine combustor to generate combustion products, driving a turbine with the combustion products from the turbine combustor, expanding the combustion products from the turbine through an exhaust passage in an exhaust section, dividing the combustion products from the exhaust section into a first exhaust gas and a second exhaust gas using a mixing device, and combining the first and second exhaust gases to produce a mixed exhaust gas using the mixing device such that a downstream radial uniformity of the mixed exhaust gas is greater than an upstream radial uniformity of the combustion products.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
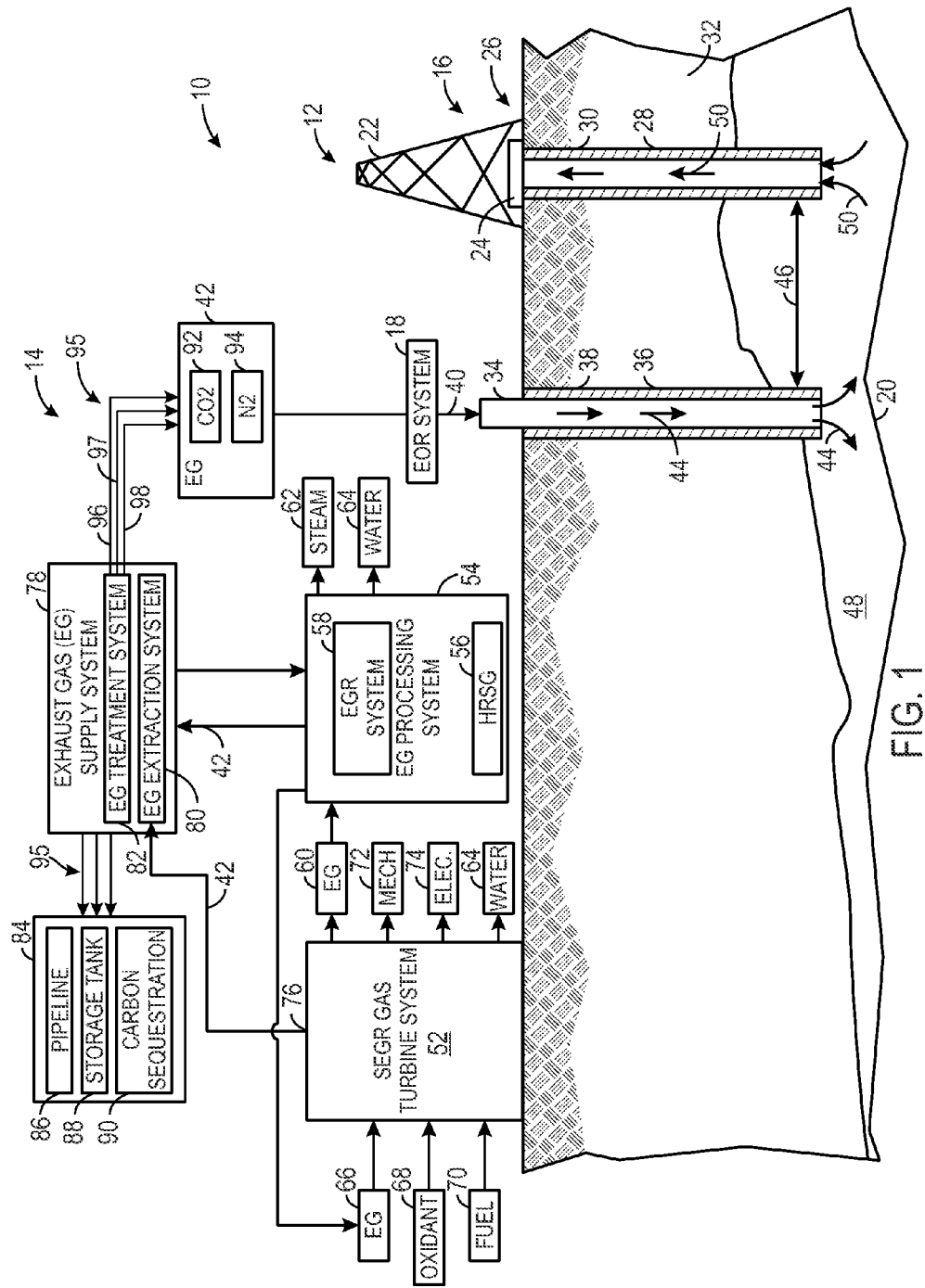
FIG. 1 is a diagram of an embodiment of a system having a turbine-based service system coupled to a hydrocarbon production system.

One or more specific embodiments of the present invention will be described below. In an effort to provide a concise description of these embodiments, all features of an actual implementation may not be described in the specification. It should be appreciated that in the development of any such actual implementation, as in an engineering or design project, numerous implementation-specific decisions are made to achieve the specific goals, such as compliance with system-related and/or business-related constraints, which may vary from one implementation to another. Moreover, it should be appreciated that such effort might be complex and time consuming, but would nevertheless be a routine undertaking of design, fabrication, and manufacture for those of ordinary skill having the benefit of this disclosure.

Detailed example embodiments are disclosed herein. However, specific structural and functional details disclosed herein are merely representative for purposes of describing example embodiments. Embodiments of the present invention may, however, be embodied in many alternate forms, and should not be construed as limited to only the embodiments set forth herein.

Accordingly, while example embodiments are capable of various modifications and alternative forms, embodiments thereof are illustrated by way of example in the figures and will herein be described in detail. It should be understood, however, that there is no intent to limit example embodiments to the particular forms disclosed, but to the contrary, example embodiments are to cover all modifications, equivalents, and alternatives falling within the scope of the present invention.

The terminology used herein is for describing particular embodiments only and is not intended to be limiting of example embodiments. As used herein, the singular forms "a", "an" and "the" are intended to include the plural forms as well, unless the context clearly indicates otherwise. The terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Although the terms first, second, primary, secondary, etc. may be used herein to describe various elements, these elements should not be limited by these terms. These terms are only used to distinguish one element from another. For example, but not limiting to, a first element could be termed a second element, and, similarly, a second element could be termed a first element, without departing from the scope of example embodiments. As used herein, the term "and/or" includes any, and all, combinations of one or more of the associated listed items.

Certain terminology may be used herein for the convenience of the reader only and is not to be taken as a limitation on the scope of the invention. For example, words such as "upper", "lower", "left", "right", "front", "rear", "top", "bottom", "horizontal", "vertical", "upstream", "downstream", "fore", "aft", and the like; merely describe the configuration shown in the FIGS. Indeed, the element or elements of an embodiment of the present invention may be oriented in any direction and the terminology, therefore, should be understood as encompassing such variations unless specified otherwise.

As discussed in detail below, the disclosed embodiments relate generally to gas turbine systems with exhaust gas recirculation (EGR), and particularly stoichiometric operation of the gas turbine systems using EGR. For example, the gas turbine systems may be configured to recirculate the exhaust gas along an exhaust recirculation path, stoichiometrically combust fuel and oxidant along with at least some of the recirculated exhaust gas, and capture the exhaust gas for use in various target systems. The recirculation of the exhaust gas along with stoichiometric combustion may help to increase the concentration level of carbon dioxide ($CO_2$) in the exhaust gas, which can then be post treated to separate and purify the $CO_2$ and nitrogen ($N_2$) for use in various target systems. The gas turbine systems also may employ various exhaust gas processing (e.g., heat recovery, catalyst reactions, etc.) along the exhaust recirculation path, thereby increasing the concentration level of $CO_2$, reducing concentration levels of other emissions (e.g., carbon monoxide, nitrogen oxides, and unburnt hydrocarbons), and increasing energy recovery (e.g., with heat recovery units). Furthermore, the gas turbine engines may be configured to combust the fuel and oxidant with one or more diffusion flames (e.g., using diffusion fuel nozzles), premix flames (e.g., using premix fuel nozzles), or any combination thereof. In certain embodiments, the diffusion flames may help to maintain stability and operation within certain limits for stoichiometric combustion, which in turn helps to increase production of $CO_2$. For example, a gas turbine system operating with diffusion flames may enable a greater quantity of EGR, as compared to a gas turbine system operating with premix flames. In turn, the increased quantity of EGR helps to increase $CO_2$ production. Possible target systems include pipelines, storage tanks, carbon sequestration systems, and hydrocarbon production systems, such as enhanced oil recovery (EOR) systems.

The disclosed embodiments provide systems and methods having a mixing device coupled to an exhaust section of a gas turbine engine with EGR. The gas turbine engine may include a combustor section having one or more combustors configured to generate combustion products. The gas turbine engine may also include a turbine section having one or more turbine stages between an upstream end and a downstream end. The one or more turbine stages may be driven by the combustion products. The gas turbine engine may also include an exhaust section disposed downstream from the downstream end of the turbine section. The exhaust section may include an exhaust passage configured to receive the combustion products as an exhaust gas. Further, the gas turbine engine may include the mixing device coupled to the exhaust section. The mixing device may divide the exhaust gas into a first exhaust gas and a second exhaust gas. In addition, the mixing device may combine the first and second exhaust gases in a mixing region to produce a mixed exhaust gas. In certain embodiments, the exhaust gas entering the mixing device may have a nonuniform distribution, such as a nonuniform radial distribution and/or a nonuniform circumferential distribution. For example, an inner portion of the exhaust gas may have different characteristics than an outer portion of the exhaust gas. Specifically, a pressure, temperature, flow rate, and/or composition of the inner portion of the exhaust gas may be different from the outer portion of the exhaust gas.

The different characteristics between the inner and outer portions of the exhaust gas may affect the operation of equipment and/or processes downstream from the exhaust section. For example, a catalyst may be disposed downstream from the exhaust section to reduce amounts of certain components from the exhaust gas. The catalyst performance may be negatively affected by the difference in compositions between the inner and outer portions of the exhaust gas. For example, certain portions of the catalyst may be used up or fouled at a faster rate than other portions of the catalyst. As described in detail below, embodiments of the mixing device may improve the radial and/or circumferential uniformity of the exhaust gas. Specifically, the mixing device may divide the exhaust gas into the first and second exhaust gases, which may correspond to the inner and outer portions of the exhaust gas described above. The mixing device may combine the first and second exhaust gases in the mixing region to produce the mixed exhaust gas, which may have properties reflective of both the first and second exhaust gases. Thus, instead of the catalyst receiving first and second exhaust gases with different properties, the mixing device provides the mixed exhaust gas characterized by a uniform property to the catalyst. By using the mixing device to provide the mixed exhaust gas to the catalyst, catalyst performance may be improved. In addition, in certain embodiments, the mixing device may be characterized by a low pressure drop, which may improve the pressure recovery of the exhaust section of the gas turbine engine. Therefore, embodiments of the mixing device may improve the overall efficiency and cost-effectiveness of the gas turbine engine.

FIG. 1 is a diagram of an embodiment of a system 10 having an hydrocarbon production system 12 associated with a turbine-based service system 14. As discussed in further detail below, various embodiments of the turbine-based service system 14 are configured to provide various services, such as electrical power, mechanical power, and fluids (e.g., exhaust gas), to the hydrocarbon production system 12 to facilitate the production or retrieval of oil and/or gas. In the illustrated embodiment, the hydrocarbon production system 12 includes an oil/gas extraction system 16 and an enhanced oil recovery (EOR) system 18, which are coupled to a subterranean reservoir 20 (e.g., an oil, gas, or hydrocarbon reservoir). The oil/gas extraction system 16 includes a variety of surface equipment 22, such as a Christmas tree or production tree 24, coupled to an oil/gas well 26. Furthermore, the well 26 may include one or more tubulars 28 extending through a drilled bore 30 in the earth 32 to the subterranean reservoir 20. The tree 24 includes one or more valves, chokes, isolation sleeves, blowout preventers, and various flow control devices, which regulate pressures and control flows to and from the subterranean reservoir 20. While the tree 24 is generally used to control the flow of the production fluid (e.g., oil or gas) out of the subterranean reservoir 20, the EOR system 18 may increase the production of oil or gas by injecting one or more fluids into the subterranean reservoir 20.

Accordingly, the EOR system 18 may include a fluid injection system 34, which has one or more tubulars 36 extending through a bore 38 in the earth 32 to the subterranean reservoir 20. For example, the EOR system 18 may route one or more fluids 40, such as gas, steam, water, chemicals, or any combination thereof, into the fluid injection system 34. For example, as discussed in further detail below, the EOR system 18 may be coupled to the turbine-based service system 14, such that the system 14 routes an exhaust gas 42 (e.g., substantially or entirely free of oxygen) to the EOR system 18 for use as the injection fluid 40. The fluid injection system 34 routes the fluid 40 (e.g., the exhaust gas 42) through the one or more tubulars 36 into the subterranean reservoir 20, as indicated by arrows 44. The injection fluid 40 enters the subterranean reservoir 20 through the tubular 36 at an offset distance 46 away from the tubular 28 of the oil/gas well 26. Accordingly, the injection fluid 40 displaces the oil/gas 48 disposed in the subterranean reservoir 20, and drives the oil/gas 48 up through the one or more tubulars 28 of the hydrocarbon production system 12, as indicated by arrows 50. As discussed in further detail below, the injection fluid 40 may include the exhaust gas 42 originating from the turbine-based service system 14, which is able to generate the exhaust gas 42 on-site as needed by the hydrocarbon production system 12. In other words, the turbine-based system 14 may simultaneously generate one or more services (e.g., electrical power, mechanical power, steam, water (e.g., desalinated water), and exhaust gas (e.g., substantially free of oxygen)) for use by the hydrocarbon production system 12, thereby reducing or eliminating the reliance on external sources of such services.

In the illustrated embodiment, the turbine-based service system 14 includes a stoichiometric exhaust gas recirculation (SEGR) gas turbine system 52 and an exhaust gas (EG) processing system 54. The gas turbine system 52 may be configured to operate in a stoichiometric combustion mode of operation (e.g., a stoichiometric control mode) and a non-stoichiometric combustion mode of operation (e.g., a non-stoichiometric control mode), such as a fuel-lean control mode or a fuel-rich control mode. In the stoichiometric control mode, the combustion generally occurs in a substantially stoichiometric ratio of a fuel and oxidant, thereby resulting in substantially stoichiometric combustion. In particular, stoichiometric combustion generally involves consuming substantially all of the fuel and oxidant in the combustion reaction, such that the products of combustion are substantially or entirely free of unburnt fuel and oxidant. One measure of stoichiometric combustion is the equivalence ratio, or phi ($\Phi$), which is the ratio of the actual fuel/oxidant ratio relative to the stoichiometric fuel/oxidant ratio. An equivalence ratio of greater than 1.0 results in a fuel-rich combustion of the fuel and oxidant, whereas an equivalence ratio of less than 1.0 results in a fuel-lean combustion of the fuel and oxidant. In contrast, an equivalence ratio of 1.0 results in combustion that is neither fuel-rich nor fuel-lean, thereby substantially consuming all of the fuel and oxidant in the combustion reaction. In context of the disclosed embodiments, the term stoichiometric or substantially stoichiometric may refer to an equivalence ratio of approximately 0.95 to approximately 1.05. However, the disclosed embodiments may also include an equivalence ratio of 1.0 plus or minus 0.01, 0.02, 0.03, 0.04, 0.05, or more. Again, the stoichiometric combustion of fuel and oxidant in the turbine-based service system 14 may result in products of combustion or exhaust gas (e.g., 42) with substantially no unburnt fuel or oxidant remaining. For example, the exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, the exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. However, the disclosed embodiments also may produce other ranges of residual fuel, oxidant, and other emissions levels in the exhaust gas 42. As used herein, the terms emissions, emissions levels, and emissions targets may refer to concentration levels of certain products of combustion (e.g., $NO_X$, CO, $SO_X$, $O_2$, $N_2$, $H_2$, HCs, etc.), which may be present in recirculated gas streams, vented gas streams (e.g., exhausted into the atmosphere), and gas streams used in various target systems (e.g., the hydrocarbon production system 12).

Although the SEGR gas turbine system 52 and the EG processing system 54 may include a variety of components in different embodiments, the illustrated EG processing system 54 includes a heat recovery steam generator (HRSG) 56 and an exhaust gas recirculation (EGR) system 58, which receive and process an exhaust gas 60 originating from the SEGR gas turbine system 52. The HRSG 56 may include one or more heat exchangers, condensers, and various heat recovery equipment, which collectively function to transfer heat from the exhaust gas 60 to a stream of water, thereby generating steam 62. The steam 62 may be used in one or more steam turbines, the EOR system 18, or any other portion of the hydrocarbon production system 12. For example, the HRSG 56 may generate low pressure, medium pressure, and/or high pressure steam 62, which may be selectively applied to low, medium, and high pressure steam turbine stages, or different applications of the EOR system 18. In addition to the steam 62, a treated water 64, such as a desalinated water, may be generated by the HRSG 56, the EGR system 58, and/or another portion of the EG processing system 54 or the SEGR gas turbine system 52. The treated water 64 (e.g., desalinated water) may be particularly useful in areas with water shortages, such as inland or desert regions. The treated water 64 may be generated, at least in part, due to the large volume of air driving combustion of fuel within the SEGR gas turbine system 52. While the on-site generation of steam 62 and water 64 may be beneficial in many applications (including the hydrocarbon production system 12), the on-site generation of exhaust gas 42, 60 may be particularly beneficial for the EOR system 18, due to its low oxygen content, high pressure, and heat derived from the SEGR gas turbine system 52. Accordingly, the HRSG 56, the EGR system 58, and/or another portion of the EG processing system 54 may output or recirculate an exhaust gas 66 into the SEGR gas turbine system 52, while also routing the exhaust gas 42 to the EOR system 18 for use with the hydrocarbon production system 12. Likewise, the exhaust gas 42 may be extracted directly from the SEGR gas turbine system 52 (i.e., without passing through the EG processing system 54) for use in the EOR system 18 of the hydrocarbon production system 12.

The exhaust gas recirculation is handled by the EGR system 58 of the EG processing system 54. For example, the EGR system 58 includes one or more conduits, valves, blowers, exhaust gas treatment systems (e.g., filters, particulate removal units, gas separation units, gas purification units, heat exchangers, heat recovery units, moisture removal units, catalyst units, chemical injection units, or any combination thereof), and controls to recirculate the exhaust gas along an exhaust gas circulation path from an output (e.g., discharged exhaust gas 60) to an input (e.g., intake exhaust gas 66) of the SEGR gas turbine system 52. In the illustrated embodiment, the SEGR gas turbine system 52 intakes the exhaust gas 66 into a compressor section having one or more compressors, thereby compressing the exhaust gas 66 for use in a combustor section along with an intake of an oxidant 68 and one or more fuels 70. The oxidant 68 may include ambient air, pure oxygen, oxygen-enriched air, oxygen-reduced air, oxygen-nitrogen mixtures, or any suitable oxidant that facilitates combustion of the fuel 70. The fuel 70 may include one or more gas fuels, liquid fuels, or any combination thereof. For example, the fuel 70 may include natural gas, liquefied natural gas (LNG), syngas, methane, ethane, propane, butane, naphtha, kerosene, diesel fuel, ethanol, methanol, biofuel, or any combination thereof.

The SEGR gas turbine system 52 mixes and combusts the exhaust gas 66, the oxidant 68, and the fuel 70 in the combustor section, thereby generating hot combustion gases or exhaust gas 60 to drive one or more turbine stages in a turbine section. In certain embodiments, each combustor in the combustor section includes one or more premix fuel nozzles, one or more diffusion fuel nozzles, or any combination thereof. For example, each premix fuel nozzle may be configured to mix the oxidant 68 and the fuel 70 internally within the fuel nozzle and/or partially upstream of the fuel nozzle, thereby injecting an oxidant-fuel mixture from the fuel nozzle into the combustion zone for a premixed combustion (e.g., a premixed flame). By further example, each diffusion fuel nozzle may be configured to isolate the flows of oxidant 68 and fuel 70 within the fuel nozzle, thereby separately injecting the oxidant 68 and the fuel 70 from the fuel nozzle into the combustion zone for diffusion combustion (e.g., a diffusion flame). In particular, the diffusion combustion provided by the diffusion fuel nozzles delays mixing of the oxidant 68 and the fuel 70 until the point of initial combustion, i.e., the flame region. In embodiments employing the diffusion fuel nozzles, the diffusion flame may provide increased flame stability, because the diffusion flame generally forms at the point of stoichiometry between the separate streams of oxidant 68 and fuel 70 (i.e., as the oxidant 68 and fuel 70 are mixing). In certain embodiments, one or more diluents (e.g., the exhaust gas 60, steam, nitrogen, or another inert gas) may be pre-mixed with the oxidant 68, the fuel 70, or both, in either the diffusion fuel nozzle or the premix fuel nozzle. In addition, one or more diluents (e.g., the exhaust gas 60, steam, nitrogen, or another inert gas) may be injected into the combustor at or downstream from the point of combustion within each combustor. The use of these diluents may help temper the flame (e.g., premix flame or diffusion flame), thereby helping to reduce $NO_X$ emissions, such as nitrogen monoxide (NO) and nitrogen dioxide ($NO_2$). Regardless of the type of flame, the combustion produces hot combustion gases or exhaust gas 60 to drive one or more turbine stages. As each turbine stage is driven by the exhaust gas 60, the SEGR gas turbine system 52 generates a mechanical power 72 and/or an electrical power 74 (e.g., via an electrical generator). The system 52 also outputs the exhaust gas 60, and may further output water 64. Again, the water 64 may be a treated water, such as a desalinated water, which may be useful in a variety of applications on-site or off-site.

Exhaust extraction is also provided by the SEGR gas turbine system 52 using one or more extraction points 76. For example, the illustrated embodiment includes an exhaust gas (EG) supply system 78 having an exhaust gas (EG) extraction system 80 and an exhaust gas (EG) treatment system 82, which receive exhaust gas 42 from the extraction points 76, treat the exhaust gas 42, and then supply or distribute the exhaust gas 42 to various target systems. The target systems may include the EOR system 18 and/or other systems, such as a pipeline 86, a storage tank 88, or a carbon sequestration system 90. The EG extraction system 80 may include one or more conduits, valves, controls, and flow separations, which facilitate isolation of the exhaust gas 42 from the oxidant 68, the fuel 70, and other contaminants, while also controlling the temperature, pressure, and flow rate of the extracted exhaust gas 42. The EG treatment system 82 may include one or more heat exchangers (e.g., heat recovery units such as heat recovery steam generators, condensers, coolers, or heaters), catalyst systems (e.g., oxidation catalyst systems), particulate and/or water removal systems (e.g., gas dehydration units, inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, exhaust gas compressors, any combination thereof. These subsystems of the EG treatment system 82 enable control of the temperature, pressure, flow rate, moisture content (e.g., amount of water removal), particulate content (e.g., amount of particulate removal), and gas composition (e.g., percentage of $CO_2$, $N_2$, etc.).

The extracted exhaust gas 42 is treated by one or more subsystems of the EG treatment system 82, depending on the target system. For example, the EG treatment system 82 may direct all or part of the exhaust gas 42 through a carbon capture system, a gas separation system, a gas purification system, and/or a solvent based treatment system, which is controlled to separate and purify a carbonaceous gas (e.g., carbon dioxide) 92 and/or nitrogen ($N_2$) 94 for use in the various target systems. For example, embodiments of the EG treatment system 82 may perform gas separation and purification to produce a plurality of different streams 95 of exhaust gas 42, such as a first stream 96, a second stream 97, and a third stream 98. The first stream 96 may have a first composition that is rich in carbon dioxide and/or lean in nitrogen (e.g., a $CO_2$ rich, $N_2$ lean stream). The second stream 97 may have a second composition that has intermediate concentration levels of carbon dioxide and/or nitrogen (e.g., intermediate concentration $CO_2$, $N_2$ stream). The third stream 98 may have a third composition that is lean in carbon dioxide and/or rich in nitrogen (e.g., a $CO_2$ lean, $N_2$ rich stream). Each stream 95 (e.g., 96, 97, and 98) may include a gas dehydration unit, a filter, a gas compressor, or any combination thereof, to facilitate delivery of the stream 95 to a target system. In certain embodiments, the $CO_2$ rich, $N_2$ lean stream 96 may have a $CO_2$ purity or concentration level of greater than approximately 70, 75, 80, 85, 90, 95, 96, 97, 98, or 99 percent by volume, and a $N_2$ purity or concentration level of less than approximately 1, 2, 3, 4, 5, 10, 15, 20, 25, or 30 percent by volume. In contrast, the $CO_2$ lean, $N_2$ rich stream 98 may have a $CO_2$ purity or concentration level of less than approximately 1, 2, 3, 4, 5, 10, 15, 20, 25, or 30 percent by volume, and a $N_2$ purity or concentration level of greater than approximately 70, 75, 80, 85, 90, 95, 96, 97, 98, or 99 percent by volume. The intermediate concentration $CO_2$, $N_2$ stream 97 may have a $CO_2$ purity or concentration level and/or a $N_2$ purity or concentration level of between approximately 30 to 70, 35 to 65, 40 to 60, or 45 to 55 percent by volume. Although the foregoing ranges are merely non-limiting examples, the $CO_2$ rich, $N_2$ lean stream 96 and the $CO_2$ lean, $N_2$ rich stream 98 may be particularly well suited for use with the EOR system 18 and the other systems 84. However, any of these rich, lean, or intermediate concentration $CO_2$ streams 95 may be used, alone or in various combinations, with the EOR system 18 and the other systems 84. For example, the EOR system 18 and the other systems 84 (e.g., the pipeline 86, storage tank 88, and the carbon sequestration system 90) each may receive one or more $CO_2$ rich, $N_2$ lean streams 96, one or more $CO_2$ lean, $N_2$ rich streams 98, one or more intermediate concentration $CO_2$, $N_2$ streams 97, and one or more untreated exhaust gas 42 streams (i.e., bypassing the EG treatment system 82).

The EG extraction system 80 extracts the exhaust gas 42 at one or more extraction points 76 along the compressor section, the combustor section, and/or the turbine section, such that the exhaust gas 42 may be used in the EOR system 18 and other systems 84 at suitable temperatures and pressures. The EG extraction system 80 and/or the EG treatment system 82 also may circulate fluid flows (e.g., exhaust gas 42) to and from the EG processing system 54. For example, a portion of the exhaust gas 42 passing through the EG processing system 54 may be extracted by the EG extraction system 80 for use in the EOR system 18 and the other systems 84. In certain embodiments, the EG supply system 78 and the EG processing system 54 may be independent or integral with one another, and thus may use independent or common subsystems. For example, the EG treatment system 82 may be used by both the EG supply system 78 and the EG processing system 54. Exhaust gas 42 extracted from the EG processing system 54 may undergo multiple stages of gas treatment, such as one or more stages of gas treatment in the EG processing system 54 followed by one or more additional stages of gas treatment in the EG treatment system 82.

At each extraction point 76, the extracted exhaust gas 42 may be substantially free of oxidant 68 and fuel 70 (e.g., unburnt fuel or hydrocarbons) due to substantially stoichiometric combustion and/or gas treatment in the EG processing system 54. Furthermore, depending on the target system, the extracted exhaust gas 42 may undergo further treatment in the EG treatment system 82 of the EG supply system 78, thereby further reducing any residual oxidant 68, fuel 70, or other undesirable products of combustion. For example, either before or after treatment in the EG treatment system 82, the extracted exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, either before or after treatment in the EG treatment system 82, the extracted exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_x$), carbon monoxide (CO), sulfur oxides (e.g., $SO_x$), hydrogen, and other products of incomplete combustion. Thus, the exhaust gas 42 is particularly well suited for use with the EOR system 18.

The EGR operation of the turbine system 52 specifically enables the exhaust extraction at a multitude of locations 76. For example, the compressor section of the system 52 may be used to compress the exhaust gas 66 without any oxidant 68 (i.e., only compression of the exhaust gas 66), such that a substantially oxygen-free exhaust gas 42 may be extracted from the compressor section and/or the combustor section prior to entry of the oxidant 68 and the fuel 70. The extraction points 76 may be located at interstage ports between adjacent compressor stages, at ports along the compressor discharge casing, at ports along each combustor in the combustor section, or any combination thereof. In certain embodiments, the exhaust gas 66 may not mix with the oxidant 68 and fuel 70 until it reaches the head end portion and/or fuel nozzles of each combustor in the combustor section. Furthermore, one or more flow separators (e.g., walls, dividers, baffles, or the like) may be used to isolate the oxidant 68 and the fuel 70 from the extraction points 76. With these flow separators, the extraction points 76 may be disposed directly along a wall of each combustor in the combustor section.

Once the exhaust gas 66, oxidant 68, and fuel 70 flow through the head end portion (e.g., through fuel nozzles) into the combustion portion (e.g., combustion chamber) of each combustor, the SEGR gas turbine system 52 is controlled to provide a substantially stoichiometric combustion of the exhaust gas 66, oxidant 68, and fuel 70. For example, the system 52 may maintain an equivalence ratio of approximately 0.95 to approximately 1.05. As a result, the products of combustion of the mixture of exhaust gas 66, oxidant 68, and fuel 70 in each combustor is substantially free of oxygen and unburnt fuel. Thus, the products of combustion (or exhaust gas) may be extracted from the turbine section of the SEGR gas turbine system 52 for use as the exhaust gas 42 routed to the EOR system 18. Along the turbine section, the extraction points 76 may be located at any turbine stage, such as interstage ports between adjacent turbine stages. Thus, using any of the foregoing extraction points 76, the turbine-based service system 14 may generate, extract, and deliver the exhaust gas 42 to the hydrocarbon production system 12 (e.g., the EOR system 18) for use in the production of oil/gas 48 from the subterranean reservoir 20.

Figure 2:
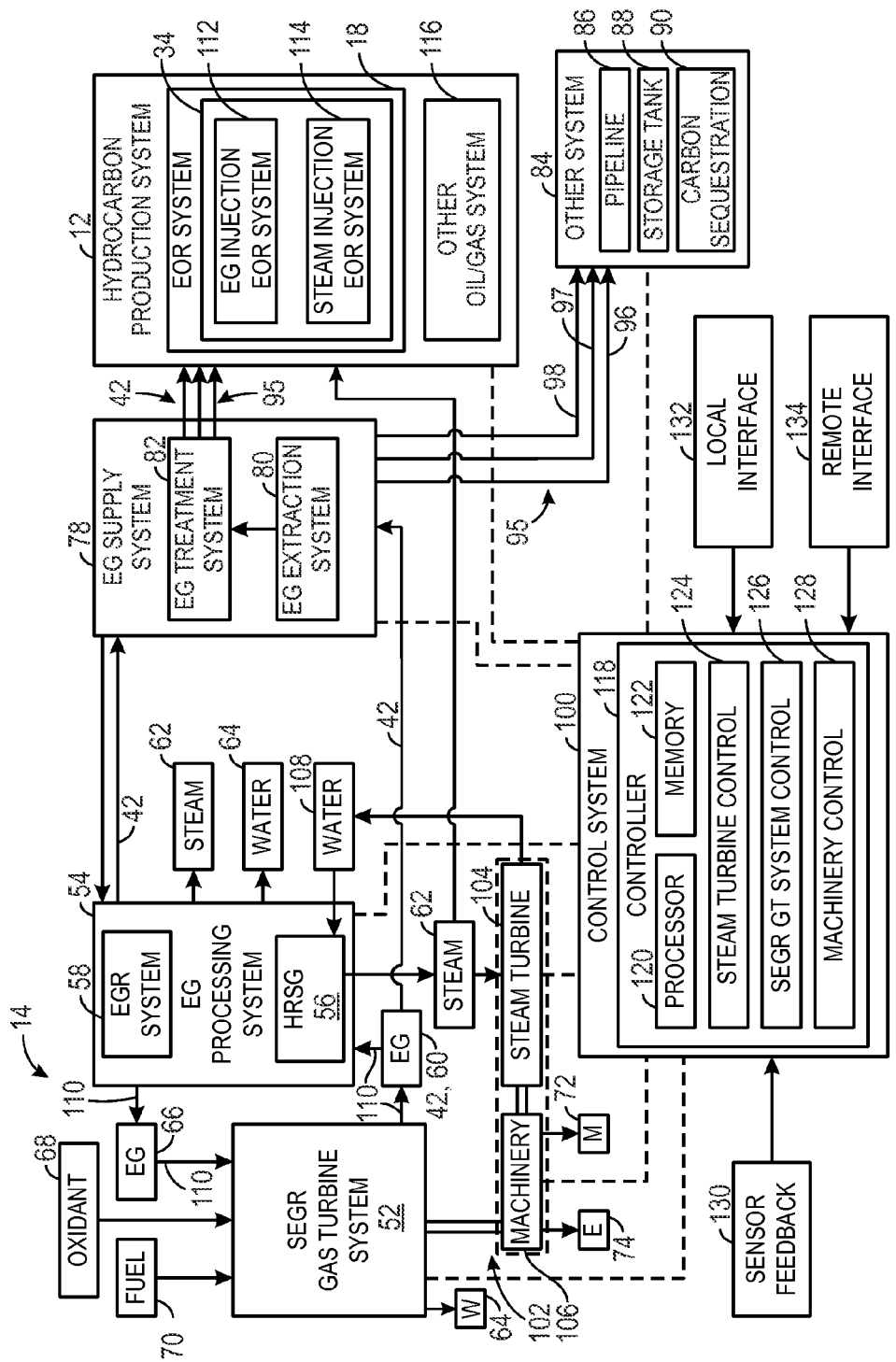
FIG. 2 is a diagram of an embodiment of the system of FIG. 1, further illustrating a control system and a combined cycle system.

FIG. 2 is a diagram of an embodiment of the system 10 of FIG. 1, illustrating a control system 100 coupled to the turbine-based service system 14 and the hydrocarbon production system 12. In the illustrated embodiment, the turbine-based service system 14 includes a combined cycle system 102, which includes the SEGR gas turbine system 52 as a topping cycle, a steam turbine 104 as a bottoming cycle, and the HRSG 56 to recover heat from the exhaust gas 60 to generate the steam 62 for driving the steam turbine 104. Again, the SEGR gas turbine system 52 receives, mixes, and stoichiometrically combusts the exhaust gas 66, the oxidant 68, and the fuel 70 (e.g., premix and/or diffusion flames), thereby producing the exhaust gas 60, the mechanical power 72, the electrical power 74, and/or the water 64. For example, the SEGR gas turbine system 52 may drive one or more loads or machinery 106, such as an electrical generator, an oxidant compressor (e.g., a main air compressor), a gear box, a pump, equipment of the hydrocarbon production system 12, or any combination thereof. In some embodiments, the machinery 106 may include other drives, such as electrical motors or steam turbines (e.g., the steam turbine 104), in tandem with the SEGR gas turbine system 52. Accordingly, an output of the machinery 106 driven by the SEGR gas turbines system 52 (and any additional drives) may include the mechanical power 72 and the electrical power 74. The mechanical power 72 and/or the electrical power 74 may be used on-site for powering the hydrocarbon production system 12, the electrical power 74 may be distributed to the power grid, or any combination thereof. The output of the machinery 106 also may include a compressed fluid, such as a compressed oxidant 68 (e.g., air or oxygen), for intake into the combustion section of the SEGR gas turbine system 52. Each of these outputs (e.g., the exhaust gas 60, the mechanical power 72, the electrical power 74, and/or the water 64) may be considered a service of the turbine-based service system 14.

The SEGR gas turbine system 52 produces the exhaust gas 42, 60, which may be substantially free of oxygen, and routes this exhaust gas 42, 60 to the EG processing system 54 and/or the EG supply system 78. The EG supply system 78 may treat and delivery the exhaust gas 42 (e.g., streams 95) to the hydrocarbon production system 12 and/or the other systems 84. As discussed above, the EG processing system 54 may include the HRSG 56 and the EGR system 58. The HRSG 56 may include one or more heat exchangers, condensers, and various heat recovery equipment, which may be used to recover or transfer heat from the exhaust gas 60 to water 108 to generate the steam 62 for driving the steam turbine 104. Similar to the SEGR gas turbine system 52, the steam turbine 104 may drive one or more loads or machinery 106, thereby generating the mechanical power 72 and the electrical power 74. In the illustrated embodiment, the SEGR gas turbine system 52 and the steam turbine 104 are arranged in tandem to drive the same machinery 106. However, in other embodiments, the SEGR gas turbine system 52 and the steam turbine 104 may separately drive different machinery 106 to independently generate mechanical power 72 and/or electrical power 74. As the steam turbine 104 is driven by the steam 62 from the HRSG 56, the steam 62 gradually decreases in temperature and pressure. Accordingly, the steam turbine 104 recirculates the used steam 62 and/or water 108 back into the HRSG 56 for additional steam generation via heat recovery from the exhaust gas 60. In addition to steam generation, the HRSG 56, the EGR system 58, and/or another portion of the EG processing system 54 may produce the water 64, the exhaust gas 42 for use with the hydrocarbon production system 12, and the exhaust gas 66 for use as an input into the SEGR gas turbine system 52. For example, the water 64 may be a treated water 64, such as a desalinated water for use in other applications. The desalinated water may be particularly useful in regions of low water availability. Regarding the exhaust gas 60, embodiments of the EG processing system 54 may be configured to recirculate the exhaust gas 60 through the EGR system 58 with or without passing the exhaust gas 60 through the HRSG 56.

In the illustrated embodiment, the SEGR gas turbine system 52 has an exhaust recirculation path 110, which extends from an exhaust outlet to an exhaust inlet of the system 52. Along the path 110, the exhaust gas 60 passes through the EG processing system 54, which includes the HRSG 56 and the EGR system 58 in the illustrated embodiment. The EGR system 58 may include one or more conduits, valves, blowers, gas treatment systems (e.g., filters, particulate removal units, gas separation units, gas purification units, heat exchangers, heat recovery units such as heat recovery steam generators, moisture removal units, catalyst units, chemical injection units, or any combination thereof) in series and/or parallel arrangements along the path 110. In other words, the EGR system 58 may include any flow control components, pressure control components, temperature control components, moisture control components, and gas composition control components along the exhaust recirculation path 110 between the exhaust outlet and the exhaust inlet of the system 52. Accordingly, in embodiments with the HRSG 56 along the path 110, the HRSG 56 may be considered a component of the EGR system 58. However, in certain embodiments, the HRSG 56 may be disposed along an exhaust path independent from the exhaust recirculation path 110. Regardless of whether the HRSG 56 is along a separate path or a common path with the EGR system 58, the HRSG 56 and the EGR system 58 intake the exhaust gas 60 and output either the recirculated exhaust gas 66, the exhaust gas 42 for use with the EG supply system 78 (e.g., for the hydrocarbon production system 12 and/or other systems 84), or another output of exhaust gas. Again, the SEGR gas turbine system 52 intakes, mixes, and stoichiometrically combusts the exhaust gas 66, the oxidant 68, and the fuel 70 (e.g., premixed and/or diffusion flames) to produce a substantially oxygen-free and fuel-free exhaust gas 60 for distribution to the EG processing system 54, the hydrocarbon production system 12, or other systems 84.

As noted above with reference to FIG. 1, the hydrocarbon production system 12 may include a variety of equipment to facilitate the recovery or production of oil/gas 48 from a subterranean reservoir 20 through an oil/gas well 26. For example, the hydrocarbon production system 12 may include the EOR system 18 having the fluid injection system 34. In the illustrated embodiment, the fluid injection system 34 includes an exhaust gas injection EOR system 112 and a steam injection EOR system 114. Although the fluid injection system 34 may receive fluids from a variety of sources, the illustrated embodiment may receive the exhaust gas 42 and the steam 62 from the turbine-based service system 14. The exhaust gas 42 and/or the steam 62 produced by the turbine-based service system 14 also may be routed to the hydrocarbon production system 12 for use in other oil/gas systems 116.

The quantity, quality, and flow of the exhaust gas 42 and/or the steam 62 may be controlled by the control system 100. The control system 100 may be dedicated entirely to the turbine-based service system 14, or the control system 100 may optionally also provide control (or at least some data to facilitate control) for the hydrocarbon production system 12 and/or other systems 84. In the illustrated embodiment, the control system 100 includes a controller 118 having a processor 120, a memory 122, a steam turbine control 124, a SEGR gas turbine system control 126, and a machinery control 128. The processor 120 may include a single processor or two or more redundant processors, such as triple redundant processors for control of the turbine-based service system 14. The memory 122 may include volatile and/or non-volatile memory. For example, the memory 122 may include one or more hard drives, flash memory, read-only memory, random access memory, or any combination thereof. The controls 124, 126, and 128 may include software and/or hardware controls. For example, the controls 124, 126, and 128 may include various instructions or code stored on the memory 122 and executable by the processor 120. The control 124 is configured to control operation of the steam turbine 104, the SEGR gas turbine system control 126 is configured to control the system 52, and the machinery control 128 is configured to control the machinery 106. Thus, the controller 118 (e.g., controls 124, 126, and 128) may be configured to coordinate various sub-systems of the turbine-based service system 14 to provide a suitable stream of the exhaust gas 42 to the hydrocarbon production system 12.

In certain embodiments of the control system 100, each element (e.g., system, subsystem, and component) illustrated in the drawings or described herein includes (e.g., directly within, upstream, or downstream of such element) one or more industrial control features, such as sensors and control devices, which are communicatively coupled with one another over an industrial control network along with the controller 118. For example, the control devices associated with each element may include a dedicated device controller (e.g., including a processor, memory, and control instructions), one or more actuators, valves, switches, and industrial control equipment, which enable control based on sensor feedback 130, control signals from the controller 118, control signals from a user, or any combination thereof. Thus, any of the control functionality described herein may be implemented with control instructions stored and/or executable by the controller 118, dedicated device controllers associated with each element, or a combination thereof.

In order to facilitate such control functionality, the control system 100 includes one or more sensors distributed throughout the system 10 to obtain the sensor feedback 130 for use in execution of the various controls, e.g., the controls 124, 126, and 128. For example, the sensor feedback 130 may be obtained from sensors distributed throughout the SEGR gas turbine system 52, the machinery 106, the EG processing system 54, the steam turbine 104, the hydrocarbon production system 12, or any other components throughout the turbine-based service system 14 or the hydrocarbon production system 12. For example, the sensor feedback 130 may include temperature feedback, pressure feedback, flow rate feedback, flame temperature feedback, combustion dynamics feedback, intake oxidant composition feedback, intake fuel composition feedback, exhaust composition feedback, the output level of mechanical power 72, the output level of electrical power 74, the output quantity of the exhaust gas 42, 60, the output quantity or quality of the water 64, or any combination thereof. For example, the sensor feedback 130 may include a composition of the exhaust gas 42, 60 to facilitate stoichiometric combustion in the SEGR gas turbine system 52. For example, the sensor feedback 130 may include feedback from one or more intake oxidant sensors along an oxidant supply path of the oxidant 68, one or more intake fuel sensors along a fuel supply path of the fuel 70, and one or more exhaust emissions sensors disposed along the exhaust recirculation path 110 and/or within the SEGR gas turbine system 52. The intake oxidant sensors, intake fuel sensors, and exhaust emissions sensors may include temperature sensors, pressure sensors, flow rate sensors, and composition sensors. The emissions sensors may includes sensors for nitrogen oxides (e.g., $NO_X$ sensors), carbon oxides (e.g., CO sensors and $CO_2$ sensors), sulfur oxides (e.g., $SO_X$ sensors), hydrogen (e.g., $H_2$ sensors), oxygen (e.g., $O_2$ sensors), unburnt hydrocarbons (e.g., HC sensors), or other products of incomplete combustion, or any combination thereof.

Using this feedback 130, the control system 100 may adjust (e.g., increase, decrease, or maintain) the intake flow of exhaust gas 66, oxidant 68, and/or fuel 70 into the SEGR gas turbine system 52 (among other operational parameters) to maintain the equivalence ratio within a suitable range, e.g., between approximately 0.95 to approximately 1.05, between approximately 0.95 to approximately 1.0, between approximately 1.0 to approximately 1.05, or substantially at 1.0. For example, the control system 100 may analyze the feedback 130 to monitor the exhaust emissions (e.g., concentration levels of nitrogen oxides, carbon oxides such as CO and $CO_2$, sulfur oxides, hydrogen, oxygen, unburnt hydrocarbons, and other products of incomplete combustion) and/or determine the equivalence ratio, and then control one or more components to adjust the exhaust emissions (e.g., concentration levels in the exhaust gas 42) and/or the equivalence ratio. The controlled components may include any of the components illustrated and described with reference to the drawings, including but not limited to, valves along the supply paths for the oxidant 68, the fuel 70, and the exhaust gas 66; an oxidant compressor, a fuel pump, or any components in the EG processing system 54; any components of the SEGR gas turbine system 52, or any combination thereof. The controlled components may adjust (e.g., increase, decrease, or maintain) the flow rates, temperatures, pressures, or percentages (e.g., equivalence ratio) of the oxidant 68, the fuel 70, and the exhaust gas 66 that combust within the SEGR gas turbine system 52. The controlled components also may include one or more gas treatment systems, such as catalyst units (e.g., oxidation catalyst units), supplies for the catalyst units (e.g., oxidation fuel, heat, electricity, etc.), gas purification and/or separation units (e.g., solvent based separators, absorbers, flash tanks, etc.), and filtration units. The gas treatment systems may help reduce various exhaust emissions along the exhaust recirculation path 110, a vent path (e.g., exhausted into the atmosphere), or an extraction path to the EG supply system 78.

In certain embodiments, the control system 100 may analyze the feedback 130 and control one or more components to maintain or reduce emissions levels (e.g., concentration levels in the exhaust gas 42, 60, 95) to a target range, such as less than approximately 10, 20, 30, 40, 50, 100, 200, 300, 400, 500, 1000, 2000, 3000, 4000, 5000, or 10000 parts per million by volume (ppmv). These target ranges may be the same or different for each of the exhaust emissions, e.g., concentration levels of nitrogen oxides, carbon monoxide, sulfur oxides, hydrogen, oxygen, unburnt hydrocarbons, and other products of incomplete combustion. For example, depending on the equivalence ratio, the control system 100 may selectively control exhaust emissions (e.g., concentration levels) of oxidant (e.g., oxygen) within a target range of less than approximately 10, 20, 30, 40, 50, 60, 70, 80, 90, 100, 250, 500, 750, or 1000 ppmv; carbon monoxide (CO) within a target range of less than approximately 20, 50, 100, 200, 500, 1000, 2500, or 5000 ppmv; and nitrogen oxides ($NO_X$) within a target range of less than approximately 50, 100, 200, 300, 400, or 500 ppmv. In certain embodiments operating with a substantially stoichiometric equivalence ratio, the control system 100 may selectively control exhaust emissions (e.g., concentration levels) of oxidant (e.g., oxygen) within a target range of less than approximately 10, 20, 30, 40, 50, 60, 70, 80, 90, or 100 ppmv; and carbon monoxide (CO) within a target range of less than approximately 500, 1000, 2000, 3000, 4000, or 5000 ppmv. In certain embodiments operating with a fuel-lean equivalence ratio (e.g., between approximately 0.95 to 1.0), the control system 100 may selectively control exhaust emissions (e.g., concentration levels) of oxidant (e.g., oxygen) within a target range of less than approximately 500, 600, 700, 800, 900, 1000, 1100, 1200, 1300, 1400, or 1500 ppmv; carbon monoxide (CO) within a target range of less than approximately 10, 20, 30, 40, 50, 60, 70, 80, 90, 100, 150, or 200 ppmv; and nitrogen oxides (e.g., $NO_X$) within a target range of less than approximately 50, 100, 150, 200, 250, 300, 350, or 400 ppmv. The foregoing target ranges are merely examples, and are not intended to limit the scope of the disclosed embodiments.

The control system 100 also may be coupled to a local interface 132 and a remote interface 134. For example, the local interface 132 may include a computer workstation disposed on-site at the turbine-based service system 14 and/or the hydrocarbon production system 12. In contrast, the remote interface 134 may include a computer workstation disposed off-site from the turbine-based service system 14 and the hydrocarbon production system 12, such as through an internet connection. These interfaces 132 and 134 facilitate monitoring and control of the turbine-based service system 14, such as through one or more graphical displays of sensor feedback 130, operational parameters, and so forth.

Again, as noted above, the controller 118 includes a variety of controls 124, 126, and 128 to facilitate control of the turbine-based service system 14. The steam turbine control 124 may receive the sensor feedback 130 and output control commands to facilitate operation of the steam turbine 104. For example, the steam turbine control 124 may receive the sensor feedback 130 from the HRSG 56, the machinery 106, temperature and pressure sensors along a path of the steam 62, temperature and pressure sensors along a path of the water 108, and various sensors indicative of the mechanical power 72 and the electrical power 74. Likewise, the SEGR gas turbine system control 126 may receive sensor feedback 130 from one or more sensors disposed along the SEGR gas turbine system 52, the machinery 106, the EG processing system 54, or any combination thereof. For example, the sensor feedback 130 may be obtained from temperature sensors, pressure sensors, clearance sensors, vibration sensors, flame sensors, fuel composition sensors, exhaust gas composition sensors, or any combination thereof, disposed within or external to the SEGR gas turbine system 52. Finally, the machinery control 128 may receive sensor feedback 130 from various sensors associated with the mechanical power 72 and the electrical power 74, as well as sensors disposed within the machinery 106. Each of these controls 124, 126, and 128 uses the sensor feedback 130 to improve operation of the turbine-based service system 14.

In the illustrated embodiment, the SEGR gas turbine system control 126 may execute instructions to control the quantity and quality of the exhaust gas 42, 60, 95 in the EG processing system 54, the EG supply system 78, the hydrocarbon production system 12, and/or the other systems 84. For example, the SEGR gas turbine system control 126 may maintain a level of oxidant (e.g., oxygen) and/or unburnt fuel in the exhaust gas 60 below a threshold suitable for use with the exhaust gas injection EOR system 112. In certain embodiments, the threshold levels may be less than 1, 2, 3, 4, or 5 percent of oxidant (e.g., oxygen) and/or unburnt fuel by volume of the exhaust gas 42, 60; or the threshold levels of oxidant (e.g., oxygen) and/or unburnt fuel (and other exhaust emissions) may be less than approximately 10, 20, 30, 40, 50, 60, 70, 80, 90, 100, 200, 300, 400, 500, 1000, 2000, 3000, 4000, or 5000 parts per million by volume (ppmv) in the exhaust gas 42, 60. By further example, in order to achieve these low levels of oxidant (e.g., oxygen) and/or unburnt fuel, the SEGR gas turbine system control 126 may maintain an equivalence ratio for combustion in the SEGR gas turbine system 52 between approximately 0.95 and approximately 1.05. The SEGR gas turbine system control 126 also may control the EG extraction system 80 and the EG treatment system 82 to maintain the temperature, pressure, flow rate, and gas composition of the exhaust gas 42, 60, 95 within suitable ranges for the exhaust gas injection EOR system 112, the pipeline 86, the storage tank 88, and the carbon sequestration system 90. As discussed above, the EG treatment system 82 may be controlled to purify and/or separate the exhaust gas 42 into one or more gas streams 95, such as the $CO_2$ rich, $N_2$ lean stream 96, the intermediate concentration $CO_2$, $N_2$ stream 97, and the $CO_2$ lean, $N_2$ rich stream 98. In addition to controls for the exhaust gas 42, 60, and 95, the controls 124, 126, and 128 may execute one or more instructions to maintain the mechanical power 72 within a suitable power range, or maintain the electrical power 74 within a suitable frequency and power range.

Figure 3:
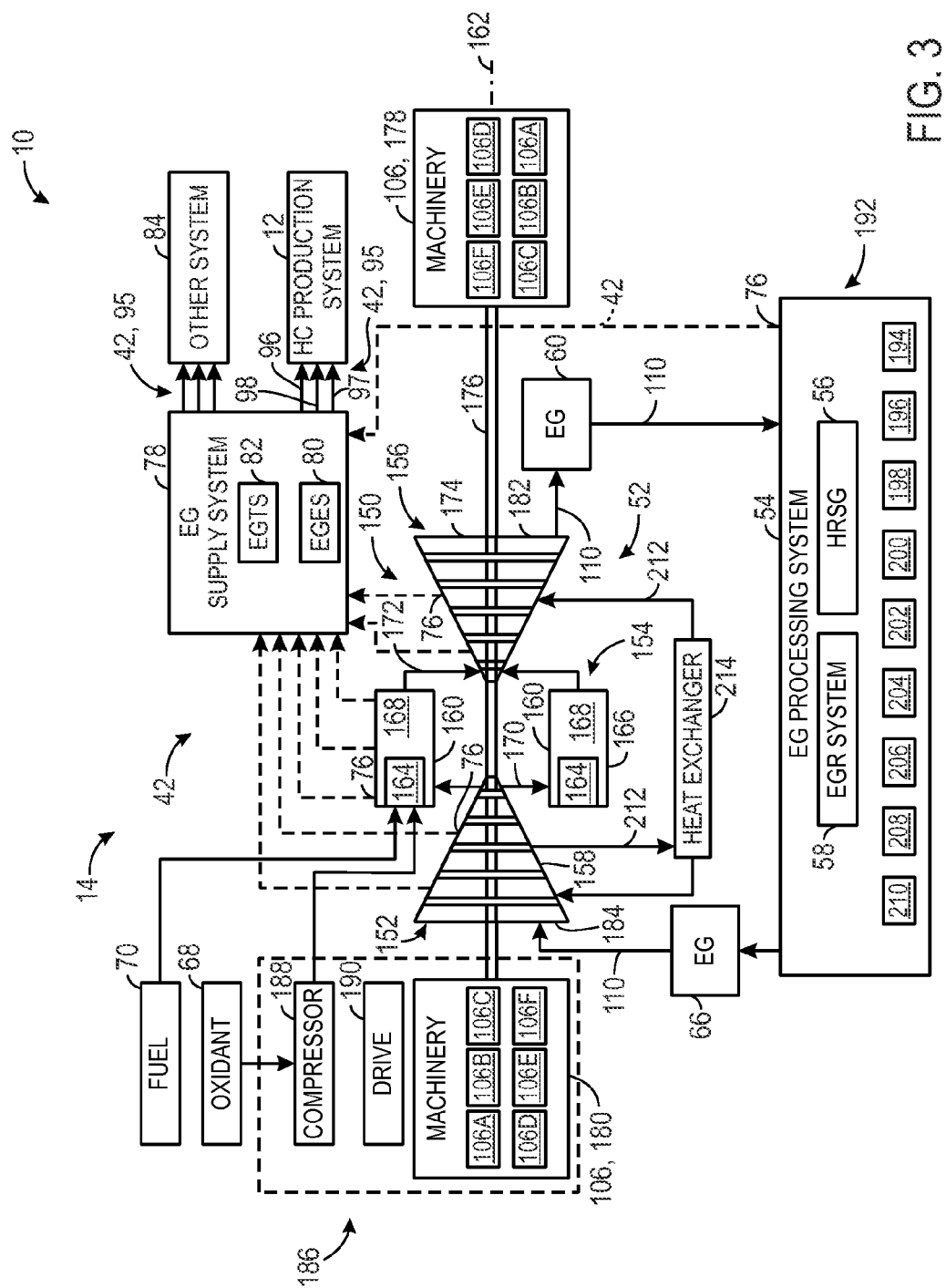
FIG. 3 is a diagram of an embodiment of the system of FIGS. 1 and 2, further illustrating details of a gas turbine engine, exhaust gas supply system, and exhaust gas processing system.

FIG. 3 is a diagram of embodiment of the system 10, further illustrating details of the SEGR gas turbine system 52 for use with the hydrocarbon production system 12 and/or other systems 84. In the illustrated embodiment, the SEGR gas turbine system 52 includes a gas turbine engine 150 coupled to the EG processing system 54. The illustrated gas turbine engine 150 includes a compressor section 152, a combustor section 154, and an expander section or turbine section 156. The compressor section 152 includes one or more exhaust gas compressors or compressor stages 158, such as 1 to 20 stages of rotary compressor blades disposed in a series arrangement. Likewise, the combustor section 154 includes one or more combustors 160, such as 1 to 20 combustors 160 distributed circumferentially about a rotational axis 162 of the SEGR gas turbine system 52. Furthermore, each combustor 160 may include one or more fuel nozzles 164 configured to inject the exhaust gas 66, the oxidant 68, and/or the fuel 70. For example, a head end portion 166 of each combustor 160 may house 1, 2, 3, 4, 5, 6, or more fuel nozzles 164, which may inject streams or mixtures of the exhaust gas 66, the oxidant 68, and/or the fuel 70 into a combustion portion 168 (e.g., combustion chamber) of the combustor 160.

The fuel nozzles 164 may include any combination of premix fuel nozzles 164 (e.g., configured to premix the oxidant 68 and fuel 70 for generation of an oxidant/fuel premix flame) and/or diffusion fuel nozzles 164 (e.g., configured to inject separate flows of the oxidant 68 and fuel 70 for generation of an oxidant/fuel diffusion flame). Embodiments of the premix fuel nozzles 164 may include swirl vanes, mixing chambers, or other features to internally mix the oxidant 68 and fuel 70 within the nozzles 164, prior to injection and combustion in the combustion chamber 168. The premix fuel nozzles 164 also may receive at least some partially mixed oxidant 68 and fuel 70. In certain embodiments, each diffusion fuel nozzle 164 may isolate flows of the oxidant 68 and the fuel 70 until the point of injection, while also isolating flows of one or more diluents (e.g., the exhaust gas 66, steam, nitrogen, or another inert gas) until the point of injection. In other embodiments, each diffusion fuel nozzle 164 may isolate flows of the oxidant 68 and the fuel 70 until the point of injection, while partially mixing one or more diluents (e.g., the exhaust gas 66, steam, nitrogen, or another inert gas) with the oxidant 68 and/or the fuel 70 prior to the point of injection. In addition, one or more diluents (e.g., the exhaust gas 66, steam, nitrogen, or another inert gas) may be injected into the combustor (e.g., into the hot products of combustion) either at or downstream from the combustion zone, thereby helping to reduce the temperature of the hot products of combustion and reduce emissions of $NO_X$ (e.g., NO and $NO_2$). Regardless of the type of fuel nozzle 164, the SEGR gas turbine system 52 may be controlled to provide substantially stoichiometric combustion of the oxidant 68 and fuel 70.

In diffusion combustion embodiments using the diffusion fuel nozzles 164, the fuel 70 and oxidant 68 generally do not mix upstream from the diffusion flame, but rather the fuel 70 and oxidant 68 mix and react directly at the flame surface and/or the flame surface exists at the location of mixing between the fuel 70 and oxidant 68. In particular, the fuel 70 and oxidant 68 separately approach the flame surface (or diffusion boundary/interface), and then diffuse (e.g., via molecular and viscous diffusion) along the flame surface (or diffusion boundary/interface) to generate the diffusion flame. It is noteworthy that the fuel 70 and oxidant 68 may be at a substantially stoichiometric ratio along this flame surface (or diffusion boundary/interface), which may result in a greater flame temperature (e.g., a peak flame temperature) along this flame surface. The stoichiometric fuel/oxidant ratio generally results in a greater flame temperature (e.g., a peak flame temperature), as compared with a fuel-lean or fuel-rich fuel/oxidant ratio. As a result, the diffusion flame may be substantially more stable than a premix flame, because the diffusion of fuel 70 and oxidant 68 helps to maintain a stoichiometric ratio (and greater temperature) along the flame surface. Although greater flame temperatures can also lead to greater exhaust emissions, such as $NO_X$ emissions, the disclosed embodiments use one or more diluents to help control the temperature and emissions while still avoiding any premixing of the fuel 70 and oxidant 68. For example, the disclosed embodiments may introduce one or more diluents separate from the fuel 70 and oxidant 68 (e.g., after the point of combustion and/or downstream from the diffusion flame), thereby helping to reduce the temperature and reduce the emissions (e.g., $NO_X$ emissions) produced by the diffusion flame.

In operation, as illustrated, the compressor section 152 receives and compresses the exhaust gas 66 from the EG processing system 54, and outputs a compressed exhaust gas 170 to each of the combustors 160 in the combustor section 154. Upon combustion of the fuel 60, oxidant 68, and exhaust gas 170 within each combustor 160, additional exhaust gas or products of combustion 172 (i.e., combustion gas) is routed into the turbine section 156. Similar to the compressor section 152, the turbine section 156 includes one or more turbines or turbine stages 174, which may include a series of rotary turbine blades. These turbine blades are then driven by the products of combustion 172 generated in the combustor section 154, thereby driving rotation of a shaft 176 coupled to the machinery 106. Again, the machinery 106 may include a variety of equipment coupled to either end of the SEGR gas turbine system 52, such as machinery 106, 178 coupled to the turbine section 156 and/or machinery 106, 180 coupled to the compressor section 152. In certain embodiments, the machinery 106, 178, 180 may include one or more electrical generators, oxidant compressors for the oxidant 68, fuel pumps for the fuel 70, gear boxes, or additional drives (e.g. steam turbine 104, electrical motor, etc.) coupled to the SEGR gas turbine system 52. Non-limiting examples are discussed in further detail below with reference to TABLE 1. As illustrated, the turbine section 156 outputs the exhaust gas 60 to recirculate along the exhaust recirculation path 110 from an exhaust outlet 182 of the turbine section 156 to an exhaust inlet 184 into the compressor section 152. Along the exhaust recirculation path 110, the exhaust gas 60 passes through the EG processing system 54 (e.g., the HRSG 56 and/or the EGR system 58) as discussed in detail above.

Again, each combustor 160 in the combustor section 154 receives, mixes, and stoichiometrically combusts the compressed exhaust gas 170, the oxidant 68, and the fuel 70 to produce the additional exhaust gas or products of combustion 172 to drive the turbine section 156. In certain embodiments, the oxidant 68 is compressed by an oxidant compression system 186, such as a main oxidant compression (MOC) system (e.g., a main air compression (MAC) system) having one or more oxidant compressors (MOCs). The oxidant compression system 186 includes an oxidant compressor 188 coupled to a drive 190. For example, the drive 190 may include an electric motor, a combustion engine, or any combination thereof. In certain embodiments, the drive 190 may be a turbine engine, such as the gas turbine engine 150. Accordingly, the oxidant compression system 186 may be an integral part of the machinery 106. In other words, the compressor 188 may be directly or indirectly driven by the mechanical power 72 supplied by the shaft 176 of the gas turbine engine 150. In such an embodiment, the drive 190 may be excluded, because the compressor 188 relies on the power output from the turbine engine 150. However, in certain embodiments employing more than one oxidant compressor is employed, a first oxidant compressor (e.g., a low pressure (LP) oxidant compressor) may be driven by the drive 190 while the shaft 176 drives a second oxidant compressor (e.g., a high pressure (HP) oxidant compressor), or vice versa. For example, in another embodiment, the HP MOC is driven by the drive 190 and the LP oxidant compressor is driven by the shaft 176. In the illustrated embodiment, the oxidant compression system 186 is separate from the machinery 106. In each of these embodiments, the compression system 186 compresses and supplies the oxidant 68 to the fuel nozzles 164 and the combustors 160. Accordingly, some or all of the machinery 106, 178, 180 may be configured to increase the operational efficiency of the compression system 186 (e.g., the compressor 188 and/or additional compressors).

The variety of components of the machinery 106, indicated by element numbers 106A, 106B, 106C, 106D, 106E, and 106F, may be disposed along the line of the shaft 176 and/or parallel to the line of the shaft 176 in one or more series arrangements, parallel arrangements, or any combination of series and parallel arrangements. For example, the machinery 106, 178, 180 (e.g., 106A through 106F) may include any series and/or parallel arrangement, in any order, of: one or more gearboxes (e.g., parallel shaft, epicyclic gearboxes), one or more compressors (e.g., oxidant compressors, booster compressors such as EG booster compressors), one or more power generation units (e.g., electrical generators), one or more drives (e.g., steam turbine engines, electrical motors), heat exchange units (e.g., direct or indirect heat exchangers), clutches, or any combination thereof. The compressors may include axial compressors, radial or centrifugal compressors, or any combination thereof, each having one or more compression stages. Regarding the heat exchangers, direct heat exchangers may include spray coolers (e.g., spray intercoolers), which inject a liquid spray into a gas flow (e.g., oxidant flow) for direct cooling of the gas flow. Indirect heat exchangers may include at least one wall (e.g., a shell and tube heat exchanger) separating first and second flows, such as a fluid flow (e.g., oxidant flow) separated from a coolant flow (e.g., water, air, refrigerant, or any other liquid or gas coolant), wherein the coolant flow transfers heat from the fluid flow without any direct contact. Examples of indirect heat exchangers include intercooler heat exchangers and heat recovery units, such as heat recovery steam generators. The heat exchangers also may include heaters. As discussed in further detail below, each of these machinery components may be used in various combinations as indicated by the non-limiting examples set forth in TABLE 1.

Generally, the machinery 106, 178, 180 may be configured to increase the efficiency of the compression system 186 by, for example, adjusting operational speeds of one or more oxidant compressors in the system 186, facilitating compression of the oxidant 68 through cooling, and/or extraction of surplus power. The disclosed embodiments are intended to include any and all permutations of the foregoing components in the machinery 106, 178, 180 in series and parallel arrangements, wherein one, more than one, all, or none of the components derive power from the shaft 176. As illustrated below, TABLE 1 depicts some non-limiting examples of arrangements of the machinery 106, 178, 180 disposed proximate and/or coupled to the compressor and turbine sections 152, 156.

TABLE 1

| 106A | 106B | 106C | 106D | 106E | 106F |
|---|---|---|---|---|---|
| MOC | GEN | | | | |
| MOC | GBX | GEN | | | |
| LP MOC | HP MOC | GEN | | | |
| HP MOC | GBX | LP MOC | GEN | | |
| MOC | GBX | GEN | | | |
| MOC | | | | | |
| HP MOC | GBX | GEN | LP MOC | | |
| MOC | GBX | GEN | | | |
| MOC | GBX | DRV | | | |
| DRV | GBX | LP MOC | HP MOC | GBX | GEN |
| DRV | GBX | HP MOC | LP MOC | GEN | |
| HP MOC | GBX CLR | LP MOC | GEN | | |
| HP MOC | GBX CLR | LP MOC | GBX | GEN | |
| HP MOC | GBX HTR STGN | LP MOC | GEN | | |
| MOC | GEN | DRV | | | |
| MOC | DRV | GEN | | | |
| DRV | MOC | GEN | | | |
| DRV | CLU | MOC | GEN | | |
| DRV | CLU | MOC | GBX | GEN | |

As illustrated above in TABLE 1, a cooling unit is represented as CLR, a clutch is represented as CLU, a drive is represented by DRV, a gearbox is represented as GBX, a generator is represented by GEN, a heating unit is represented by HTR, a main oxidant compressor unit is represented by MOC, with low pressure and high pressure variants being represented as LP MOC and HP MOC, respectively, and a steam generator unit is represented as STGN. Although TABLE 1 illustrates the machinery 106, 178, 180 in sequence toward the compressor section 152 or the turbine section 156, TABLE 1 is also intended to cover the reverse sequence of the machinery 106, 178, 180. In TABLE 1, any cell including two or more components is intended to cover a parallel arrangement of the components. TABLE 1 is not intended to exclude any non-illustrated permutations of the machinery 106, 178, 180. These components of the machinery 106, 178, 180 may enable feedback control of temperature, pressure, and flow rate of the oxidant 68 sent to the gas turbine engine 150. As discussed in further detail below, the oxidant 68 and the fuel 70 may be supplied to the gas turbine engine 150 at locations specifically selected to facilitate isolation and extraction of the compressed exhaust gas 170 without any oxidant 68 or fuel 70 degrading the quality of the exhaust gas 170.

The EG supply system 78, as illustrated in FIG. 3, is disposed between the gas turbine engine 150 and the target systems (e.g., the hydrocarbon production system 12 and the other systems 84). In particular, the EG supply system 78, e.g., the EG extraction system (EGES) 80), may be coupled to the gas turbine engine 150 at one or more extraction points 76 along the compressor section 152, the combustor section 154, and/or the turbine section 156. For example, the extraction points 76 may be located between adjacent compressor stages, such as 2, 3, 4, 5, 6, 7, 8, 9, or 10 interstage extraction points 76 between compressor stages. Each of these interstage extraction points 76 provides a different temperature and pressure of the extracted exhaust gas 42. Similarly, the extraction points 76 may be located between adjacent turbine stages, such as 2, 3, 4, 5, 6, 7, 8, 9, or 10 interstage extraction points 76 between turbine stages. Each of these interstage extraction points 76 provides a different temperature and pressure of the extracted exhaust gas 42. By further example, the extraction points 76 may be located at a multitude of locations throughout the combustor section 154, which may provide different temperatures, pressures, flow rates, and gas compositions. Each of these extraction points 76 may include an EG extraction conduit, one or more valves, sensors, and controls, which may be used to selectively control the flow of the extracted exhaust gas 42 to the EG supply system 78.

The extracted exhaust gas 42, which is distributed by the EG supply system 78, has a controlled composition suitable for the target systems (e.g., the hydrocarbon production system 12 and the other systems 84). For example, at each of these extraction points 76, the exhaust gas 170 may be substantially isolated from injection points (or flows) of the oxidant 68 and the fuel 70. In other words, the EG supply system 78 may be specifically designed to extract the exhaust gas 170 from the gas turbine engine 150 without any added oxidant 68 or fuel 70. Furthermore, in view of the stoichiometric combustion in each of the combustors 160, the extracted exhaust gas 42 may be substantially free of oxygen and fuel. The EG supply system 78 may route the extracted exhaust gas 42 directly or indirectly to the hydrocarbon production system 12 and/or other systems 84 for use in various processes, such as enhanced oil recovery, carbon sequestration, storage, or transport to an offsite location. However, in certain embodiments, the EG supply system 78 includes the EG treatment system (EGTS) 82 for further treatment of the exhaust gas 42, prior to use with the target systems. For example, the EG treatment system 82 may purify and/or separate the exhaust gas 42 into one or more streams 95, such as the $CO_2$ rich, $N_2$ lean stream 96, the intermediate concentration $CO_2$, $N_2$ stream 97, and the $CO_2$ lean, $N_2$ rich stream 98. These treated exhaust gas streams 95 may be used individually, or in any combination, with the hydrocarbon production system 12 and the other systems 84 (e.g., the pipeline 86, the storage tank 88, and the carbon sequestration system 90).

Similar to the exhaust gas treatments performed in the EG supply system 78, the EG processing system 54 may include a plurality of exhaust gas (EG) treatment components 192, such as indicated by element numbers 194, 196, 198, 200, 202, 204, 206, 208, and 210. These EG treatment components 192 (e.g., 194 through 210) may be disposed along the exhaust recirculation path 110 in one or more series arrangements, parallel arrangements, or any combination of series and parallel arrangements. For example, the EG treatment components 192 (e.g., 194 through 210) may include any series and/or parallel arrangement, in any order, of: one or more heat exchangers (e.g., heat recovery units such as heat recovery steam generators, condensers, coolers, or heaters), catalyst systems (e.g., oxidation catalyst systems), particulate and/or water removal systems (e.g., inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, or any combination thereof. In certain embodiments, the catalyst systems may include an oxidation catalyst, a carbon monoxide reduction catalyst, a nitrogen oxides reduction catalyst, an aluminum oxide, a zirconium oxide, a silicone oxide, a titanium oxide, a platinum oxide, a palladium oxide, a cobalt oxide, or a mixed metal oxide, or a combination thereof. The disclosed embodiments are intended to include any and all permutations of the foregoing components 192 in series and parallel arrangements. As illustrated below, TABLE 2 depicts some non-limiting examples of arrangements of the components 192 along the exhaust recirculation path 110.

TABLE 2

| 194 | 196 | 198 | 200 | 202 | 204 | 206 | 208 | 210 |
|---|---|---|---|---|---|---|---|---|
| CU | HRU | BB | MRU | PRU | | | | |
| CU | HRU | HRU | BB | MRU | PRU | DIL | | |
| CU | HRSG | HRSG | BB | MRU | PRU | | | |
| OCU | HRU | OCU | HRU | OCU | BB | MRU | PRU | |
| HRU | HRU | BB | MRU | PRU | | | | |
| CU | CU | | | | | | | |
| HRSG | HRSG | BB | MRU | PRU | DIL | | | |
| OCU | OCU | | | | | | | |
| OCU | HRSG | OCU | HRSG | OCU | BB | MRU | PRU | DIL |
| | OCU | | OCU | | | | | |
| OCU | HRSG ST | HRSG ST | BB | COND | INER | WFIL | CFIL | DIL |
| OCU HRSG ST | OCU HRSG ST | BB | COND | INER | FIL | DIL | | |
| OCU | HRSG ST | HRSG ST | OCU | BB | MRU HE COND | MRU WFIL | PRU INER | PRU FIL CFIL |

TABLE 2-continued

| 194 | 196 | 198 | 200 | 202 | 204 | 206 | 208 | 210 |
|-----|-----|-----|-----|-----|-----|-----|-----|-----|
| CU | HRU COND | HRU COND | HRU COND | BB | MRU HE COND WFIL | PRU INER | PRU FIL CFIL | DIL |

As illustrated above in TABLE 2, a catalyst unit is represented by CU, an oxidation catalyst unit is represented by OCU, a booster blower is represented by BB, a heat exchanger is represented by HX, a heat recovery unit is represented by HRU, a heat recovery steam generator is represented by HRSG, a condenser is represented by COND, a steam turbine is represented by ST, a particulate removal unit is represented by PRU, a moisture removal unit is represented by MRU, a filter is represented by FIL, a coalescing filter is represented by CFIL, a water impermeable filter is represented by WFIL, an inertial separator is represented by INER, and a diluent supply system (e.g., steam, nitrogen, or other inert gas) is represented by DIL. Although TABLE 2 illustrates the components 192 in sequence from the exhaust outlet 182 of the turbine section 156 toward the exhaust inlet 184 of the compressor section 152, TABLE 2 is also intended to cover the reverse sequence of the illustrated components 192. In TABLE 2, any cell including two or more components is intended to cover an integrated unit with the components, a parallel arrangement of the components, or any combination thereof. Furthermore, in context of TABLE 2, the HRU, the HRSG, and the COND are examples of the HE; the HRSG is an example of the HRU; the COND, WFIL, and CFIL are examples of the WRU; the INER, FIL, WFIL, and CFIL are examples of the PRU; and the WFIL and CFIL are examples of the FIL. Again, TABLE 2 is not intended to exclude any non-illustrated permutations of the components 192. In certain embodiments, the illustrated components 192 (e.g., 194 through 210) may be partially or completed integrated within the HRSG 56, the EGR system 58, or any combination thereof. These EG treatment components 192 may enable feedback control of temperature, pressure, flow rate, and gas composition, while also removing moisture and particulates from the exhaust gas 60. Furthermore, the treated exhaust gas 60 may be extracted at one or more extraction points 76 for use in the EG supply system 78 and/or recirculated to the exhaust inlet 184 of the compressor section 152.

As the treated, recirculated exhaust gas 66 passes through the compressor section 152, the SEGR gas turbine system 52 may bleed off a portion of the compressed exhaust gas along one or more lines 212 (e.g., bleed conduits or bypass conduits). Each line 212 may route the exhaust gas into one or more heat exchangers 214 (e.g., cooling units), thereby cooling the exhaust gas for recirculation back into the SEGR gas turbine system 52. For example, after passing through the heat exchanger 214, a portion of the cooled exhaust gas may be routed to the turbine section 156 along line 212 for cooling and/or sealing of the turbine casing, turbine shrouds, bearings, and other components. In such an embodiment, the SEGR gas turbine system 52 does not route any oxidant 68 (or other potential contaminants) through the turbine section 156 for cooling and/or sealing purposes, and thus any leakage of the cooled exhaust gas will not contaminate the hot products of combustion (e.g., working exhaust gas) flowing through and driving the turbine stages of the turbine section 156. By further example, after passing through the heat exchanger 214, a portion of the cooled exhaust gas may be routed along line 216 (e.g., return conduit) to an upstream compressor stage of the compressor section 152, thereby improving the efficiency of compression by the compressor section 152. In such an embodiment, the heat exchanger 214 may be configured as an interstage cooling unit for the compressor section 152. In this manner, the cooled exhaust gas helps to increase the operational efficiency of the SEGR gas turbine system 52, while simultaneously helping to maintain the purity of the exhaust gas (e.g., substantially free of oxidant and fuel).

Figure 4:
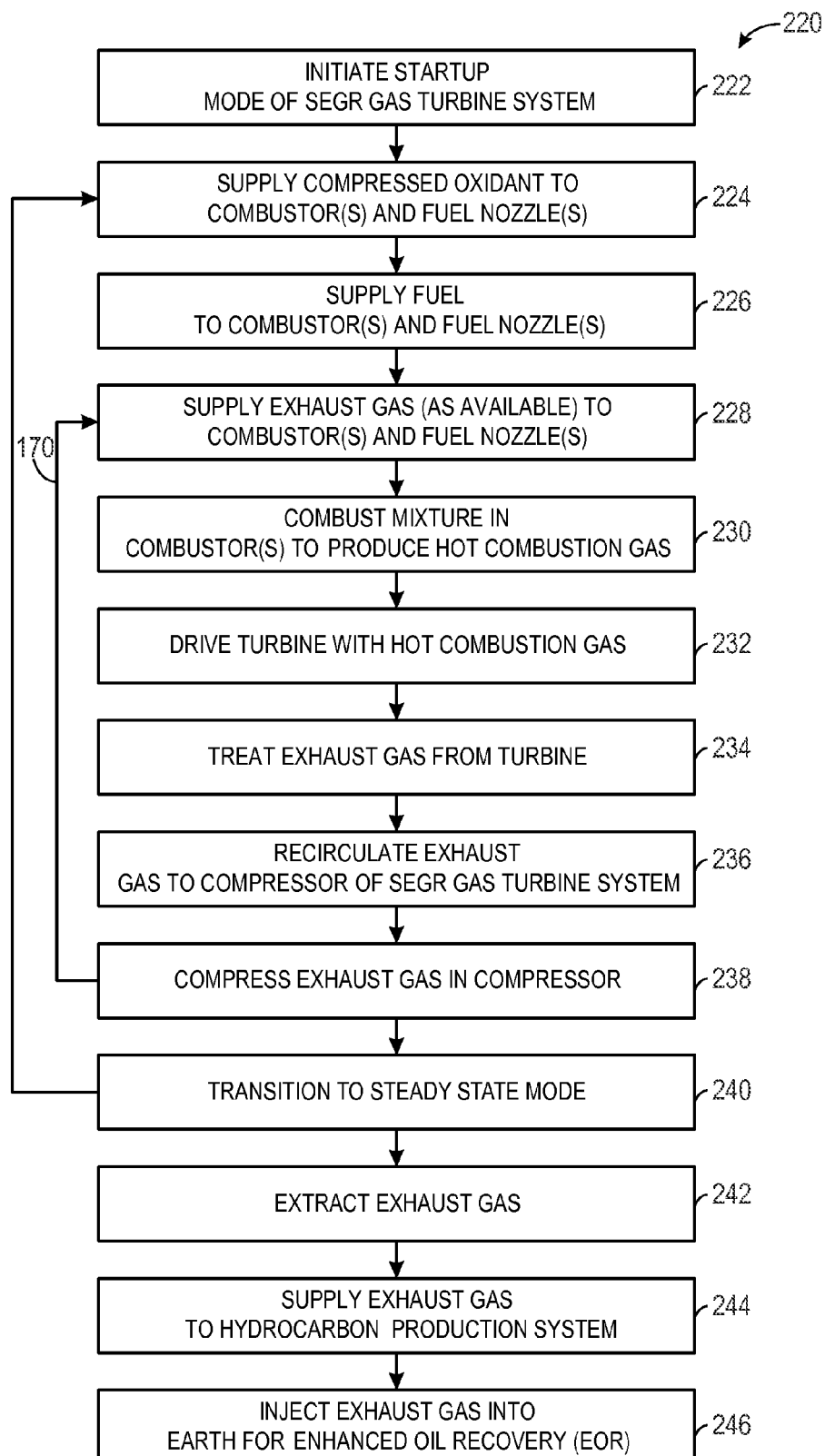
FIG. 4 is a flow chart of an embodiment of a process for operating the system of FIGS. 1-3.

FIG. 4 is a flow chart of an embodiment of an operational process 220 of the system 10 illustrated in FIGS. 1-3. In certain embodiments, the process 220 may be a computer implemented process, which accesses one or more instructions stored on the memory 122 and executes the instructions on the processor 120 of the controller 118 shown in FIG. 2. For example, each step in the process 220 may include instructions executable by the controller 118 of the control system 100 described with reference to FIG. 2.

The process 220 may begin by initiating a startup mode of the SEGR gas turbine system 52 of FIGS. 1-3, as indicated by block 222. For example, the startup mode may involve a gradual ramp up of the SEGR gas turbine system 52 to maintain thermal gradients, vibration, and clearance (e.g., between rotating and stationary parts) within acceptable thresholds. For example, during the startup mode 222, the process 220 may begin to supply a compressed oxidant 68 to the combustors 160 and the fuel nozzles 164 of the combustor section 154, as indicated by block 224. In certain embodiments, the compressed oxidant may include a compressed air, oxygen, oxygen-enriched air, oxygen-reduced air, oxygen-nitrogen mixtures, or any combination thereof. For example, the oxidant 68 may be compressed by the oxidant compression system 186 illustrated in FIG. 3. The process 220 also may begin to supply fuel to the combustors 160 and the fuel nozzles 164 during the startup mode 222, as indicated by block 226. During the startup mode 222, the process 220 also may begin to supply exhaust gas (as available) to the combustors 160 and the fuel nozzles 164, as indicated by block 228. For example, the fuel nozzles 164 may produce one or more diffusion flames, premix flames, or a combination of diffusion and premix flames. During the startup mode 222, the exhaust gas 60 being generated by the gas turbine engine 156 may be insufficient or unstable in quantity and/or quality. Accordingly, during the startup mode, the process 220 may supply the exhaust gas 66 from one or more storage units (e.g., storage tank 88), the pipeline 86, other SEGR gas turbine systems 52, or other exhaust gas sources.

The process 220 may then combust a mixture of the compressed oxidant, fuel, and exhaust gas in the combustors 160 to produce hot combustion gas 172, as indicated by block 230. In particular, the process 220 may be controlled by the control system 100 of FIG. 2 to facilitate stoichiometric combustion (e.g., stoichiometric diffusion combustion, premix combustion, or both) of the mixture in the combustors 160 of the combustor section 154. However, during the startup mode 222, it may be particularly difficult to maintain stoichiometric combustion of the mixture (and thus low levels of oxidant and unburnt fuel may be present in the hot combustion gas 172). As a result, in the startup mode 222, the hot combustion gas 172 may have greater amounts of residual oxidant 68 and/or fuel 70 than during a steady state mode as discussed in further detail below. For this reason, the process 220 may execute one or more control instructions to reduce or eliminate the residual oxidant 68 and/or fuel 70 in the hot combustion gas 172 during the startup mode.

The process 220 then drives the turbine section 156 with the hot combustion gas 172, as indicated by block 232. For example, the hot combustion gas 172 may drive one or more turbine stages 174 disposed within the turbine section 156. Downstream of the turbine section 156, the process 220 may treat the exhaust gas 60 from the final turbine stage 174, as indicated by block 234. For example, the exhaust gas treatment 234 may include filtration, catalytic reaction of any residual oxidant 68 and/or fuel 70, chemical treatment, heat recovery with the HRSG 56, and so forth. The process 220 may also recirculate at least some of the exhaust gas 60 back to the compressor section 152 of the SEGR gas turbine system 52, as indicated by block 236. For example, the exhaust gas recirculation 236 may involve passage through the exhaust recirculation path 110 having the EG processing system 54 as illustrated in FIGS. 1-3.

In turn, the recirculated exhaust gas 66 may be compressed in the compressor section 152, as indicated by block 238. For example, the SEGR gas turbine system 52 may sequentially compress the recirculated exhaust gas 66 in one or more compressor stages 158 of the compressor section 152. Subsequently, the compressed exhaust gas 170 may be supplied to the combustors 160 and fuel nozzles 164, as indicated by block 228. Steps 230, 232, 234, 236, and 238 may then repeat, until the process 220 eventually transitions to a steady state mode, as indicated by block 240. Upon the transition 240, the process 220 may continue to perform the steps 224 through 238, but may also begin to extract the exhaust gas 42 via the EG supply system 78, as indicated by block 242. For example, the exhaust gas 42 may be extracted from one or more extraction points 76 along the compressor section 152, the combustor section 154, and the turbine section 156 as indicated in FIG. 3. In turn, the process 220 may supply the extracted exhaust gas 42 from the EG supply system 78 to the hydrocarbon production system 12, as indicated by block 244. The hydrocarbon production system 12 may then inject the exhaust gas 42 into the earth 32 for enhanced oil recovery, as indicated by block 246. For example, the extracted exhaust gas 42 may be used by the exhaust gas injection EOR system 112 of the EOR system 18 illustrated in FIGS. 1-3.

Figure 5:
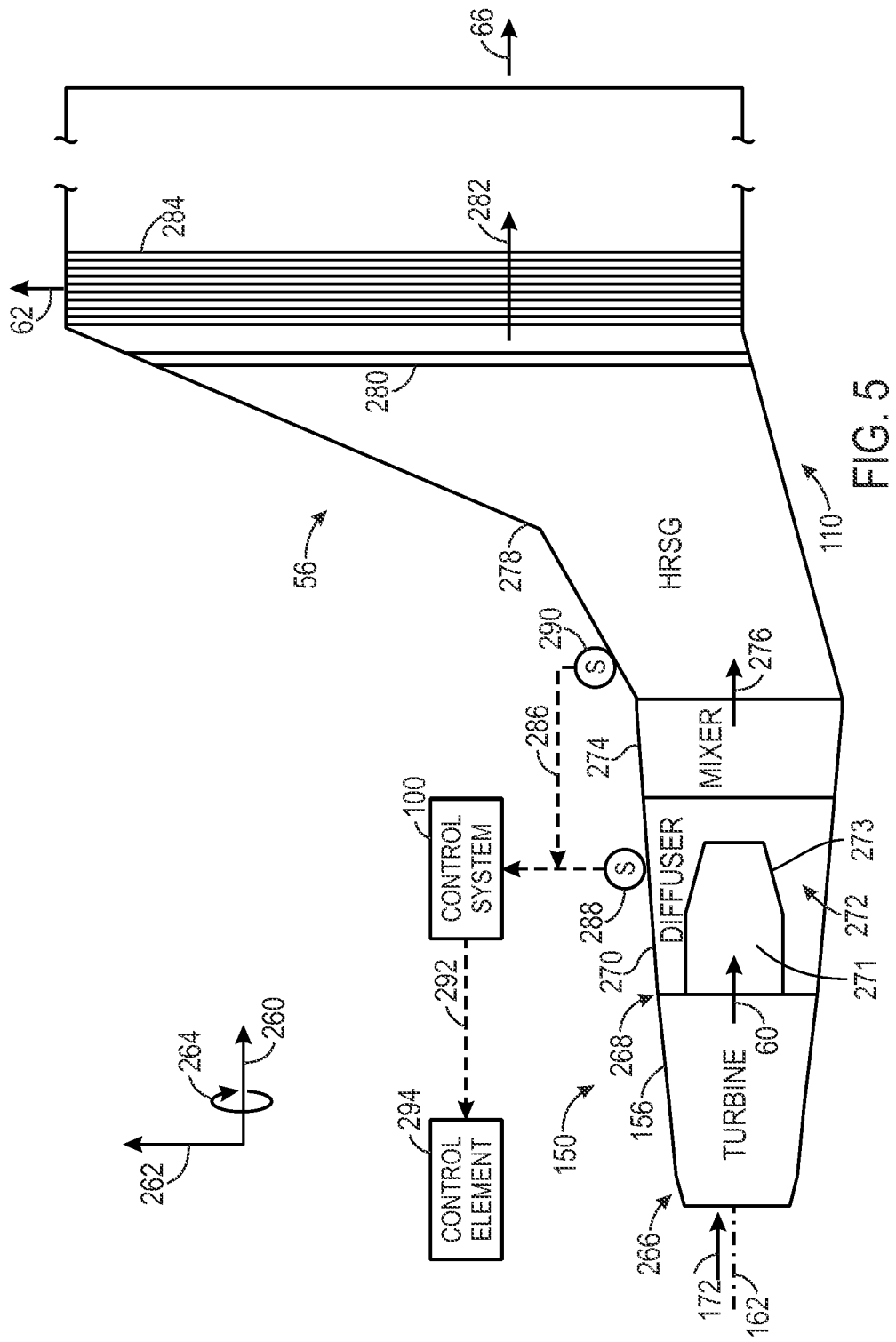
FIG. 5 is a diagram of an embodiment of a mixing device disposed between a gas turbine engine and a heat recovery steam generator (HRSG)

FIG. 5 is a diagram of a portion of the gas turbine engine 150 coupled to the HRSG 56. Elements in FIG. 5 in common with those shown in previous figures are labeled with the same reference numerals. The axial direction of the gas turbine engine 150 is indicated by arrow 260, the radial direction is indicated by arrow 262, and the circumferential direction is indicated by arrow 264. These directions are all with respect to the rotational axis 162. In the illustrated embodiment, the turbine section 156 includes an upstream end 266 and a downstream end 268. Specifically, the products of combustion 172 enter the upstream end 266 and exit the downstream end 268 as the exhaust gas 60. An exhaust section 270 (e.g., diffuser) is disposed downstream from the downstream end 268 of the turbine section 156. The exhaust section 270 may be used to expand and/or cool the exhaust gas 60 before directing the exhaust gas 60 to the exhaust recirculation path 110 (e.g., HRSG 56). Specifically, a cross-sectional area of the exhaust section 270 may increase in the direction of the exhaust gas 60 flow, thereby increasing the static pressure of the exhaust gas 60 by decreasing the kinetic energy of the exhaust gas 60. As shown in FIG. 5, the exhaust section 270 may include an exhaust passage 272 to receive the products of combustion 172 and/or exhaust gas 60. In addition, the exhaust section 270 may include a center body 271, which may surround a portion of the rotor of the turbine section 156. The center body 271 may be defined by an inner wall (e.g., inner barrel) 273.

In the illustrated embodiment, a mixing device 274 (e.g., mixer) is disposed in the exhaust section 270. Thus, the mixing device 274 receives the exhaust gas 60 conveyed by the exhaust passage 272. As discussed in detail below, the mixing device 274 may divide the exhaust gas 60 into first and second exhaust gases and combine the first and second exhaust gases to produce a mixed exhaust gas 276. In addition, the mixing device 274 may be a static mixing device with no moving parts. As shown in FIG. 5, the mixing device 274 may be disposed in the exhaust section 270 upstream of the HRSG 56. Specifically, the mixed exhaust gas 276 may enter an inlet section 278 of the HRSG 56 from the mixing device 274. The mixed exhaust gas 276 may expand as the mixed exhaust gas 276 flows through the inlet section 278 before reaching a catalyst section 280. The catalyst section 280 may include one or more of any of the catalyst units discussed in detail above, such as, but not limited to, the catalyst unit, the oxidation catalyst unit, or any combination thereof. As discussed below, the mixing device 274 may be disposed anywhere in the exhaust section 270. For example, the mixing device 274 may be disposed downstream of the center body 271 or may be coupled to the center body 271.

As discussed in detail below, the radial and/or circumferential uniformity of the mixed exhaust gas 276 may be greater than the radial and/or circumferential uniformity of the exhaust gas 60 entering the mixing device 274. For example, the degree of mixing of the mixed exhaust gas 276 may be quantified by a mathematical expression in which the concentration of hydrogen is added to the concentration of carbon monoxide and the sum is divided by the concentration of oxygen. Values of mass or volumetric flow rates may also be used in the expression instead of concentrations. In certain embodiments, a value greater than approximately 2 for the expression may indicate sufficient mixing of the components of the mixed exhaust gas 276. Thus, values of greater than approximately 2 distributed radially and/or circumferentially throughout the cross-section of the inlet section 278 may indicate improved radial and/or circumferential uniformity of the mixed exhaust gas 276. This improved radial and/or circumferential uniformity of the mixed exhaust gas 276 may increase the catalyst performance of the catalyst system 280. For example, the catalyst section 280 may be more uniformly affected by the mixed exhaust gas 276 and thus, the overall life of the catalyst section 280 may be increased. In contrast, the life of certain portions of the catalyst section 280 may be decreased when treating the nonuniform products of combustion 172 and/or exhaust gas 60, thereby causing the entire catalyst section 280 to be replaced even if some portions of the catalyst section 280 still have additional life. Treated exhaust gas 282 from the catalyst section 280 may pass through a first heat exchanger 284 of the HRSG 56. In certain embodiments, the first heat exchanger 284 (e.g., first HRSG unit) may include a plurality of heat exchanger tubes and may be used to generate steam 62. In further embodiments, the HRSG 56 may include additional heat exchangers (e.g., two, three, four, or more heat exchangers) that use the treated exhaust gas 282 to produce additional steam 62 (e.g., second, third, fourth, or more HRSG units). The exhaust gas 66 exiting from the HRSG 56 may be recirculated, as described in detail above.

As shown in FIG. 5, the control system 100 may be used to control one or more aspects of the operation of the gas turbine engine 150 and/or the HRSG 56. Specifically, the control system 100 may receive one or more input signals 286 from various sensors disposed throughout the gas turbine engine 150 and/or the HRSG 56. For example, an upstream sensor 288 may be disposed upstream of the mixing device 274 and a downstream sensor 290 may be disposed downstream of the mixing device 274. In other embodiments, a plurality of sensors (e.g., a grid) may be located at one axial 260 location in the inlet section 278 and distributed radially 262 and/or circumferentially 264 throughout the inlet section 278 to provide an indication of the radial and/or circumferential uniformity of the mixed exhaust gas 276. In further embodiments, the plurality of sensors maybe distributed at different axial 260, radial 262, and/or circumferential 264 positions upstream and/or downstream of the mixing device 274. In the illustrated embodiment, the upstream sensor 288 may provide information to the control system 100 indicative of the properties of the exhaust gas 60 entering the mixing device 274 and the downstream sensor 290 may send information indicative of the properties of the mixed exhaust gas 276. For example, the upstream and downstream sensors 288 and 290 may provide information indicative of the temperature, pressure, flow rate, and/or composition (e.g., oxygen, fuel, carbon monoxide, etc.) of the exhaust gas 60 and the mixed exhaust gas 276, respectively. Thus, the information provided by the upstream and downstream sensors 288 and 290 may be used by the control system 100 to determine the effectiveness of the mixing device 274. The control system 100 may then send an output signal 292 to one or more control elements 294 based on the performance of the mixing device 274. The control elements 294 may represent various elements of the gas turbine engine 150 and/or the HRSG 56, such as, but limited to, control valves, motors, actuators, or any combination thereof.

Figure 6:
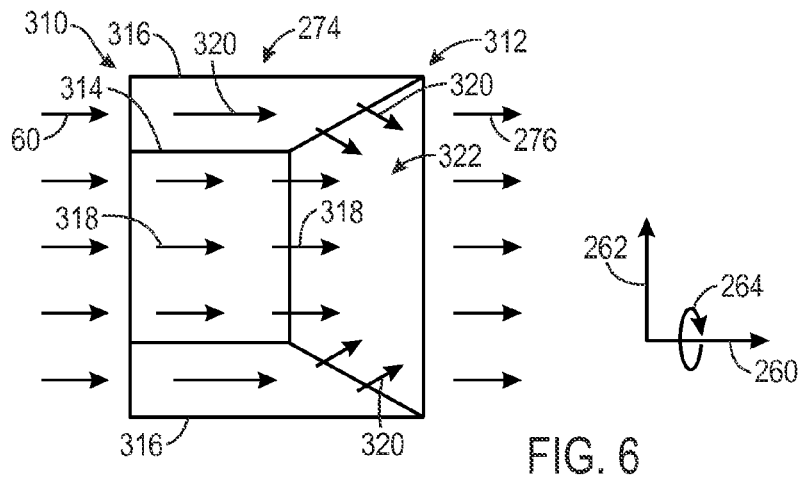
FIG. 6 is a schematic diagram of an embodiment of a mixing device.

FIG. 6 is a schematic diagram of an embodiment of the mixing device 274, which may be mounted in any location within the exhaust section 270. In other words, the mixing device 274 may be located in the exhaust section 270 anywhere between the turbine 156 and the HRSG 56. For example, the mixing device 274 may be placed on the center body 271 and coupled to the inner barrel 273 of the exhaust section 270. As shown in FIG. 6, the exhaust gas 60 enters an upstream side 310 of the mixing device 274 and the mixed exhaust gas 276 exits a downstream side 312. In addition, the mixing device 274 includes a first section 314 and a second section 316 that circumferentially 264 surrounds the first section 314. Thus, the mixing device 274 divides the exhaust gas 60 into a first exhaust gas 318 and a second exhaust gas 320. In other words, the first section 314 conveys the first exhaust gas 318 in a central region (e.g., a central exhaust gas flow) and the second section 316 conveys the second exhaust gas 320 in a peripheral region (e.g., a peripheral exhaust gas flow). As shown in FIG. 6, the first section 314 conveys the first exhaust gas 318 to a mixing region 322, and the second section 316 conveys the second exhaust gas 320 to the mixing region 322. Thus, the first and second exhaust gases 318 and 320 mix in the mixing region 322 to generate the mixed exhaust gas 276. In certain embodiments, the first section 314 may have a constant width, an increasing width, a decreasing width, or a combination thereof in the downstream direction. In other words, the first section 314 may have a constant cross-section, a diverging cross-section, or a converging cross-section.

In certain embodiments of the mixing device 274, the second section 316 may have an annular shape surrounding the first section 314. In other embodiments, the second section 316 may have a rectangular, square, oval, triangular, polygonal or other shape. In further embodiments, the first and second sections 314 and 316 may be mounted independently from one another in the exhaust section 270. For example, the first section 314 may be upstream of the second section 316 or vice versa. In further embodiments, the mixing device 274 may include only the first section 314 or only the second section 316. For example, the first section 314 may divide the exhaust gas 60 into the first exhaust gas 318 and the portion of the exhaust gas 60 not passing through the first section 314 may be the second exhaust gas 320. Similarly, the second section 316 may divide the exhaust gas 60 into the second exhaust gas 320 and the portion of the exhaust gas 60 not passing through the second section 316 may be the first exhaust gas 318. In either embodiment, the first and second exhaust gases 318 and 320 are mixed together in the mixing region 322 to generate the mixed exhaust gas 276. In addition, the mixing device 274 may have various configurations to generate the mixed exhaust gas 276, as described in detail below.

Figure 7:
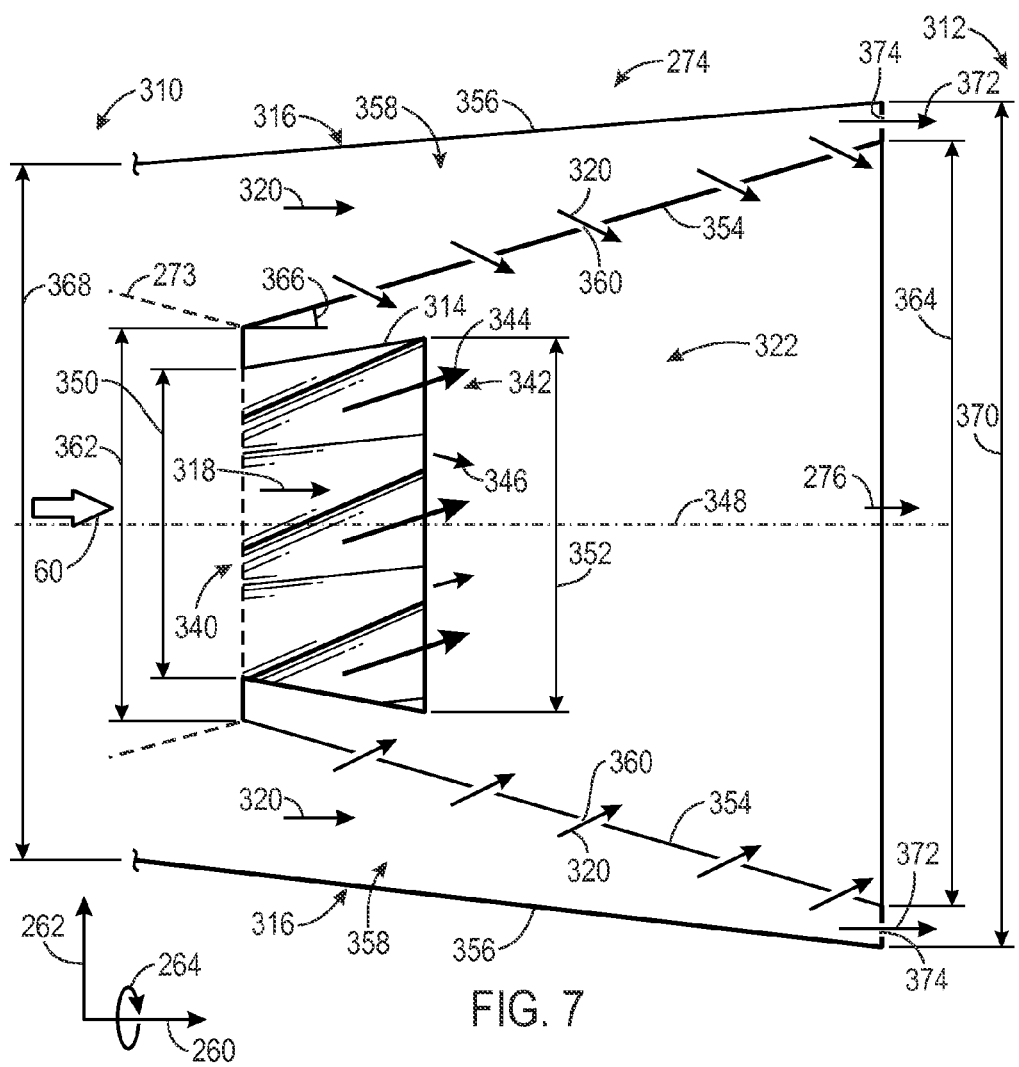
FIG. 7 is an axial cross-sectional view of an embodiment of a mixing device.

FIG. 7 is an axial cross-sectional view of an embodiment of the mixing device 274. As shown in FIG. 7 and described in detail below, the mixing device 274 is a static mixing device with no moving parts. In the illustrated embodiment, the first section 314 is a lobe mixer with an inlet 340 and an outlet 342. Lobe mixers generally have an annular, lobe-shaped (e.g., sinusoidal) surface that divides a gas stream into inner and outer portions. In addition, lobe mixers may have a lower pressure drop than other mixing devices. Further, the shape and/or number of lobes of the lobe mixer may be adjusted to achieve a desired separation of the gas stream. As shown in FIG. 7, the first exhaust gas 318 enters and flows through the first section 314 (e.g., lobe mixer), which divides the first exhaust gas 318 into a first portion 344 directed away from the axial axis 260 and a second portion 346 directed toward the axial axis 260. As shown in FIG. 7, a longitudinal axis 348 of the mixing device 274 may be generally parallel with the axial axis 260. Thus, the first section 314 surrounds the longitudinal axis 348. By dividing the first exhaust gas 318 into the first and second portions 344 and 346, the first section 314 may improve the mixing of the first exhaust gas 318 with the second exhaust gas 320. Specifically, the first portion 344 may be directed toward the second exhaust gas 320 to mix thoroughly with the second exhaust gas 320. The second portion 346 may also mix with the first portion 344 and/or the second exhaust gas 320. In the illustrated embodiment, the first section 314 has a diverging or expanding wall with an upstream diameter 350 that is less than a downstream diameter 352. Thus, the first exhaust gas 318 may generally expand as the first exhaust gas 318 flows through the first section 314. In other embodiments, the first section 314 has a converging or contracting wall with the upstream diameter 350 less than the downstream diameter 352. In some embodiments, the upstream and downstream diameters 350 and 352 may be approximately the same. In further embodiments, other types of mixers and/or flow separators may be used as the first section 314 instead of the lobe mixer shown in FIG. 7. In some embodiments, one or more fixtures (e.g., radial supports) may be coupled to the first section 314 and/or the second section 316 to help support the sections within the exhaust section 270. In certain embodiments, the first section 314 and/or the second section 316 may be coupled to the inner barrel 273 of the center body 271 for support, as indicated by the dashed lines in FIG. 7. In further embodiments, the first section 314 may be conical, curved, annular, convex, or concave. For example, a wall of the first section 314 may be tapered or curved in the downstream direction with an annular, rectangular, or other cross-section.

As shown in FIG. 7, the second section 316 includes an inner annular wall 354, an outer annular wall 356 surrounding the inner annular wall 354, and an annular passage 358 disposed between the inner and outer annular walls 354 and 356. The annular passage 358 may convey the second exhaust gas 320 to the mixing region 322. The inner annular wall 354 may be generally straight and may include a plurality of openings 360 to convey the second exhaust gas 320 from the annular passage 358 to the mixing region 322. As shown in FIG. 7, the plurality of openings 360 may be configured to generally direct the second exhaust gas 320 toward the longitudinal axis 348 to help increase mixing of the first and second exhaust gases 318 and 320. Thus, the second exhaust gas 320 may mix with the first and second portions 344 and 346 of the first exhaust gas 318 in the mixing region 322 to generate the mixed exhaust gas 276 exiting the downstream side 312 of the mixing device 274. As shown in FIG. 7, an upstream diameter 362 of the inner annular wall 354 is less than a downstream diameter 364. Thus, the inner annular wall 354 may have a generally conical shape that diverges toward the downstream side 312. In other embodiments, the upstream diameter 362 may be greater than the downstream diameter 364 (i.e., the conical shape converges toward the downstream side 312) or the upstream and downstream diameters 362 and 364 may be approximately the same. For example, the inner annular wall 354 may have a generally conical shape in an opposite direction than that shown in FIG. 7 or may have a generally cylindrical shape. The degree of the conical shape of the inner annular wall 354 may be characterized by an inner annular wall angle 366 with respect to the longitudinal axis 348.

In addition, the outer annular wall 356 of the second section 316 may be characterized by an upstream diameter 368 and a downstream diameter 370. As shown in FIG. 7, the upstream diameter 368 is less than the downstream diameter 370. Thus, the outer annular wall 356 has a generally conical shape. In other embodiments, the outer wall 356 may have an oval, square, rectangular, triangular, polygonal, or other cross-sectional shape. Thus, the mixing device 274 may generally follow the expanding shape of the exhaust section 270 to which the mixing device 274 is coupled thereto. As a result of the conical shapes of the inner and outer annular walls 354 and 356, a cross-sectional area of the annular passage 358 may generally decrease from the upstream side 310 toward the downstream side 312. In other embodiments, the upstream diameter 368 may be greater than the downstream diameter 370 or the upstream and downstream diameters 368 and 370 may be approximately the same. In certain embodiments, a portion 372 of the second exhaust gas 320 may exit the second section 316 through openings 374 between the inner and outer annular walls 354 and 356 to help provide cooling and/or help reduce hot spots adjacent the outer annular wall 356 downstream of the mixing device 274. In further embodiments, the second section 316 may have a rectangular, square, triangular, polygonal, oval, or other cross-sectional shape and the second section 316 may have walls that diverge, converge or are approximately the same distance from one another.

Figure 8:
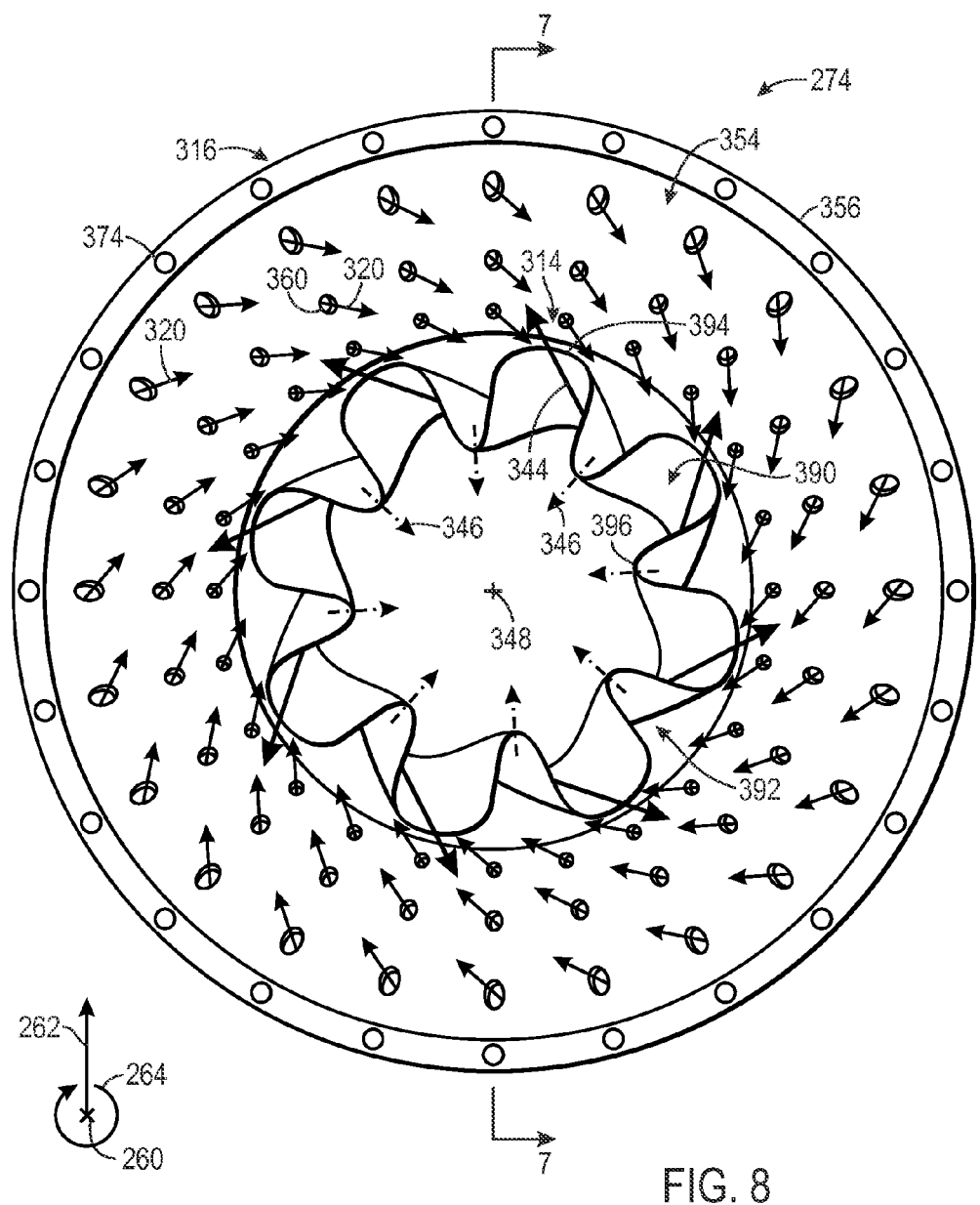
FIG. 8 is a radial perspective view of an embodiment of a mixing device.

FIG. 8 is a radial perspective view of an embodiment of the mixing device 274. The axial cross-sectional view of the mixing device 274 shown in FIG. 7 is taken along the line 7-7 of FIG. 8. As shown in FIG. 8, the second section 316 circumferentially 264 surrounds the first section 314. In addition, the plurality of openings 360 are distributed uniformly circumferentially about the inner annular wall 354 of the second section 316. For example, the plurality of openings 360 may be arranged in a pattern of radial spokes (e.g., aligned in the radial direction 262) and circumferential rings (e.g., concentric rings of openings 360). Thus, the second section 316 provides a generally uniform distribution of the second exhaust gas 320. In other embodiments, the pattern of the plurality of openings 360 may be different than that shown in FIG. 8 or may be an irregular pattern. For example, more of the plurality of openings 360 may be distributed toward the longitudinal axis 348 than toward the outer annular wall 356 or vice versa. In the illustrated embodiment, each of the plurality of openings 360 may be of approximately the same size. In other embodiments, sizes of the plurality of openings 360 may be adjusted to achieve a desired mixing of the first and second exhaust gases 318 and 320. For example, increasing the sizes of the plurality of openings 360 may reduce the pressure drop associated with the second section 316. Thus, by combining the low pressure drop of the first section 314 (e.g., lobe mixer) with the low pressure drop of the second section 316 may produce a mixing device 274 with an overall low pressure drop. In various embodiments, the mixing device 274 may have a pressure loss between approximately 125 pascals to approximately 500 pascals, approximately 200 pascals to approximately 425 pascals, approximately 250 pascals to approximately 375 pascals, or approximately 300 pascals to approximately 325 pascals. For example, in one embodiment, the mixing device 274 may have a pressure loss less than approximately 500 pascals. By using embodiments of the mixing device 274 with such low pressure drops, there may be little to no change to the efficiency of the gas turbine engine 150 and/or the pressure recovery of the exhaust section 270. In other words, the mixing device 274 may have only a small effect on the efficiency and/or pressure recovery. In other embodiments, the plurality of openings 360 may have different shapes, such as, but not limited to, circles, ovals, squares, rectangles, triangles, polygons, slots, and so forth.

As illustrated in FIG. 8, each of the plurality of openings 360 has an axis oriented at an offset from the longitudinal axis 348, such that the plurality of openings 360 imparts a swirling motion to the second exhaust gas 320, as represented by the direction of the arrows representing the second exhaust gas 320. In other words, the second exhaust gas 320 has a generally clockwise circumferential swirling motion, as shown in FIG. 8. In other embodiments, the plurality of openings 360 may impart a generally counterclockwise circumferential swirling motion to the second exhaust gas 320. In further embodiments, the plurality of openings 360 may impart both clockwise and counterclockwise swirling motion to the second exhaust gas 320. For example, a first circumferential ring of openings 360 may impart a clockwise swirling motion and a second circumferential ring of openings 360 disposed inside or outside the first circumferential ring may impart a counterclockwise swirling motion to help increase mixing of the second exhaust gas 320 with the first exhaust gas 318. In such embodiments, the plurality of openings 360 may be disposed in a pattern including 2, 3, 4, 5, or more circumferential rings.

As shown in FIG. 8, the first section 314 is a lobe mixer with an annular sinusoidal shape. As illustrated, the annular sinusoidal shape of the first section 314 includes alternating first open-ended passages 390 and second open-ended passages 392. The first open-ended passages 390 direct the first portion 344 of the first exhaust gas 318 away from the longitudinal axis 348 and the second open-ended passages 392 direct the second portion 346 of the first exhaust gas 318 toward the longitudinal axis 348. Thus, the first and second portions 344 and 346 may diverge from one another. The first section 314 (e.g., lobe mixer) may also be characterized by peaks 394 and valleys 396. The peaks 394 may correspond to the first open-ended passages 390 and the valleys 396 may correspond to the second open-ended passages 392. Although shown with a particular shape and arrangement of first and second open-ended passages 390 and 392 in FIG. 8, in other embodiments, the first section 314 (e.g., lobe mixer) may have other configurations to achieve a desired mixing of the first and second exhaust gases 318 and 320 to generate the mixed exhaust gas 276. For example, the shape of the first section 314 (e.g., lobe mixer) may be adjusted and/or the number of peaks 394 and valleys 396 may be varied. In certain embodiments, the first section 314 (e.g., lobe mixer) may be configured to impart a swirling motion to the first exhaust gas 318. In other words, each of the first and second open-ended passages 390 and 392 may have an axis oriented at an offset from the longitudinal axis 348 such that the passages 390 and 392 impart a swirling motion to the first exhaust gas 318, as represented by the direction of the arrows representing the first and second portions 344 and 346. As shown in FIG. 8, the first and second portions 344 and 346 may have a generally counterclockwise swirling motion. Thus, the first and second section 314 and 316 may impart opposite swirling motions to the first and second exhaust gases 318 and 320 to improve mixing of the mixed exhaust gas 276, thereby improving the radial and/or circumferential uniformity of the mixed exhaust gas 276. In other words, the mixing device 274 homogenizes the spatial (or radial and/or circumferential) variation of the exhaust gas 60 to produce the mixed exhaust gas 276. In other embodiments, the first and second sections 314 and 316 may impart swirling motions to the first and second exhaust gases 318 and 320 in the same direction.

Figure 9:
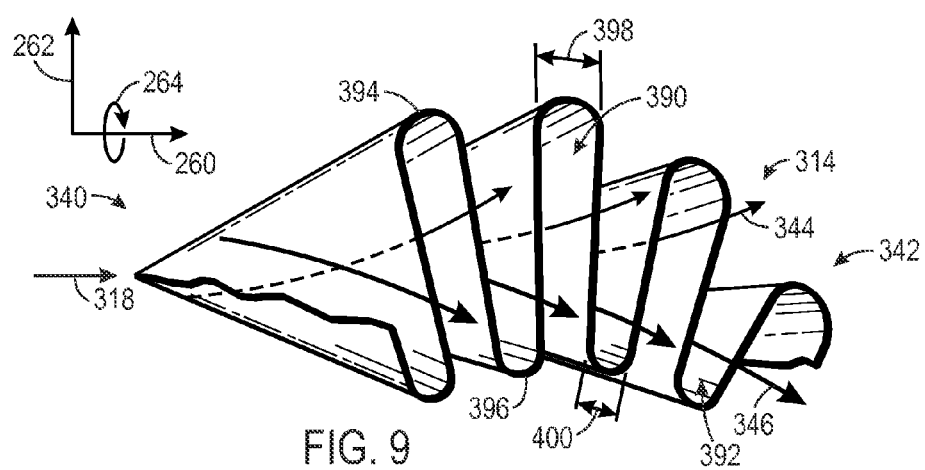
FIG. 9 is a partial perspective view of a first section of an embodiment of a mixing device.

FIG. 9 is a partial perspective view of the first section 314. As shown in FIG. 9, the first section 314 is a lobe mixer. As illustrated, the first exhaust gas 318 is divided into the first and second portions 344 and 346 by the first and second open-ended passages 390 and 392. Although only a portion of the first section 314 is shown in FIG. 9, it is understood that the alternating sinusoidal pattern (e.g., wavy, zig-zagy, alternating inward and outward curving, etc.) of the first section 314 (e.g., lobe mixer) may continue circumferentially 264 about the longitudinal axis 348. As illustrated, the first open-ended passages 390 (e.g., peaks 394) may be characterized by a first width 398 and the second open-ended passages 392 (e.g., valleys 396) may be characterized by a second width 400. As shown in FIG. 9, the width 398 of the first open-ended passages 390 may be greater than the width 400 of the second open-ended passages 392 to direct more of the first exhaust gas 318 into the first portion 344 than the second portion 346. In other embodiments, the second width 400 may be greater than the first width 398 or the first and second widths 398 and 400 may be approximately the same.

Figure 10:
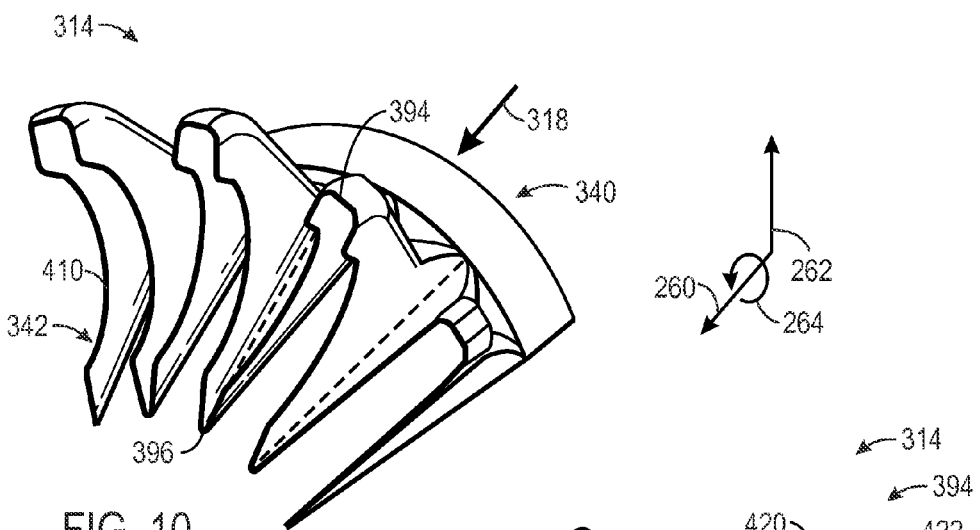
FIG. 10 is a partial perspective view of a first section of an embodiment of a mixing device with scalloped lobes.

FIG. 10 is a partial perspective view of the first section 314 of the mixing device 274 with scalloped lobes 410. In other words, the scalloped lobes 410 have portions removed (e.g., radial openings or cuts) compared to the first section 314 (e.g., lobe mixer) shown in FIG. 9. The scalloped lobes 410 may affect the distribution of the first and second portions 344 and 346. In addition, the scalloped lobes 410 may improve the amount of mixing of the first and second exhaust gases 318 and 320, thereby improving radial and/or circumferential uniformity of the mixed exhaust gas 276.

Figure 11:
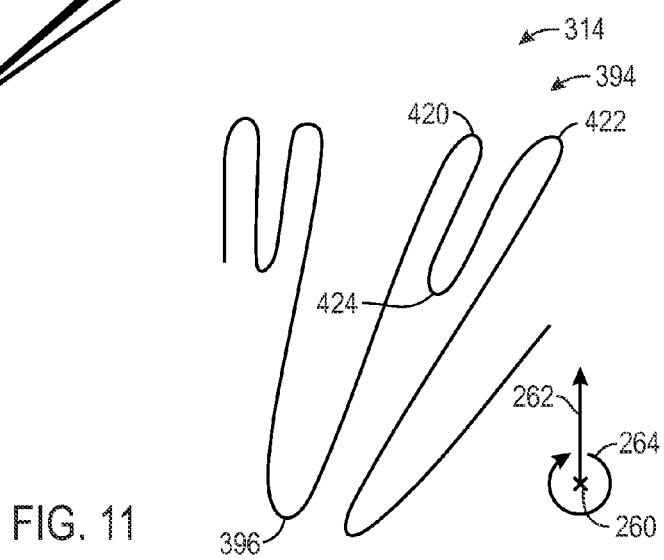
FIG. 11 is a partial radial perspective view of an embodiment of a mixing device with multiple lobes.

FIG. 11 is a partial perspective view of the first section 314 of the mixing device 274 with multiple lobes. Specifically, each of the peak areas 394 may include a first peak 420, a second peak 422, and a valley 424, which may change the distribution of the first and second portions 344 and 346. In addition, the configuration of the peak area 394 may direct more of the first exhaust gas 318 toward the second exhaust gas 320, thereby improving radial and/or circumferential uniformity of the mixed exhaust gas 276. In certain embodiments, one or more of the lobes of the first section 314 may include turbulators to increase the amount of mixing of the mixed exhaust gas 276.

Figure 12:
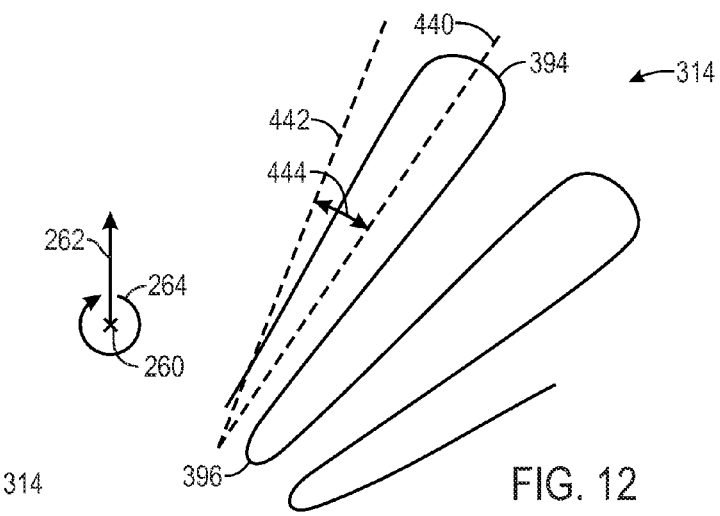
FIG. 12 is a partial radial perspective view of an embodiment of a mixing device with angled lobes.

FIG. 12 is a perspective view of the first section 314 of the mixing device 274 with angled lobes. Specifically, each of the lobes may be aligned with a lobe axis 440 that is offset from a radial axis 442 by an angle 444, which may impart a swirling motion to the first and second portions 344 and 346 of the first exhaust gas 318. Thus, the first section 314 shown in FIG. 12 may help improve circumferential mixing of the first and second exhaust gases 318 and 320, thereby improving radial and/or circumferential uniformity of the mixed exhaust gas 276. In addition, the first section 314 may cause more of the second exhaust gas 320 to move toward the first exhaust 318, also improving the radial and/or circumferential uniformity of the mixed exhaust gas 276.

Figure 13:
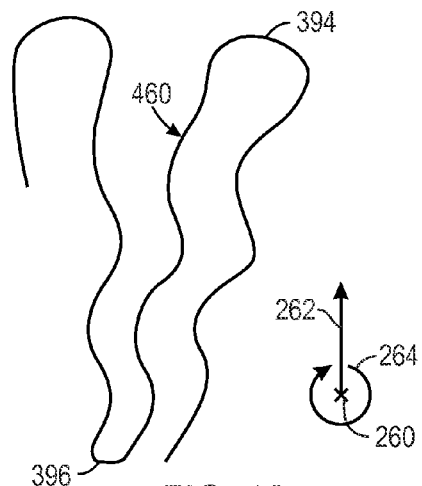
FIG. 13 is a partial radial perspective view of an embodiment of a mixing device with ribbed lobes.

FIG. 13 is a perspective view of the first section 314 of the mixing device 274 with ribbed lobes 460, which may increase mixing of the first and second exhaust gases 318 and 320, thereby improving the radial and/or circumferential uniformity of the mixed exhaust gas 276. In certain embodiments, the ribbed lobes 460 may be uniform or non-uniform, may increase or decrease in frequency or amplitude of waves that define the ribs in either the radial inward or outward direction. The amount of ribbing may vary from one lobe to another or be the same.

Figure 14:
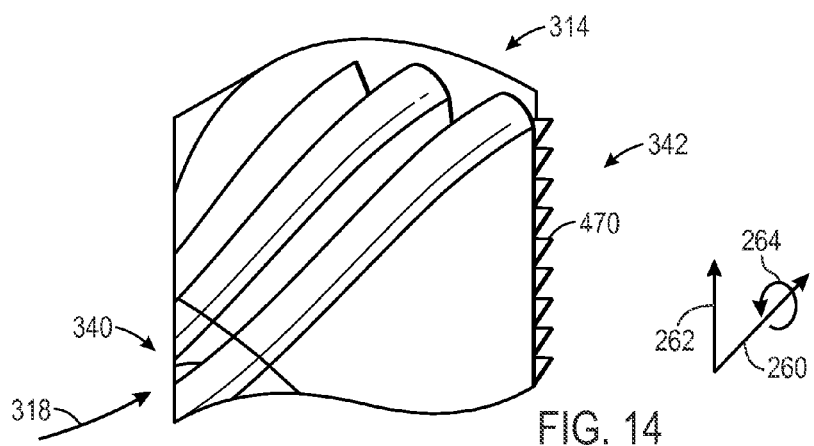
FIG. 14 is a partial radial perspective view of an embodiment of a mixing device with serrated lobes.

FIG. 14 is a perspective view of the first section 314 of the mixing device 274 with serrated lobes 470 (i.e., edges of the lobes are serrated), which may increase mixing of the first and second exhaust gases 318 and 320, thereby improving the radial and/or circumferential uniformity of the mixed exhaust gas 276. In certain embodiments, the serrated lobes 460 may be uniform or non-uniform, may increase or decrease in frequency or amplitude of waves. The amount of serrating may vary from one lobe to another or be the same.

Figure 15:
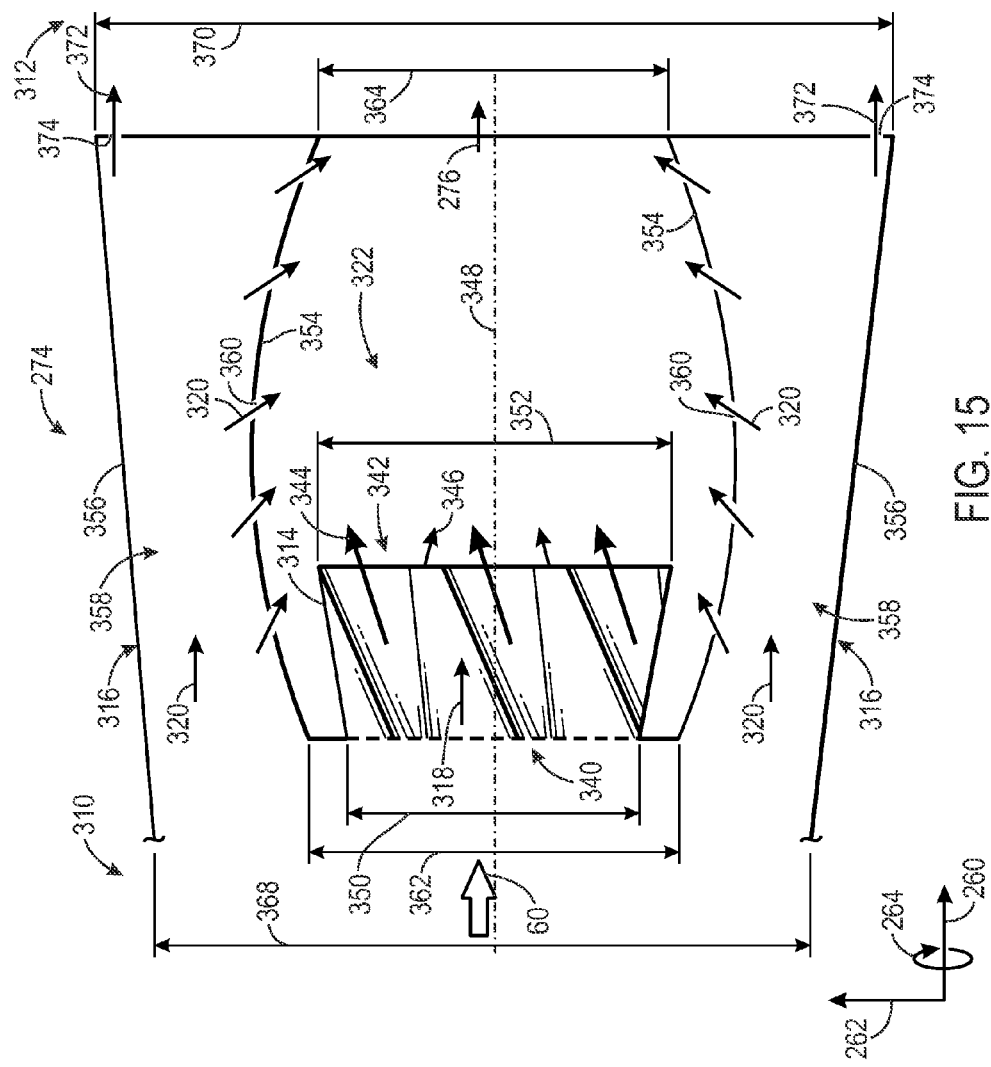
FIG. 15 is an axial cross-sectional view of an embodiment of a mixing device with a concave surface of a second section facing toward a first section of the device.

FIG. 15 is an axial cross-sectional view of an embodiment of the mixing device 274. In the illustrated embodiment, the inner annular wall 354 of the second section 316 gradually expands (e.g., diverges) and then contracts (e.g., converges) in a downstream direction, thereby defined a curved shape of the wall in the downstream direction. Specifically, the inner annular wall 354 has a concave shape in the downstream direction along the longitudinal axis 348. Thus, the second exhaust gas 320 may be directed toward the first exhaust gas 318 in a different manner than that of the mixing device 274 shown in FIG. 7. Accordingly, the mixed exhaust gas 276 may have a different radial and/or circumferential uniformity than that shown in FIG. 7. In addition, the upstream diameter 362 of the inner annular wall 354 is greater than the downstream diameter 364. Thus, the cross-sectional area of the annular passage 358 generally decreases and then increases from the upstream side 310 to the downstream side 312. In other embodiments, the upstream diameter 362 may be less than the downstream diameter 364 or the upstream and downstream diameters 362 and 364 may be approximately the same. In certain embodiments, more of the second exhaust gas 320 may exit the second section 316 through the openings 374. In other respects, the embodiment of the mixing device 274 shown in FIG. 10 is similar to other embodiments described in detail above.

Figure 16:
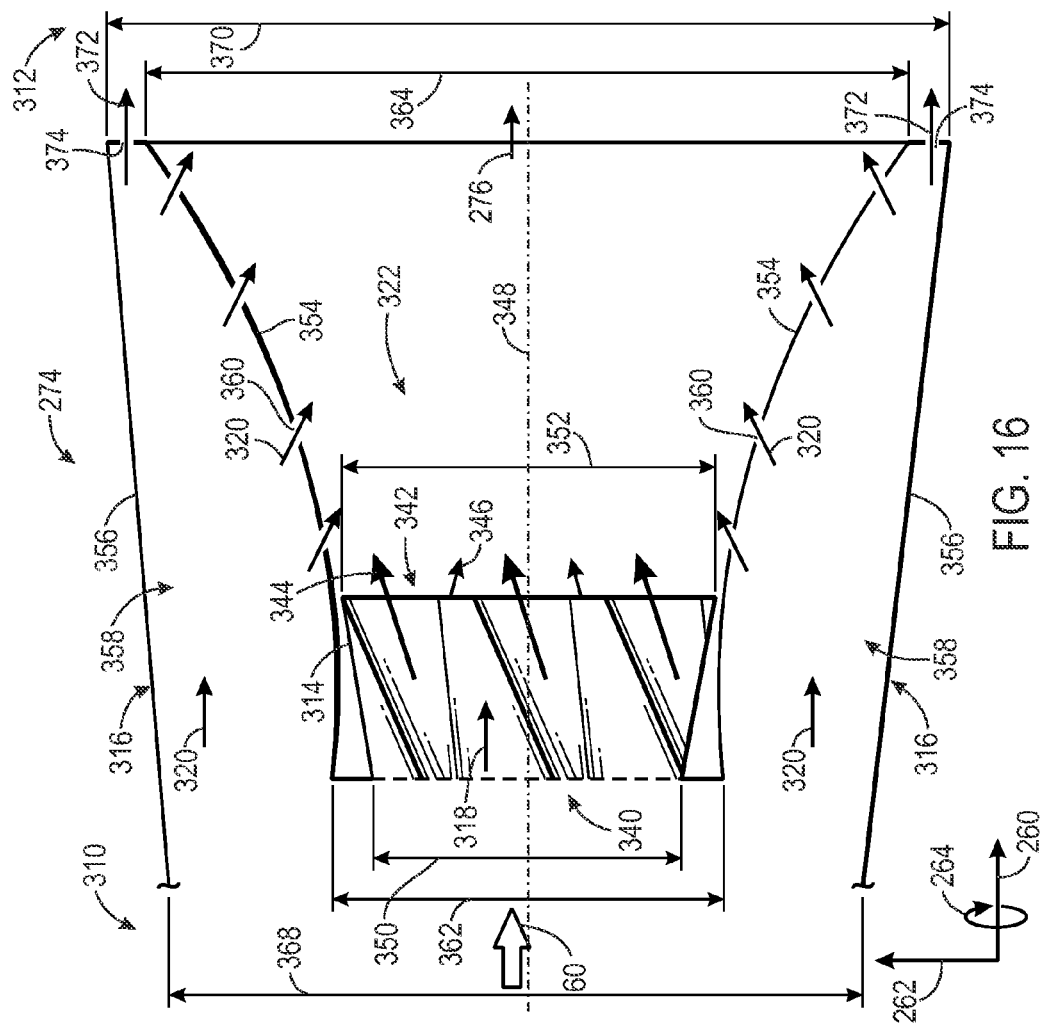
FIG. 16 is an axial cross-sectional view of an embodiment of a mixing device with a convex surface of a second section facing toward a first section of the device.

FIG. 16 is an axial cross-sectional view of an embodiment of the mixing device 274. In the illustrated embodiment, the inner annular wall 354 gradually contracts (e.g., converges) and then expands (e.g., diverges) in a downstream direction, thereby defining a curved shape of the wall in the downstream direction. Specifically, the inner annular wall 354 has a convex shape in the downstream direction along the longitudinal axis 348. Thus, the second exhaust gas 320 may be directed toward the first exhaust gas 318 in a different manner than that of the mixing devices 274 shown in FIGS. 7 and 15. Accordingly, the mixed exhaust gas 276 may have a different radial and/or circumferential uniformity than that shown in FIGS. 7 and 15. In addition, the upstream diameter 362 of the inner annular wall 354 is less than the downstream diameter 364. Thus, the cross-sectional area of the annular passage 358 generally increases and then decreases from the upstream side 310 to the downstream side 312. In other embodiments, the upstream diameter 362 may be greater than the downstream diameter 364 or the upstream and downstream diameters 362 and 364 may be approximately the same. In other respects, the embodiment of the mixing device 274 shown in FIG. 15 is similar to other embodiments described in detail above.

Figure 17:
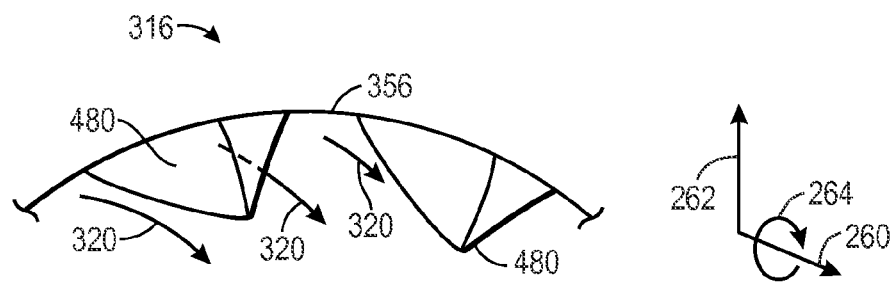
FIG. 17 is a partial perspective view of a second section of an embodiment of a mixing device with vortex generators.

FIG. 17 is a partial perspective view of the second section 316 of an embodiment of the mixing device 274 with vortex generators 480, which may be shaped and/or configured in a variety of ways. For example, the vortex generators 480 may have a generally triangular cross-sectional shape that increases in the downstream direction. As shown in FIG. 17, the vortex generators 480 may be coupled to an inner surface of the outer annular wall 356. Such vortex generators 480 may impart turbulence and/or a vortex to the second exhaust gas 320 downstream of the vortex generators 480, thereby increasing the radial and/or circumferential uniformity of the mixed exhaust gas 276. In addition, the vortex generators 480 may provide additional mixing near the outer annular wall 356.

Figure 18:
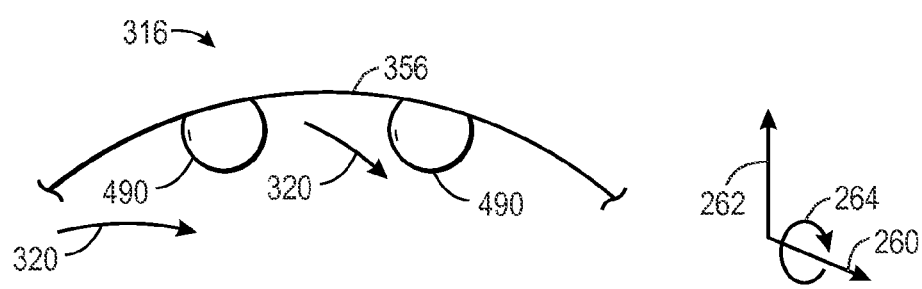
FIG. 18 is a partial perspective view of a second section of an embodiment of a mixing device with semi-spherical protrusions.

FIG. 18 is a partial perspective view of the second section 316 of an embodiment of the mixing device 274 with semi-spherical protrusions 490, which may impart turbulence and/or a vortex to the second exhaust gas 320 downstream of the vortex generators 480, thereby increasing the radial and/or circumferential uniformity of the mixed exhaust gas 276. As shown in FIG. 17, the semi-spherical protrusions 480 may be coupled to an inner surface of the outer annular wall 356. In addition, the semi-spherical protrusions 490 may provide additional mixing near the outer annular wall 356. In other embodiments, the semi-spherical protrusions 490 may have other shapes, such as cylindrical rods, squares, triangles, and so forth.

Figure 19:
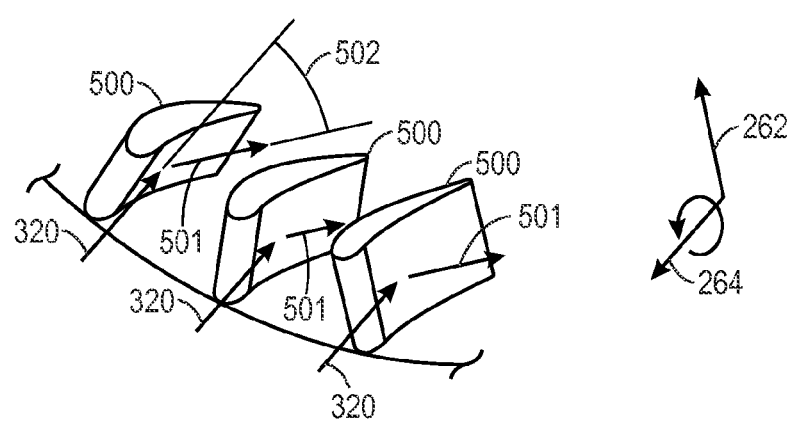
FIG. 19 is a partial perspective view of a second section of an embodiment of a mixing device with guide vanes.

FIG. 19 is a partial perspective view of the second section 316 of an embodiment of the mixing device 274 with guide vanes (e.g., impellers) 500 coupled to the inner surface of the outer annular wall 356. The guide vanes 500 may be shaped and/or configured in a variety of ways to impart a swirl to the second exhaust gas 320. For example, as shown in FIG. 19, the guide vanes 500 may be shaped to redirect the flow of the second exhaust gas 320 from generally parallel to the axial direction 260 to being offset at an angle 502 from the longitudinal axis 348 as indicated by arrows 501, thereby imparting swirl to the second exhaust gas 320. In various embodiments, the swirl imparted to the second exhaust gas 320 may be in a clockwise direction or a counterclockwise direction. Thus, the guide vanes 500 of the second section 316 shown in FIG. 19 may help improve circumferential mixing of the first and second exhaust gases 318 and 320, thereby improving radial and/or circumferential uniformity of the mixed exhaust gas 276.

Figure 20:
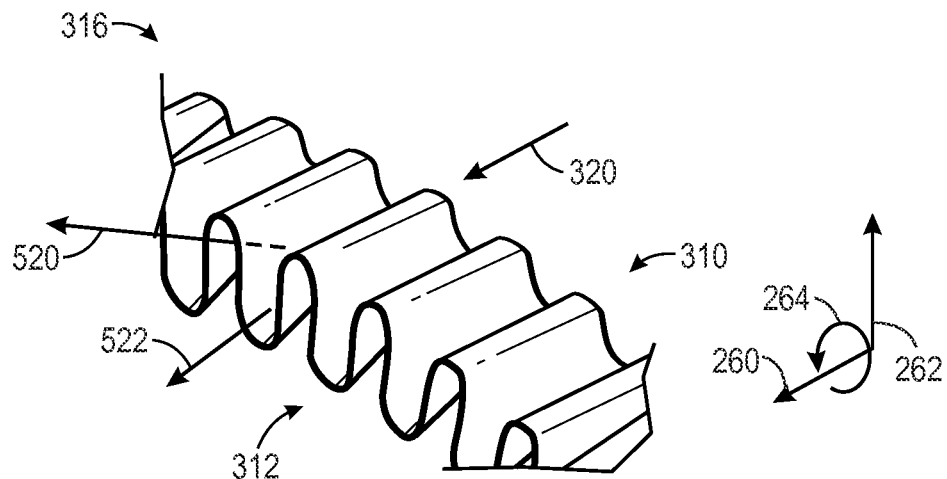
FIG. 20 is a partial perspective view of a second section of an embodiment of a mixing device with open lobes.

FIG. 20 is a partial perspective view of the second section 316 of an embodiment of the mixing device 274 with open lobes (i.e., flow enters both above and below each lobe). Specifically, the second exhaust gas 320 may enter the upstream side 310 of the second section 316 (e.g., lobe mixer) and exit as a first outer stream 520 and a second outer stream 522, which both may then mix with the first exhaust gas 318 to produce the mixed exhaust gas 276. As with the first section 314, the shape and/or number of lobes of the lobe mixer of the second section 316 may be adjusted to achieve a desired separation of the gas second exhaust gas 320 into the first and second outer streams 520 and 522.

Figure 21:
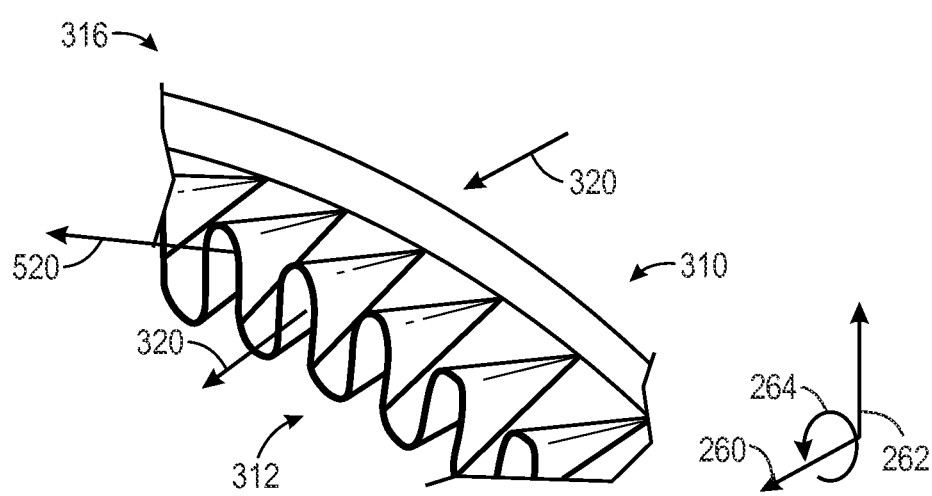
FIG. 21 is a partial perspective view of a second section of an embodiment of a mixing device with closed lobes.

FIG. 21 is a partial perspective view of the second section 316 of an embodiment of the mixing device 274 with closed lobes (i.e., flow enters only below each lobe). Specifically, a portion of the second exhaust gas 320 may enter the upstream side 310 of the second section 316 (e.g., lobe mixer) and exit as a first outer stream 520 and the rest of the second exhaust gas 320 may bypass the second section 316. As with the first section 314, the shape and/or number of lobes of the lobe mixer of the second section 316 may be adjusted to achieve a desired separation of the gas second exhaust gas 320 into the first and second outer streams 520 and 522.

Figure 22:
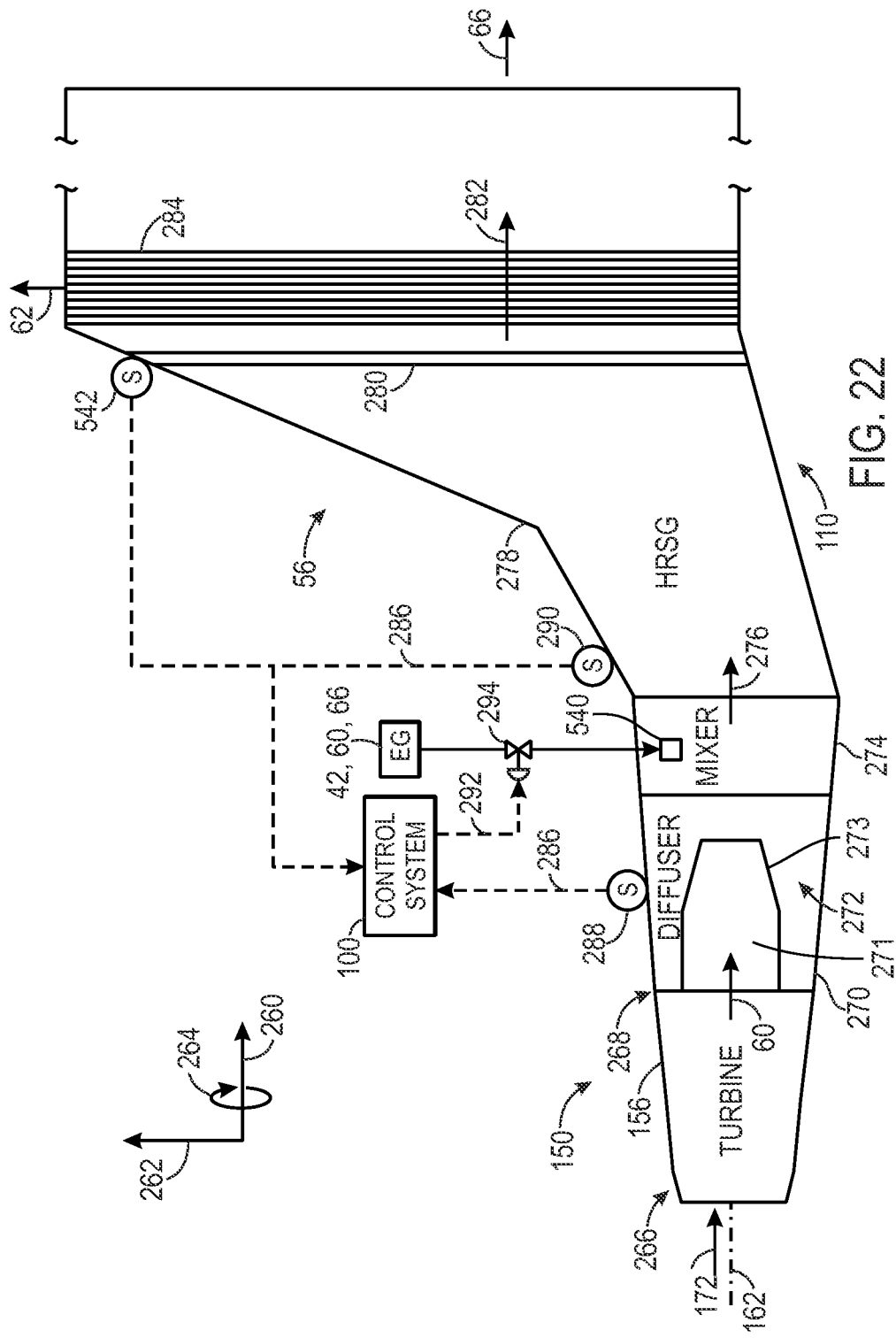
FIG. 22 is a diagram of an embodiment of a mixing device and an exhaust gas injection system disposed between a gas turbine engine and a heat recovery steam generator (HRSG)

FIG. 22 is a diagram of a portion of the gas turbine engine 150 coupled to the HRSG 56. Elements in FIG. 22 in common with those shown in previous figures are labeled with the same reference numerals. In the illustrated embodiment, the mixing device 274 (e.g., mixer) divides the exhaust gas 60 into first and second exhaust gases and combines the first and second exhaust gases to produce the mixed exhaust gas 276. As shown in FIG. 22, the gas turbine engine 150 includes an exhaust injection system 540 that injects a pressurized exhaust gas (e.g., the exhaust gas 42, exhaust gas 60, or exhaust gas 66, or any combination thereof) into the mixing device 274. In various embodiments, the pressurized exhaust gas may be any low-oxygen containing gas present or generated in the turbine-based service system 14 that is at a pressure greater than the pressure of the exhaust section 270. For example, the pressurized exhaust gas may be exhaust gas 42 extracted from the combustors 160 or from one or more stages of the compressor section 152. As described in detail below, the injection of the pressurized exhaust gas may further improve mixing of the first and second exhaust gases to produce the mixed exhaust gas 276. For example, the injection of the pressurized exhaust gas may further homogenize any spatial variation in the mixed exhaust gas 276, which may increase the catalyst performance of the catalyst system 280, as described in detail above. In certain embodiments, the exhaust injection system 540 may be disposed upstream of the mixing device 274.

In shown in FIG. 22, the flow of the pressurized exhaust gas (e.g., the exhaust gas 42, exhaust gas 60, or exhaust gas 66, or any combination thereof) to the exhaust gas injection system 540 may be adjusted using the control element 294 (e.g., a control valve). In addition, a catalyst system sensor 542 may be disposed in the catalyst system 280 and used to provide an indication of the condition of the catalyst system 280. In certain embodiments, a plurality of catalyst system sensors 542 (e.g., a grid) may be located within the catalyst system 280. The catalyst system sensor 542 may provide an indication of a pressure, temperature, flow rate, and/or composition within the catalyst system 280. The control system 100 may receive the input signal 286 from at least one of the catalyst system sensor 542, the upstream sensor 288, or the downstream sensor 290, or any combination thereof to determine whether to adjust the flow rate of the pressurized exhaust gas to the exhaust gas injection system 540 using the control element 294 (e.g., control valve). For example, the plurality of catalyst system sensors 542 may indicate that some portions of the catalyst system 280 are at a higher temperature than other portions, which may indicate a nonuniform distribution of the mixed exhaust gas 276. In response, the control system 100 may increase the flow of the pressurized exhaust gas to the exhaust gas injection system 540 to help increase the uniformity of the mixed exhaust gas 276.

Figure 23:
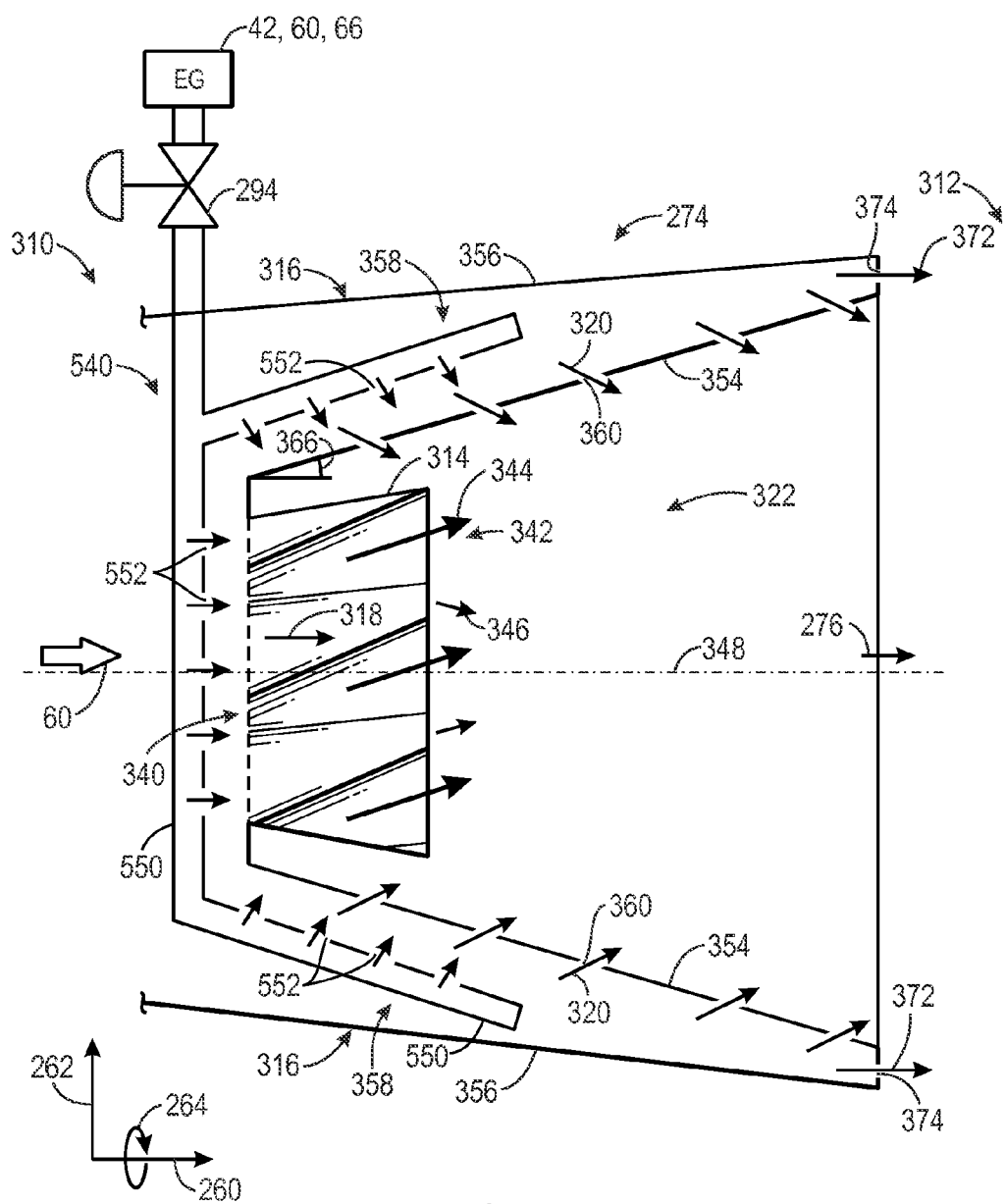
FIG. 23 is an axial cross-sectional view of an embodiment of a mixing device and an exhaust gas injection system.

FIG. 23 is an axial cross-sectional view of an embodiment of the mixing device 274. Elements in FIG. 23 in common with those shown in previous figures are labeled with the same reference numerals. In the illustrated embodiment, the exhaust injection system 540 injects the pressurized exhaust gas (e.g., the exhaust gas 42, exhaust gas 60, or exhaust gas 66, or any combination thereof) into the mixing device 274. Specifically, the exhaust injection system 540 includes one or more injection structures 550 to convey the pressurized exhaust gas to portions of the mixing device 274. In certain embodiments, each injection structure 550 may be a tube, pipe, conduit, or other structure configured to convey the pressurized exhaust gas. In particular embodiments, each injection structure 550 may be routed along one or more support structures disposed within the exhaust section 270 and/or mixing device 274 (e.g., support structures for the first section 314). In addition, the one or more injection structures 550 may include a plurality of injection openings 552 to enable the pressurized exhaust gas to mix with the first exhaust gas 318 and/or the second exhaust gas 320. For example, in various embodiments, the exhaust injection system 540 may be used to inject the pressurized exhaust gas into the first section 314, the second section 316, or both sections 314 and 316 depending on where additional homogenization of the mixed exhaust gas 276 is desired. In further embodiments, the exhaust injection system 540 may be configured to have a low pressure drop, thereby increasing the efficiency of the gas turbine engine 150 and/or improving the pressure recovery of the exhaust section 270. For example, the injection structures 550 may have an aerodynamic cross-sectional shape. In other embodiments, it is envisioned that other configurations of the injection structure 550 and injection openings 552 may be used for the exhaust injection system 540.

As described above, certain embodiments of the gas turbine engine 150 may include a combustor section 154 having one or more combustors 160 configured to generate combustion products. In addition, the gas turbine engine 150 may include the turbine section 156 having one or more turbine stages 174 between the upstream end 266 and the downstream end 268, and the exhaust section 270 disposed downstream from the downstream end 268. The mixing device 274 may be coupled to the exhaust section 270. The mixing device 274 may divide the exhaust gas 60 into the first exhaust gas 318 and the second exhaust gas 320, and combine the first and second exhaust gases 318 and 320 in the mixing region 322 to produce the mixed exhaust gas 276. As a result of this process, the mixed exhaust gas 276 may have a more uniform radial and/or circumferential distribution of properties than the exhaust gas 60. For example, one or more of the pressure, temperature, flow rate, and/or composition of the mixed exhaust gas 276 may be more radially and/or circumferentially uniform than the exhaust gas 60. The improved radial and/or circumferential uniformity of the mixed exhaust gas 276 may have a positive impact on downstream equipment and processes. For example, the improved radial and/or circumferential uniformity of the composition of the mixed exhaust gas 276 may improve the performance of the catalyst section 280. In addition, the configuration of the mixing device 274 may have a low pressure drop, thereby improving the overall pressure recovery of the exhaust section 270. Thus, use of the mixing device 274 may improve the overall efficiency and cost-effectiveness of the SEGR gas turbine system 52.

Additional Description

The present embodiments provide systems and methods for gas turbine engines. It should be noted that any one or a combination of the features described above may be utilized in any suitable combination. Indeed, all permutations of such combinations are presently contemplated. By way of example, the following clauses are offered as further description of the present disclosure:

Embodiment 1

A system, comprising: a combustor section having one or more combustors configured to generate combustion products; a turbine section having one or more turbine stages between an upstream end and a downstream end, wherein the one or more turbine stages are driven by the combustion products an exhaust section disposed downstream from the downstream end of the turbine section, wherein the exhaust section has an exhaust passage configured to receive the combustion products as an exhaust gas; and a mixing device disposed in the exhaust section, wherein the mixing device is configured to divide the exhaust gas into a first exhaust gas and a second exhaust gas, and to combine the first and second exhaust gases in a mixing region to produce a mixed exhaust gas.

Embodiment 2

The system of embodiment 1, wherein the mixing device comprises a first section configured to convey the first exhaust gas to the mixing region and a second section configured to convey the second exhaust gas to the mixing region, wherein the second section circumferentially surrounds the first section.

Embodiment 3

The system defined in any preceding embodiment, wherein the first section is disposed surrounding a longitudinal axis of the mixing device, and the second section comprises an annular shape surrounding the first section.

Embodiment 4

The system defined in any preceding embodiment, wherein the second section comprises a plurality of openings configured to convey the second exhaust gas to the mixing region.

Embodiment 5

The system defined in any preceding embodiment, wherein the plurality of openings are distributed uniformly circumferentially about the second section.

Embodiment 6

The system defined in any preceding embodiment, wherein each of the plurality of openings has an axis oriented at an offset from a longitudinal axis of the mixing device such that the plurality of openings are configured to impart a swirling motion to the second exhaust gas.

Embodiment 7

The system defined in any preceding embodiment, an inner annular wall; an outer annular wall surrounding the inner annular wall; and an annular passage disposed between the inner and outer annular walls, wherein the annular passage is configured to convey the second exhaust gas to the mixing region.

Embodiment 8

The system defined in any preceding embodiment, wherein the inner annular wall comprises a cylindrical shape or a tapered shape.

Embodiment 9

The system defined in any preceding embodiment, wherein the inner annular wall converges toward a downstream end of the mixing device, or diverges toward the downstream end.

Embodiment 10

The system defined in any preceding embodiment, wherein the inner annular wall is straight or curved.

Embodiment 11

The system defined in any preceding embodiment, wherein the first section comprises at least one of a lobe mixer, a scalloped lobe mixer, a multiple-lobe mixer, an angled lobe mixer, a ribbed lobe mixer, or a serrated lobe mixer, or any combination thereof.

Embodiment 12

The system defined in any preceding embodiment, wherein the first section comprises a lobe mixer having an annular sinusoidal shape with alternating first and second open-ended passages, the first open-ended passages are configured to direct a first portion of the first exhaust gas away from a longitudinal axis of the mixing device, and the second open-ended passages are configured to direct a second portion of the first exhaust gas toward the longitudinal axis.

Embodiment 13

The system defined in any preceding embodiment, wherein the first section comprises a lobe mixer configured to divide the first exhaust gas into an inner first exhaust gas and an outer first exhaust gas.

Embodiment 14

The system defined in any preceding embodiment, wherein the lobe mixer is configured such that the inner and outer first exhaust gases diverge from one another.

Embodiment 15

The system defined in any preceding embodiment, wherein the lobe mixer is configured to impart a swirling motion to the first exhaust gas.

Embodiment 16

The system defined in any preceding embodiment, wherein the first section is configured to impart swirling motion to the first exhaust gas in a first direction, the second section is configured to impart swirling motion to the second exhaust gas in a second direction, and the first and second directions are opposite from one another.

Embodiment 17

The system defined in any preceding embodiment, comprising a catalyst disposed downstream from the mixing device, wherein the catalyst is configured to treat the mixed exhaust gas from the mixing device to produce a treated exhaust gas.

Embodiment 18

The system defined in any preceding embodiment, comprising a heat recovery steam generator (HRSG) disposed downstream from the catalyst, wherein the HRSG is configured to generate steam by heating water with the treated exhaust gas.

Embodiment 19

The system defined in any preceding embodiment, wherein a pressure loss of the mixing device is less than approximately 500 pascals.

Embodiment 20

The system defined in any preceding embodiment, wherein the second section comprises at least one of a vortex generator, a semi-spherical protrusion, a lobe mixer, an open lobe mixer, or a closed lobe mixer, or any combination thereof.

Embodiment 21

The system defined in any preceding embodiment, comprising an exhaust gas extraction system coupled to the gas turbine engine, and a hydrocarbon production system coupled to the exhaust gas extraction system.

Embodiment 22

The system defined in any preceding embodiment, wherein the gas turbine engine is a stoichiometric exhaust gas recirculation (SEGR) gas turbine engine.

Embodiment 23

The system defined in any preceding embodiment, comprising an exhaust gas injection system configured to inject a pressurized exhaust gas at least into the mixing device, or upstream of the mixing device, or any combination thereof.

Embodiment 24

The system defined in any preceding embodiment, comprising a control element configured to adjust a flow of the pressurized exhaust gas to the exhaust gas injection system.

Embodiment 25

The system defined in any preceding embodiment, comprising a sensor disposed at least upstream of the mixing device, downstream of the mixing device, or within a catalyst disposed downstream from the mixing device, or any combination thereof, wherein the sensor is configured to provide a signal indicative of a temperature, pressure, flow rate, or composition, or any combination thereof.

Embodiment 26

The system defined in any preceding embodiment, wherein the exhaust gas injection system comprises an injection structure with a plurality of injection holes configured to inject the pressurized exhaust gas.

Embodiment 27

A system, comprising: a turbine exhaust section configured to mount downstream from a turbine section of a gas turbine engine, wherein the turbine exhaust section comprises an exhaust passage configured to receive exhaust gas from the turbine section; and a mixing device disposed in the turbine exhaust section, wherein the mixing device is configured to divide the exhaust gas into a first exhaust gas and a second exhaust gas, and to combine the first and second exhaust gases to produce a mixed exhaust gas.

Embodiment 28

The system defined in any preceding embodiment, comprising the gas turbine engine having the turbine exhaust section coupled to the turbine section.

Embodiment 29

The system defined in any preceding embodiment, wherein the gas turbine engine comprises: the turbine section having one or more turbine stages between an upstream end and a downstream end; a combustor section having a turbine combustor configured to generate combustion products to drive the one or more turbine stages in the turbine section; and a compressor section having an exhaust gas compressor driven by the turbine section, wherein the exhaust gas compressor is configured to compress and route the exhaust gas to the turbine combustor; wherein the turbine exhaust section is coupled to the gas turbine engine downstream from the downstream end of the turbine section.

Embodiment 30

The system defined in any preceding embodiment, wherein the gas turbine engine is a stoichiometric exhaust gas recirculation (SEGR) gas turbine engine.

Embodiment 31

The system defined in any preceding embodiment, wherein the mixing device comprises a first section configured to convey the first exhaust gas to a mixing region and a second section configured to convey the second exhaust gas to the mixing region, wherein the second section circumferentially surrounds the first section.

Embodiment 32

The system defined in any preceding embodiment, wherein the second section comprises: an inner annular wall; an outer annular wall surrounding the inner annular wall; and an annular passage disposed between the inner and outer annular walls, wherein the annular passage is configured to convey the second exhaust gas to the mixing region.

Embodiment 33

The system defined in any preceding embodiment, wherein the first section comprises a lobe mixer.

Embodiment 34

The system defined in any preceding embodiment, wherein the first section is configured to impart swirling motion to the first exhaust gas in a first direction, the second section is configured to impart swirling motion to the second exhaust gas in a second direction, and the first and second directions are opposite from one another.

Embodiment 35

The system defined in any preceding embodiment, wherein a pressure loss of the mixing device is less than approximately 500 pascals.

Embodiment 36

The system defined in any preceding embodiment, comprising an exhaust gas injection system configured to inject a pressurized exhaust gas at least into the mixing device, or upstream of the mixing device, or any combination thereof.

Embodiment 37

A system, comprising: a turbine mixing device configured to mount in a turbine exhaust section of a gas turbine engine, wherein the mixing device comprises a first section configured to convey an inner portion of an exhaust gas from the turbine exhaust section to a mixing region, and a second section configured to convey an outer portion of the exhaust gas to the mixing region, wherein the second section circumferentially surrounds the first section, and the mixing region is configured to mix the inner and outer portions of the exhaust gas to produce a mixed exhaust gas.

Embodiment 38

The system defined in any preceding embodiment, comprising the gas turbine engine having the turbine mixing device mounted in the turbine exhaust section.

Embodiment 39

The system defined in any preceding embodiment, wherein the first section is disposed surrounding a longitudinal axis of the mixing device, and the second section comprises an annular shape surrounding the first section.

Embodiment 40

The system defined in any preceding embodiment, wherein the first section comprises an annular sinusoidal shape comprising alternating first and second open-ended passages, the first open-ended passages are configured to direct a first portion of the inner portion of the exhaust gas away from a longitudinal axis of the mixing device, and the second open-ended passages are configured to direct a second portion of the inner portion of the exhaust gas toward the longitudinal axis.

Embodiment 41

The system defined in any preceding embodiment, comprising an exhaust gas injection system coupled to the turbine mixing device and configured to inject a pressurized exhaust gas into the turbine mixing device.

Embodiment 42

A method, comprising: combusting a fuel with an oxidant and an exhaust gas in a combustion portion of a turbine combustor to generate combustion products; driving a turbine with the combustion products from the turbine combustor; expanding the combustion products from the turbine through an exhaust passage in an exhaust section; dividing the combustion products from the exhaust section into a first exhaust gas and a second exhaust gas using a mixing device; and combining the first and second exhaust gases to produce a mixed exhaust gas using the mixing device such that a downstream radial uniformity of the mixed exhaust gas is greater than an upstream radial uniformity of the combustion products.

Embodiment 43

The method or system defined in any preceding embodiment, comprising conveying the first exhaust gas to a mixing region using a first section of the mixing device; and conveying the second exhaust gas to the mixing region using a second section of the mixing device disposed circumferentially surrounding the first section.

Embodiment 44

The method or system defined in any preceding embodiment, comprising conveying the second exhaust gas through a plurality of openings formed in the second section.

Embodiment 45

The method or system defined in any preceding embodiment, comprising imparting swirling motion to the first exhaust gas in a first direction using the first section; and imparting swirling motion to the second exhaust gas in a second direction using the second section, wherein the first and second directions are opposite from one another.

Embodiment 46

The method or system defined in any preceding embodiment, comprising dividing the first exhaust gas into an inner first exhaust gas and an outer first exhaust gas using a lobe mixer, wherein the inner and outer first exhaust gases diverge from one another.

Embodiment 47

The method or system defined in any preceding embodiment, wherein combusting comprises substantially stoichiometrically combusting the fuel with the oxidant and the exhaust gas.

Embodiment 48

The method or system defined in any preceding embodiment, comprising extracting a portion of the exhaust gas, and routing the portion of exhaust gas to a hydrocarbon production system.

Embodiment 49

The method or system defined in any preceding embodiment, comprising injecting a pressurized exhaust gas at least into the mixing device, or upstream of the mixing device, or any combination thereof using an exhaust gas injection system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A system, comprising:
  a gas turbine engine, comprising:
    a combustor section having one or more combustors configured to generate combustion products;
    a turbine section having one or more turbine stages between an upstream end and a downstream end, wherein the one or more turbine stages are driven by the combustion products;
    an exhaust section disposed downstream from the downstream end of the turbine section, wherein the exhaust section has an exhaust passage configured to receive the combustion products as an exhaust gas; and
    a mixing device disposed in the exhaust section, wherein the mixing device is configured to divide the exhaust gas into a first exhaust gas and a second exhaust gas, and to combine the first and second exhaust gases in a mixing region to produce a mixed exhaust gas.

2. The system of claim 1, wherein the mixing device comprises a first section configured to convey the first exhaust gas to the mixing region and a second section configured to convey the second exhaust gas to the mixing region, wherein the second section circumferentially surrounds the first section.

3. The system of claim 2, wherein the first section is disposed surrounding a longitudinal axis of the mixing device, and the second section comprises an annular shape surrounding the first section.

4. The system of claim 2, wherein the second section comprises a plurality of openings configured to convey the second exhaust gas to the mixing region.

5. The system of claim 2, wherein the second section comprises:
an inner annular wall;
an outer annular wall surrounding the inner annular wall; and
an annular passage disposed between the inner and outer annular walls, wherein the annular passage is configured to convey the second exhaust gas to the mixing region.

6. The system of claim 2, wherein the first section comprises at least one of a lobe mixer, a scalloped lobe mixer, a multiple-lobe mixer, an angled lobe mixer, a ribbed lobe mixer, and a serrated lobe mixer, or any combination thereof.

7. The system of claim 2, wherein the first section comprises a lobe mixer having an annular sinusoidal shape with alternating first and second open-ended passages, the first open-ended passages are configured to direct a first portion of the first exhaust gas away from a longitudinal axis of the mixing device, and the second open-ended passages are configured to direct a second portion of the first exhaust gas toward the longitudinal axis.

8. The system of claim 1, comprising a catalyst disposed downstream from the mixing device, wherein the catalyst is configured to treat the mixed exhaust gas from the mixing device to produce a treated exhaust gas.

9. The system of claim 1, wherein the mixing device comprises at least one of a vortex generator, a semi-spherical protrusion, a lobe mixer, an open lobe mixer, and a closed lobe mixer, or any combination thereof.

10. The system of claim 1, comprising an exhaust gas extraction system coupled to the gas turbine engine, and a hydrocarbon production system coupled to the exhaust gas extraction system.

11. The system of claim 1, wherein the gas turbine engine is a stoichiometric exhaust gas recirculation (SEGR) gas turbine engine.

12. The system of claim 1, comprising an exhaust gas injection system configured to inject a pressurized exhaust gas into the mixing device, upstream of the mixing device, or any combination thereof.

13. A system, comprising:
a turbine exhaust section configured to mount downstream from a turbine section of a gas turbine engine, wherein the turbine exhaust section comprises an exhaust passage configured to receive exhaust gas from the turbine section; and
a mixing device disposed in the turbine exhaust section, wherein the mixing device is configured to divide the exhaust gas into a first exhaust gas and a second exhaust gas, and to combine the first and second exhaust gases to produce a mixed exhaust gas.

14. The system of claim 13, comprising the gas turbine engine having the turbine exhaust section coupled to the turbine section.

15. The system of claim 14, wherein the gas turbine engine comprises:
the turbine section having one or more turbine stages between an upstream end and a downstream end;
a combustor section having a turbine combustor configured to generate combustion products to drive the one or more turbine stages in the turbine section; and
a compressor section having an exhaust gas compressor driven by the turbine section, wherein the exhaust gas compressor is configured to compress and route the exhaust gas to the turbine combustor;
wherein the turbine exhaust section is coupled to the gas turbine engine downstream from the downstream end of the turbine section.

16. A method, comprising:
combusting a fuel with an oxidant and an exhaust gas in a combustion portion of a turbine combustor to generate combustion products;
driving a turbine with the combustion products from the turbine combustor;
expanding the combustion products from the turbine through an exhaust passage in an exhaust section;
dividing the combustion products from the exhaust section into a first exhaust gas and a second exhaust gas using a mixing device; and
combining the first and second exhaust gases to produce a mixed exhaust gas using the mixing device such that a downstream radial uniformity of the mixed exhaust gas is greater than an upstream radial uniformity of the combustion products.

17. The method of claim 16, comprising:
conveying the first exhaust gas to a mixing region using a first section of the mixing device; and
conveying the second exhaust gas to the mixing region using a second section of the mixing device disposed circumferentially surrounding the first section.

18. The method of claim 17, comprising conveying the second exhaust gas through a plurality of openings formed in the second section.

19. The method of claim 17, comprising:
imparting swirling motion to the first exhaust gas in a first direction using the first section; and
imparting swirling motion to the second exhaust gas in a second direction using the second section, wherein the first and second directions are opposite from one another.

20. The method of claim 16, comprising dividing the first exhaust gas into an inner first exhaust gas and an outer first exhaust gas using a lobe mixer, wherein the inner and outer first exhaust gases diverge from one another.

* * * * *